United States Patent [19]

Burke, Jr., deceased et al.

[11] 4,132,561

[45] Jan. 2, 1979

[54] INTRACHROMOSPHERULOID PIGMENTS AND PROCESSES FOR PRODUCING SAME

[75] Inventors: Oliver W. Burke, Jr., deceased, late of Fort Lauderdale, Fla., by Norma Scala, administratrix; Victor T. Humphreys, Pompano Beach, Fla.

[73] Assignees: Marion Darrah; Joseph Y. Houghton, both of Pompano Beach, Fla.

[21] Appl. No.: 712,257

[22] Filed: Aug. 6, 1976

[51] Int. Cl.² .................... C08K 9/02; C08K 9/04; C08K 9/10

[52] U.S. Cl. .................... 106/308 M; 106/308 B; 106/308 Q; 106/308 F; 106/308 N; 106/308 S; 106/309; 260/42.14; 260/42.15; 260/42.16; 260/42.21; 260/42.53

[58] Field of Search ............... 260/42.53, 42.21, 42.14, 260/42.15, 42.16; 106/308 M, 308 B, 308 Q, 308 F, 308 N, 308 S

[56] References Cited

U.S. PATENT DOCUMENTS

| | | | |
|---|---|---|---|
| 2,751,369 | 6/1956 | Te Grotenhuis | 260/42.53 |
| 2,786,822 | 3/1957 | Vesce | 260/42.55 |
| 3,133,893 | 5/1964 | Newman | 260/42.21 |
| 3,423,358 | 1/1969 | Burke | 260/42.43 |
| 3,502,582 | 3/1970 | Clemens | 260/42.53 |
| 3,700,690 | 10/1972 | Burke | 260/42.55 |

*Primary Examiner*—James H. Derrington
*Attorney, Agent, or Firm*—Hall & Houghton

[57] ABSTRACT

An intrachromospheruloid pigment and a process for producing the same: the intrachromospheruloid pigment consisting essentially of spheruloids of essentially transparent organic polymer material, preferably cross-linked to essential insolubility in any physical solvent, having primary particles of an average size not exceeding 4 microns in diameter which have embedded therein particulate pigment composition consisting essentially of organic color pigment material having primary particles of an average size not exceeding 0.2 micron in diameter. In the process for its production, the organic color pigment material is reduced to an average particle size of 0.2 micron or less, which is well below the normal pigmentary size range, and is then included in an emulsion polymerization of monomer material preferably comprising an effective quantity of cross-linking agent, and the polymerization is conducted to produce emulsion polymer of an average particle size not exceeding 4 microns in diameter, having embeded therein the still smaller organic color pigment particles.

42 Claims, 5 Drawing Figures

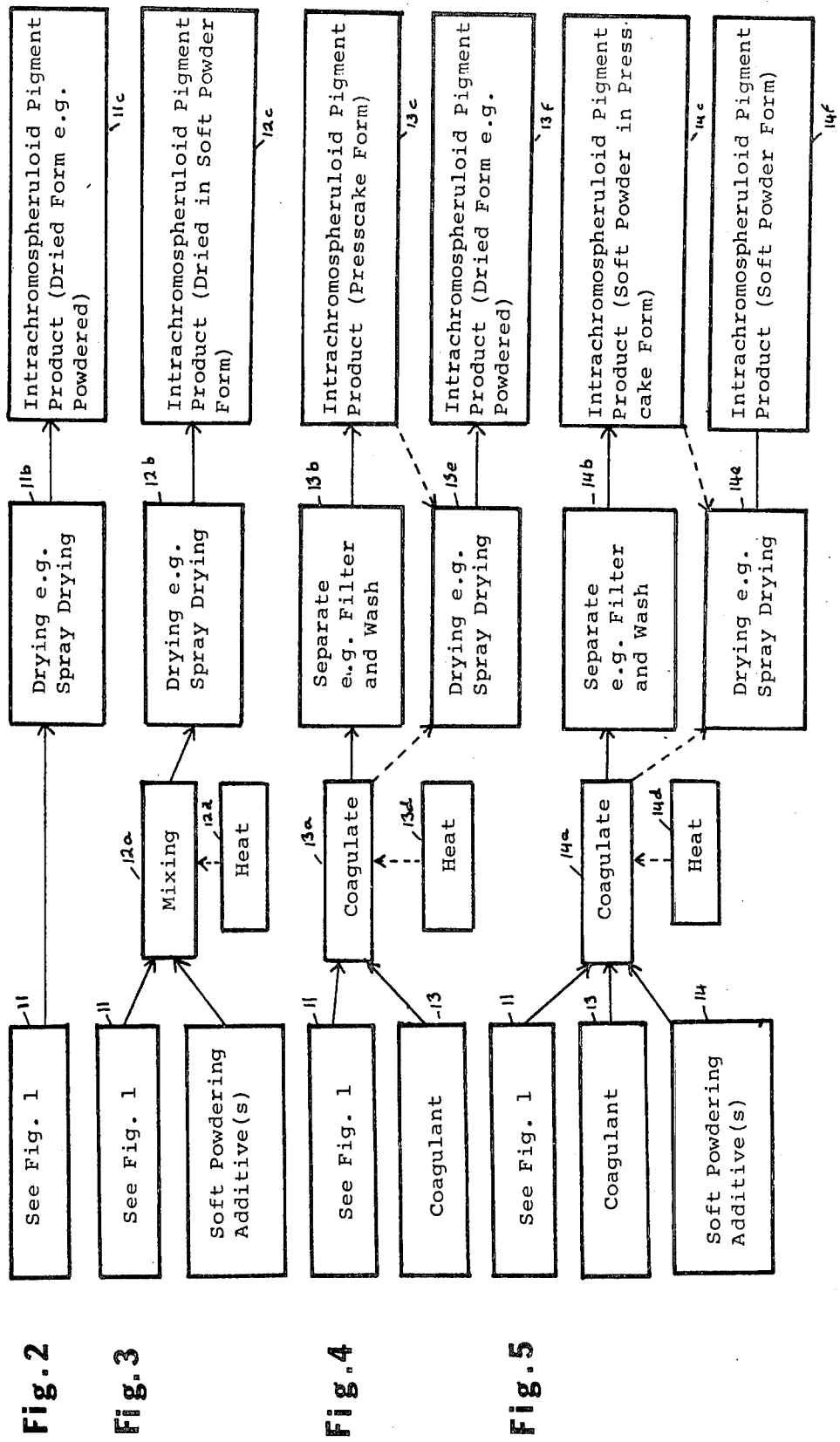

INTRACHROMOSPHERULOID PIGMENTS AND PROCESSES FOR PRODUCING SAME

BACKGROUND OF THE INVENTION

1. Field of the Invention

This invention relates to new colored pigments and aims generally to improve the same and to provide novel processes for the production thereof.

2. Description of the Prior Art

In the prior art organic color pigments have been employed in particles of light reflective size; i.e. the so-called pigmentary range of 0.2 to 0.4 micron, by forming or reducing the inorganic color pigment to such size and dispersing it directly into the medium in which it was to be employed. Patents also exist which disclose the surface treatment of such organic color pigments with various chemical substances to aid dispersion, but these substances are largely retained on the color particles and limit their usefulness and compatibility with many vehicles.

The prior art had also disclosed certain advantages obtainable by incorporating a vehicle-soluble linear polymer or copolymer with an organic pigment, specifically that method contained in U.S. Pat. No. 3,133,893, wherein a vehicle soluble linear polymer or copolymer is formed in the presence of an organic pigment obtained from an organic pigment presscake that has been dispersed by stirring in the presence of a dispersing agent such as stearamidopropyldimethylhydroxyethyl ammonium chloride, cetyl pyridinum chloride, sodium dodecyl sulfonic acid, ethylene oxide-acid condensation products, bis(2-ethylhexyl) sodium sulfosuccinate; and certain advantages obtainable, as in U.S. Pat. No. 3,423,358, by the preformation of crosslinked polymeric particles which are subsequently dyed. Both of these patents present certain failings or shortcomings in actual use, viz:

U.S. Pat. No. 3,133,893 is concerned with producing a color masterbatch for use in spinning solutions, in which masterbatch the pigment particles are presscake particles which, because of their relatively large sizes, nonsphericity and crystalline structure, produce coloring deviations and are used inefficiently; the coated particles are removable by filtration without precoagulation, which requires that they be of substantial size, namely of the order of 40 microns or more and their coating must dissolve in the medium of use to be adapted to the patentee's purpose. In addition very large quantities of water are required and wasted in the patented process and the dispersants used become waste of the process.

U.S. Pat. No. 3,423,358 is concerned with the production of colored organic filler material by dyeing a preformed crosslinked insoluble polymer particle. Its process is essentially restricted to the use of water soluble dye structures or those capable of being applied to the crosslinked filler particles in water soluble form and of thereafter being insolubilized on the surface of said polymer particles. This requirement excludes most of the high light-fastness organic pigmentary compounds and generally speaking the tinctorial strength obtained is rather low. The patented process necessitates the introduction of an expensive and sometimes complicated dyeing step, and also makes substantial use of water both for the dyeing and washing steps.

SUMMARY OF THE INVENTION

In the conventional practices above described the color particles of light reflective size present their outer faces only as light reflectants, the remainder or internal portions of the pigment being useless for coloration. Therefore in such prior practices, the color pigments, which are quite expensive, are utilized only with a low degree of efficiency which has been tolerated since it has been known that reduction of the pigment to less than the light reflective size, besides being difficult and costly, resulted in disadvantages including loss of covering power of the pigment. Notwithstanding these facts, the present invention aims to reduce the inherent inefficiency of the prior art practice by reducing the pigment to particles below the conventional size required for light reflectivity and covering power, and then surrounding the individual particles of less than conventional light reflective size with spheruloid bodies of essentially transparent polymer insoluble in the environment of intended use and which differ in refractive index from the environment of intended use so that by light refraction they can enhance to the viewer the apparent size of the color particles. Such novel pigment compositions are hereinafter described and referred to as "Intrachromospheruloid" pigments. By this improvement, portions of the color previously buried in pigment particles of light reflective size, are exposed and viewed by refraction in the intrachromospheruloid pigment, thus increasing the coloration effect of the quantity of color pigment employed.

In a preferred embodiment of the invention a process is provided for producing insoluble intrachromospheruloid pigment composition, which process comprises, in combination: (a) providing in liquid medium a particulate pigment composition consisting essentially of organic color pigment composition dispersed in said medium with 0–100% by weight of the total of surface active agent material set forth in clause (c) of this paragraph, said organic color pigment composition being essentially insoluble in physical solvents and having primary particles of an average size less than 0.2 micron in diameter; (b) forming an aqueous emulsion polymerization system consisting essentially of (1) the composition of (a), (2) the balance, if any, of 100% of the total of surface active agent material set forth in (c), (3) monomer material selected in a ratio of said monomer material to said pigment composition lying in the range of 100:1 to 1:20 by weight, said monomer material consisting essentially of ethylenically unsaturated monomer material selected from the class consisting of (i) monomers polymerizable through a single ethylenically unsaturated group in the amount of 0% to 99.8% by weight of said monomer material and (ii) monomers polymerizable through a plurality of ethylenically unsaturated groups in an amount, in the range of 0.2 to 100% by weight of said monomer material, sufficient to produce polymer cross-linked to essential insolubility in any physical solvent and (4) emulsion polymerization initiator in an effective amount in the range of 0.2% to 10% by weight of the said monomer material, dispersed in an aqueous medium; (c) the ratio of the total of the surface active agent material present after (b) to said particulate pigment composition and monomer material lying in the range of 2:1 to 1:40 by weight, and said total of surface active agent material being selected from the class of polymeric and nonpolymeric surface active agents and combinations thereof capable of effecting emulsion polymerization in the said system of the selected ethylenically unsaturated monomer material to yield polymer particles with the organic pigment provided in step (a) embedded therein; (d) effecting emulsion polymerization in said system at sufficient temperatures in the range of 0 to 200° C. for sufficient time in the range of a few minutes to 24 hours to permit the polymerization to proceed far enough in the range from 50 to 100% conversion by weight of said monomer material to produce in aqueous dispersion an intrachromospheruloid pigment consisting essentially of spheruloids of organic polymer material, cross-linked to essential insolubility in any physical solvent, having primary particles of an average size not exceeding 4 microns in diameter, and having embedded therein the still smaller size particles of said particulate pigment composition, and (e) recovering said intrachromospheruloid pigment composition.

In this embodiment the monomer material may comprise several portions added sequentially, at least one of the portions comprising cross-linking monomer as set forth; and the cross-linking monomer may consist essentially of material copolymerizable with vinyl monomers and be wholly or partially selected from the unsaturated conjugated drying oils and their acids and derivatives thereof, in the ratio to the vinyl and/or other copolymerizable monomer material of 0.2:99.8 to 20:80 by weight.

The product of this preferred embodiment is particularly desirable because we have discovered that it may be modified to be soft powdering as hereinafter disclosed whereas said technique is inapplicable to non-cross-linked oil soluble polymers.

For special purposes and with less general advantage a less preferred embodiment of the invention may be employed wherein the monomer material in step (b) consists essentially of ethylenically unsaturated monomer material selected from the class consisting of monomers polymerizable through a single ethylenically unsaturated group, to produce spheruloids consisting of essentially noncrosslinked organic polymer material, insoluble in the vehicle of intended use.

Whether prepared by the preferred or less preferred embodiments the products may be recovered in step (e) in latex form, in presscake form, or in bulk-dried or in spray dried form and may be used in vehicles in which the polymer portion of the product is insoluble, and when, as above noted, the polymer portions of the product are crosslinked to insolubility in any physical solvent the products may be recovered in soft powdered form and/or be used in any suitable vehicle.

Thus, as just described, the polymer portion of the intrachromospheruloid pigment of applicants' invention is insoluble in the environment of intended use, and in the preferred practice of the invention is crosslinked to insolubility in all physical solvents, although in certain instances such crosslinking may be omitted with limitation of the special utility of the product to environments in which its polymer portion is essentially insoluble. Further, in accordance with the invention, means are also provided for aiding the fixation of the intrachromospheruloid pigment to the environment of intended use by physical and/or chemical bonding.

We have found it to be essential to reduce the organic color pigment to an average particle size essentially below 0.2 micron, and preferably below 0.02 micron in diameter, which values are well below the conventional optimum pigmentary range, and that it is then possible to embed such ultra fine color particles within transparent polymer spheruloids insoluble in the environment of intended use and which differ in refractive index from the environment of intended use, of not more than 4 microns of average particle size to thereby obtain the new and useful coloration characteristics of the present invention. The reduction in organic pigment color size to such ultra fineness may be effected by micronizing in a liquid medium, e.g. in a ball-mill or preferably a sand-mill. The liquid medium may be an aqueous solution of dispersing agent preferably selected from those known to be suitable for effecting emulsion polymerization, or it may be a liquid body of monomer material with or without such dispersing agent, and with or without a volatile organic diluent miscible with said monomer, the monomer material being suitable for polymerization in the formation of the final product, or it may be a liquid organic diluent.

The pigmentary color starting material may be in any conveniently available form, either as wet presscake which may or may not have been subjected to such special treatment as acid pasting; or it may be a dry, conventional, essentially pure pigment composition commercially available, or it may have been preformed as a laked color as in the case of pigments from water soluble acid or azo dyes.

The polymerization of the monomer or monomers with the organic pigment color composition is carried out in the presence of sufficient emulsifier material to effect emulsion polymerization of the monomer material, and the nature and quantity of initiator and emulsifier, the degree of conversion of monomer to polymer, and the temperature of polymerization are selected to produce intrachromospheruloid pigment having primary particles of an average size not exceeding 4 microns so that the potential color strength available may be fully developed and retained in the finished product. The amount of dispersant or surface active agent employed in aqueous micronizing of the organic color pigment can be as low as is consistent with reduction of the particle size to the desired level and the maintenance of its size stability.

Functional groups may be introduced either into the initial polymeric pigment composition by selection of the monomer or monomers or may be later introduced by means of graft polymerization techniques or by selection of the emulsifier or emulsifiers, particularly those of a polymeric character, which become incorporated into the intrachromospheruloid pigment particles.

In the case where two or more organic color pigments are combined in the spheruloids to produce new and novel shades, such combinations do not show the dulling of hue characteristic of normal physical mixtures when two or more organic pigment colors are blended together, but retain the original brilliance of hue characteristic of the individual colors. Furthermore, when one such organic pigment color is possessed of markedly superior light-fastness the resultant intrachromospheruloid pigment composition takes on the light resistant characteristics of the superior component to a marked degree. Even those organic pigment colors which do not themselves possess any great degree of resistance to fading are found to be markedly improved when incorporated into intrachromospheruloid pigment compositions, with or without other more light stable pigment material.

Furthermore intrachromospheruloid pigment compositions comprising two or more organic pigment colors either of similar or different hue when applied to their intended uses retain the true shade of the mixture with no tendency for separation into component pigment colors either during storage or in actual use.

It has even been found possible to incorporate in the spheruloids, with any of the organic color pigments used, a selected amount (e.g. between 0 and 10% by weight based on the organic color pigment) of a hue deepening component, carbon black, e.g. Pigment Black 6 or 7 (CI No. 77266), which when used gives deeper tonal shades proportional to its quantity without materially destroying the hue of said organic color pigment as it would do if it were simply mixed into the vehicle of use.

BRIEF DESCRIPTION OF DRAWINGS

In the accompanying drawings illustrative of preferred embodiments of the invention:

FIGS. 2, 3, 4, and 5 are detail flow diagrams of processes for converting intrachromospheruloid pigment in latex form into intrachromospheruloid pigment in other forms such as wet presscake or dry powder.

GENERAL PROCEDURE

Figure 1:
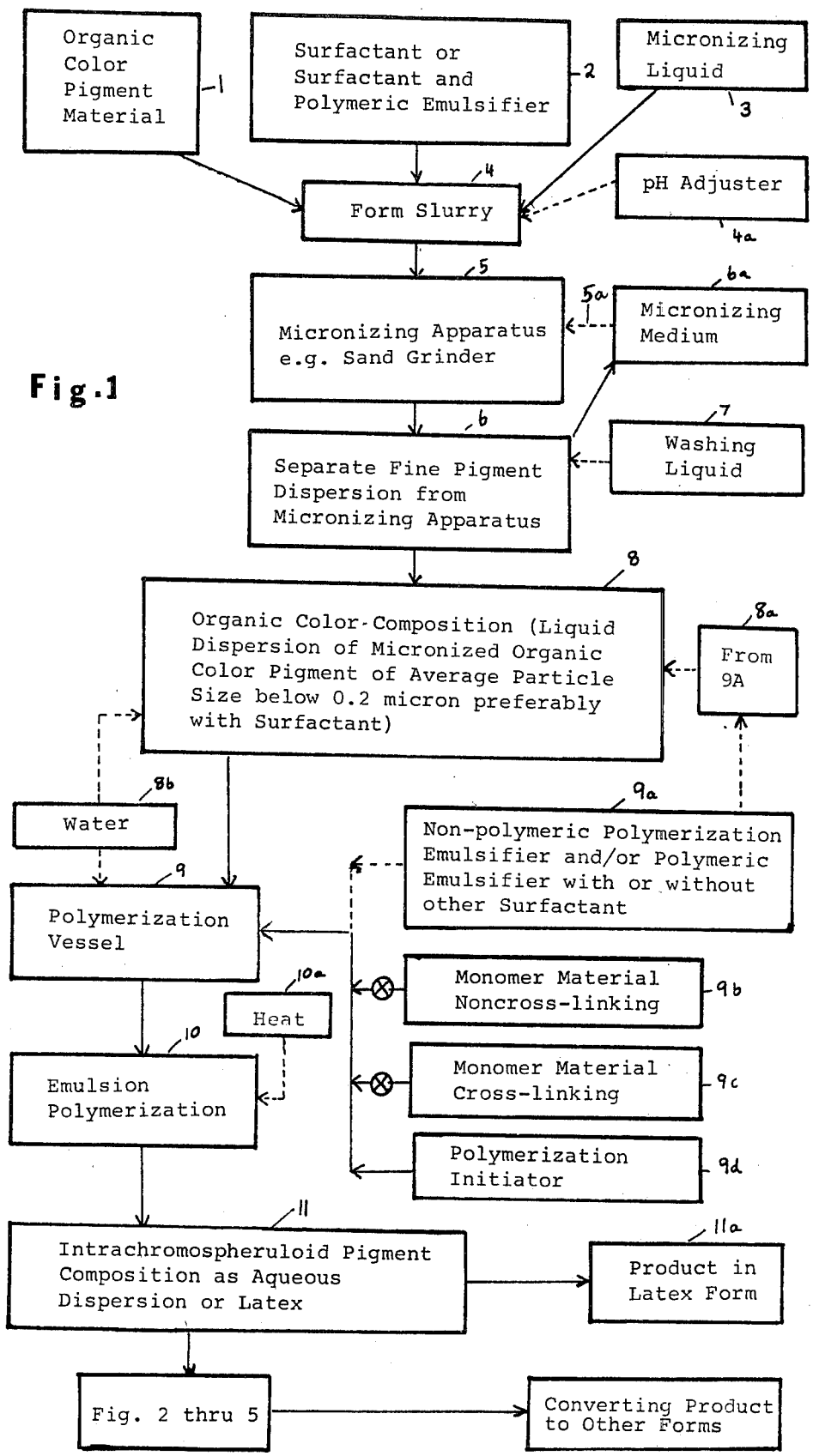
FIG. 1 is a process flow diagram of procedures for production of intrachromospheruloid pigments in latex and/or other forms.

The general procedures for preparing intrachromospheruloid pigments in accordance with the process of the invention, are illustrated in the drawings. In these procedures (FIG. 1) (a) an organic color pigment composition 8 is first provided consisting essentially of liquid having dispersed therein micronized organic color pigment essentially insoluble in the said liquid.

When an aqueous micronizing medium 3 is employed, it comprises surface active agent material 2 which stabilizes the dispersion of the micronized color pigment in said aqueous phase, in which the organic color pigment is so finely divided as to have an average particle size below the usual pigmentary range. As shown in FIG. 1 the micronizing may be accomplished by charging to a micronizing apparatus 5, e.g. a ball-mill or preferably a sand grinder, a slurry 4, of organic color pigment material 1 with sufficient water 3 to facilitate the grinding and sufficient surfactant or surface active agent material 2 to stabilize the dispersion to be produced. The charge of slurry 4 is then micronized as at 5 until the pigment particles are so finely divided that the average particulate entities thereof have an average particle size of less than 0.2 micron, and preferably of less than 0.02 micron. In this aqueous micronizing procedure the ratio of organic color pigment material to water to obtain efficient grinding should be in the range of 20:80 to 30:70 and the ratio of surface active agent material to water should be in the range of 5:95 to 20:80 parts by weight or even more. Applicable ratios are subject to variation depending on the particular organic pigment material and/or surface active agent material concerned, are not highly critical, and may be optimized empirically.

The separated organic color material composition 8, with or without added surface active agent material 8a (which may be provided at this stage if desired, especially if the dispersion is to be stored for a substantial time before further processing) is then ready for the next step of the procedure.

When a nonaqueous micronizing liquid 3 is employed, the present invention contemplates use as such liquid of a part or all of the ethylenically unsaturated monomer material to be employed in the polymerization step 10 with or without added volatile organic solvent miscible with the monomer material and removable prior to the polymerization step. In such instance the amount of surface active agent material 2 employed in the micronizing step 5 can be reduced to zero, or a part or all of the surface active agent or emulsifier to be used in the emulsion polymerization may be present during the micronizing step. Generally the same considerations as to proportions of liquids to solids and empirical practices apply whether the medium be aqueous or nonaqueous. Obviously, when micronizing in flammable material the temperature and the conditions of grinding, such as maintenance of an inert atmosphere and use of explosion-proof electrical equipment, must be controlled in the interests of safety. When it is desirable to employ a wash liquid 7 for removing fine pigment dispersion from the micronizing medium, it is desirable to use a washing liquid which is employed as a component in the polymerization 10. When such a nonaqueous micronizing system is employed the micronized color pigment material 6 is then emulsified in 8 with the aid of water 8b and surface active agent material 8a capable of supporting emulsion polymerization to form an organic color composition 8 containing therein sufficient organic color pigment, surface active agent material, monomer material and water to form an emulsion polymerization composition which is charged to the polymerization vessel 9. Should it be more convenient the necessary water 8b and emulsifier material 8a may be charged directly to the polymerization vessel 9 and the nonaqueous organic color composition 8 added thereafter.

Preferably in either of the above procedures the degree of micronization is monitored during step 5 by microscopic examination of samples of the micronized slurry to determine when the necessary organic color pigment particle size has been attained, at which time the organic color composition 8 is separated from the micronizing medium 6a, e.g. sand, which may be recycled as at 5a to the micronizing apparatus employed to carry out the micronizing step 5.

In the next step the finely divided pigment entities in said composition 8 are converted into intrachromospheruloid pigment by forming about said organic color pigment entities bodies of essentially transparent polymer of not over 4 microns in particle size diameter. To accomplish this step the organic color pigment composition 8 is charged to a polymerization vessel 9 with sufficient surface active agent material 9a (additional to that supplied at 2 or at 8a), if necessary, to provide a total content of surface active agent material appropriate for the emulsion polymerization of monomer material, e.g. 9b, with the aid of an emulsion polymerization initiator 9d, which materials are also charged to the polymerization vessel. Sufficient monomer material is charged so that when polymerized to the desired conversion, usually 100% conversion, the ratio of the organic pigment content to the polymer content of the intrachromospheruloid pigment wil be in the range of 1:100 to 20:1 (preferably 1:10 to 4:10). As indicated at 10a heat may be supplied to expedite the polymerization 10, as is well known to those skilled in the emulsion polymerization art. By such procedures the conversion step (b) produces, from the micronized organic pigment material and monomer material supplied, an essentially stable aqueous dispersion, i.e. latex, of intrachromospheruloid pigment 11. This dispersion 11 may be withdrawn as product 11a, for use as an intrachromospheruloid pigment latex in coloring of water base paints and inks, coloring of paper in the beater, pigment printing on textiles, and other uses for which a stable colored latex is adapted, or as indicated in FIG. 1, it may be further processed to produce intrachromospheruloid pigment in other forms illustrated in FIGS. 2 to 5. For example as shown in FIG. 2, the intrachromospheruloid pigment latex or dispersion 11 (which itself is so fine as to pass through normal filter paper without leaving residue thereon in the absence of chemical substituents which would bond to the filter medium) may be converted to a dry powdered product 11c by drying, preferably spray drying, as shown at 11b. When this procedure is followed, the latex being spray dried may be reduced to very fine spray in order to obtain a finely divided spray dried product without additional processing. When cross-linked, the need for a fine spray may be reduced as shown in FIG. 3 by intimately mixing with the intrachromospheruloid pigment latex 11, as at 12a, soft powdering additive(s) 12, with or without the aid of heat 12d and drying this mixture, which will produce the intrachromospheruloid pigment in dried latex soft powder form 12c, requiring little or no mechanical attrition to constitute a useful powdered product. These dried intrachromospheruloid pigment products 11c and 12c are more readily shipped and stored than the intrachromospheruloid pigment latex and may be employed for the same purposes as above set forth in connection with intrachromospheruloid pigment latex 11c.

As shown in FIG. 4, instead of drying the intrachromospheruloid pigment latex directly as in FIGS. 2 and 3, the intrachromospheruloid pigment latex 11 may be coagulated as at 13a with the aid of a coagulant 13 with or without the aid of heat 13d, and the coagulum of intrachromospheruloid pigment may then be separated from the serum as at 13b, e.g. by centrifuging or filtering and washing, to produce the intrachromospheruloid pigment in wet presscake form 13c. Such wet presscake form has advantages for certain uses where a product is required that is substantially free of surface active agent material and excess water, e.g. as in the flushed color industry, and may also be used for the same purposes as the intrachromospheruloid pigment latex 11 or the dried, surface active agent material containing, intrachromospheruloid pigment powders 11c and 12c. The coagulated intrachromospheruloid pigment material 13a, which may have its characteristics modified by the coagulant and/or any other modifier which may be present therewith, can itself be dried as indicated by the dotted arrow leading from 13a to 13e in FIG. 4, or where a dry intrachromospheruloid pigment essentially free of surface active agent material and/or coagulant material residues is preferred, the intrachromospheruloid pigment presscake 13c may be dried as indicated by the solid arrow leading from 13c to 13e for producing such form of product 13f.

The procedure of FIG. 4 may be modified as shown in FIG. 5, by adding to the cross-linked pigment latex 11 not only coagulant material 13, but also soft powdering additive(s) 14, which may be introduced either before or after the coagulation is effected at 14a (with or without the aid of heat 14d). The so modified coagulated intrachromospheruloid pigment dispersion may then be treated in the same manner as described above in connection with item 13b, 13c, 13e, and 13f, as indicated by the respectively corresponding items 14b, 14c, 14e, and 14f in FIG. 5, and the modified products 14c and 14f include the soft powder advantages described in connection with FIG. 3. Such dry intrachromospheruloid pigments are especially suitable for incorporation into nonaqueous systems especially oil based paints and printing inks and for coloration and hue modification of thermoplastic compounds. For clarity in the following more detailed description and exemplification of the invention certain terms will be employed, the meaning of which we here set forth:

(1) Organic Color Pigments

The term "organic color pigments" as used herein designates the organic pigmentary materials which are colored as distinguished from water white or opaque white materials.

The invention is generally applicable to such organic color pigments and is not limited to the use of any particular organic color pigment. As illustrative but not restrictive of those that may be used and improved by the invention are those organic color pigments set out in "The Chemistry of Synthetic Dyes" by K. Venkataraman, Vol. V, especially Section 6, pages 314-474, Academic Press, New York, N.Y., (1971), herein incorporated by reference, which include pigments of the well known azo class exemplified by the acetoacetarylide azo, the pyrazolone azo, the α-naphthol azo, the 2-hydroxy-3-naphthoic acid azo, the 2-hydroxy-3-naphtharylide azo and the naphtholsulfonic acid azo pigments; the triphenylmethane pigments and related pigmentary compounds; the phthalocyanine pigments; the anthraquinone, indigoid and related pigments; the quinacridone pigments; the dioxazine pigments; the azamethine pigments; the fluororubine pigments; the naphthindolizinedione pigments; and other miscellaneous organic pigmentary compositions; and those set out in "The Chemistry of Synthetic Dyes and Pigments" by Herbert A. Lubs, Reinhold, New York (1955), herein incorporated by reference, and in "The Color Index", 3rd Edition (1973) published jointly by the "British Society of Dyers and Colourists" and the "American Association of Textile Chemists and Colorists", also herein incorporated by reference. Typical representatives of these organic color pigments are set forth in the examples herein by way of illustration.

(2) Surface Active Agent Material

Among the dispersing and/or emulsifying agents available for use as surface active agents herein we have found that the only essential criterion for such agent is that it, or it in combination with one or more additional dispersants and/or emulsifiers which may be used, should be capable of supporting emulsion polymerization. Having regard to this criterion surface active agents or as they are more generally classified "Surfactants" (which encompasses both grinding, wetting and emulsifying agents) may be either anionic, nonionic, cationic or amphoteric; of either singular molecular structure or polymeric nature; it being understood that when two or more of such agents are employed together they must be compatible with each other. For example non-polymeric or polymeric anionic surfactants may be combined with each other and with nonionic and/or amphoteric surfactants, polymeric or nonpolymeric; and nonpolymeric or polymeric cationic surfactants may be combined with each other or with nonionic and/or amphoteric surfactants; and amphoteric and/or nonionic surfactants may be combined with each other. Thus it is possible to use a very wide range of commercially available surface active agents for achieving the degrees of grinding, the emulsion polymerization, and the production of intrachromospheruloid pigments as latices suitable for particular uses, as hereinafter exemplified, comprehensive listings of which are set out in the treatises "Detergents and Emulsifiers 1974 Annual" by John W. McCutcheon, published by John W. McCutcheon, Inc., Morristown, N.J., especially under the headings of Emulsifiers Suitable for Emulsion Polymerization, etc., and "Surface Active Agents and Detergents" Anthony N. Schwartz et al, Interscience Publishers, Inc., New York (1958), Vol. 2, pages 153–172, each of which is herein incorporated by reference.

Among the commercially available surfactants may be mentioned the anionic surfactants, e.g. carboxylic acids and their derivatives, sulfonic esters, alkanesulfonates, alkylarylsulfonates and phosphate esters; the non-ionic surfactants e.g. polyethenoxy ethers of alkylphenols, polyethenoxy ethers of alcohols and mercaptans, difunctional and poly-functional polyethenoxy esters, miscellaneous polyethenoxy esters, polyethenoxy compounds with amide and miscellaneous linkages and various poly-hydroxy compounds; the cationic surfactants, e.g. the straight chain alkyl ammonium compounds, the cyclic alkylammonium cmpounds, the olefin-derived compounds, and the quarternary compounds derived from the same; the amphoteric surfactants e.g. those derived from betaines and phenolic substances; and the polymeric surface active agents set out in the said McCutcheon and Schwartz et al treatises. Typical examples of representative surfactants of these classes and combinations thereof are set forth in the Examples hereinafter, it being understood that said Examples are but illustrative and not restrictive of the invention, e.g. the recently available fluorocarbon surfactants have also been found effective, especially when used in small proportions with other less expensive surfactants, for both the micronizing steps and the emulsion polymerization steps. Typical of these fluorocarbon surfactants are the "Zonyl" trade-marked fluorocarbon surfactants of the DuPont Company, such as Zonyl A or P (anionic), Zonyl C. (cationic), Zonyl N (nonionic), and Zonyl B (amphoteric).

(3) Micronizing

The term "micronizing" as used herein connotes the physical reduction in particle size in a liquid medium of the organic color pigments materials by means of an appropriate grinding system, e.g. a ball mill or a sand mill, to the particle size desired in the step concerned, with the aid of a surface active system if needed to facilitate the grinding and inhibit agglomeration of the micronized particles into aggregate particles of larger size. Both ball mills and sand mills or sand grinders are well known to the pigment art and commercially available with instructions for their use. The balls in the case of a ball mill, or the sand or like grinding material in the case of the sand mill, are herein termed micronizing media.

(4) Monomer Materials

The monomer materials which may be used in practicing the present invention are the monomer compounds containing and emulsion polymerizable through one or more ethylenically unsaturated $>C = C<$ groups to form homopolymers, copolymers or grafted polymers to constitute the essentially transparent spheruloid particles embedding the color pigment entities therein.

Such compounds containing and polymerizable through a single one of such groups produce linear polymers unless copolymerized with cross-linking monomer, i.e., monomer containing a plurality of such groups which category for the purpose of this invention, includes not only polyvinyl, polyalkyl and vinyl-allyl monomers but also the drying oil substances emulsion copolymerizable with other ethylenically unsaturated compounds.

The polymer bodies embedding the pigment particles in accordance with this invention preferably are cross-linked to insolubility in all physical solvents, but with less advantage may be insoluble only in the intended environment of use. With these criteria for guidance, the monomer materials and emulsion polymerization procedures employable may be selected by one skilled in the art from any of those available. The fact of cross-linking to insolubility in all physical solvents enhances the utility in that it also renders the cross-linked particles infusible thus making the cross-linked material usable in any type of thermoplastic material.

Among the mono-ethylenically unsaturated monomers available for preparation of the improved pigment composition are monovinyl aromatic compounds such as styrene, the methyl styrenes, the ethyl styrenes, the dimethyl styrenes, the diethyl styrenes, the isopropyl styrenes and mixed alkyl styrenes; nuclear substituted vinyl aryl compounds where the substitution is alkyl, aryl alkyl, aralkyl, cycloalkyl, alkoxy, aryloxy, chloro, fluoro, chloromethyl, fluoromethyl and trifluoromethyl nuclear derivatives; halogenated derivatives of these various aromatic vinyl compounds such as the mono and dichloro styrenes; the alkyl substituted mono and dichloro styrenes; the vinyl napthalenes, e.g. methyl vinyl naphthalene and their halogenated derivatives; the vinyl aryl acids and vinyl alkyl acids such as acrylic acid and the alpha-alkyl substituted acrylic acids such as methacrylic acid, and esters of such acids as glycidyl, methyl, ethyl, propyl, butyl, isobutyl and other esters of aliphatic alcohols; the amides of acrylic and methacrylic acid and derivatives thereof such as the methacrylamides, acrylamides, N-methylacrylamides, N-N-diethylacrylamide, N-ethylmethacrylamide, N-N-dimethylmethacrylamide, etc.; the nitriles such as acrylonitrile, methacrylonitrile, ethylacrylonitrile, chloroacrylonitrile and other nitriles; the alkyl esters of alpha-ethylenic aliphatic dicarboxylic acids such as diethyl fumarate and diethyl-chloro maleate; the unsaturated ketones, methyl vinyl ketone and methyl isopropenyl ketone; the vinyl pyridines; the vinyl quinolines; vinyl furans; vinyl carbazoles, the esters of vinyl alcohols such as vinyl acetate; acetylamino substituted acrylic and methacrylic acids, and their esters, methyl, ethyl, propyl-and the like such as α-acetaminoacrylate and the α-n-butyraminoacrylates, etc.; the ethers of olefinic alcohols especially the ethers of vinyl and allyl type alcohols such as vinyl ethyl ether, vinyl butyl ether, vinyl tolyl ether, divinyl ether, methyl isopropenyl ether, methallyl ethyl ether; the unsaturated aldehydes such as acrolein and methacrolein and the like; the allyl and vinyl nitrogen ring compounds such as triallylcyanurate; copolymerizable alkenyl chlorides including methallyl chloride, allyl chloride, vinyl trichloride, vinylidene chloride, 1-chloro-1-fluoro ethylene and 4-chlorobutene-1; and the vinylidines.

Among the cross-linking or polyethylenically unsaturated monomers which may be used alone or in combination with other emulsion polymerizable ethylenically unsaturated compounds, are the polyvinyl, polyallyl and vinyl-allyl compounds such as polyvinyl aromatic compounds, for example divinylbenzene, divinyltoluene, divinylxyline, divinylethylbenzene, trivinylbenzene, divinylnapthalene, divinylmethylnapthalenes; the vinyl esters, allyl esters and vinyl allyl esters of carboxylic and polycarboxylic acids including polymerizable ester monomers such as diallyl maleate, vinylcrotonate, allyl methacrylate, allyl acrylate, ethylene glycol dimethacrylate, divinylsuccinate, divinyladipate, vinylacrylate, vinylmethacrylate; and drying oil substances. The copolymerizable "drying oils" which may be used as cross-linking agents include the unsaturated vegetables oils and the unsaturated fish oils which oils are capable of forming films by oxidation on exposure to air and further include these oils in their raw state, in bodied form and/or otherwise modified, as by air blowing. The term "drying oil substances" includes (1) the drying oils, especially those containing conjugated unsaturation e.g., tung oil, oiticica oil, isano oil, conjugated linseed oil, conjugated soya bean oils, fish oil, etc., (2) the air blown or bodied drying oils, whether from conjugated or nonconjugated drying oils and whether bodied by heat and/or catalytically, (3) the fatty acids including their dimers, trimers and tetramers derived from such drying or modified drying oils.

In preparing modified improved intrachromospheruloid pigment compositions by graft polymerization techniques, active sites may be provided by grafting with monomers such as butadiene, isoprene, piperyline, methyl pentadiene and/or other hydrocarbon dienes and also the polar dienes such as chloroprene and cyanobutadiene.

(5) Polymerization Initiator

Examples of suitable emulsion polymerization catalysts or initiators that may be used include water soluble catalysts such as the perborates, persulfates and perchlorates of potassium sodium and ammonia; which may be used with or without small amounts of heavy metal salts such as those of iron, cobalt, etc., with or without a reducing agent such as sodium bisulfite or metabisulfite, or the catalyst may be an inorganic peroxide such as barium peroxide, sodium peroxide, hydrogen peroxide; an aliphatic acyl peroxide such as acetyl peroxide, lauryl peroxide, stearyl peroxide; an aromatic acyl peroxide such as benzoyl peroxide, or phthaloyl peroxide; a mixed peroxide such as acetyl benzoyl peroxide, acetyl stearyl peroxide; organic aliphatic and aromatic azo compounds such as azobisisobutyronitrile and certain azo dye structures; or it may be a hydroperoxide such as cumene hydroperoxide or diisopropylbenzene hydroperoxide which is often used with a reducing agent such as tetraethylene pentamine and ferrous sulfate as a source of iron with sodium or potassium pyrophosphate to complex the iron.

Heat or radiation may also serve to initiate or facilitate emulsion polymerization.

A mercaptan such as dodecylmercaptan may sometimes be used in small amounts as a polymerization initiator, whereas in larger amounts it serves as a polymerization modifier; or aluminum salts such as the halides; organic and inorganic acids; metal compounds of the unsaturated acids such as cobalt and manganese resinates, linoleates and maleates may be used. The catalyst system chosen is only important insofar as it affects the rate of the polymerization reaction, always taking into account that the system chosen must not react unfavorably with the pigment or pigments being used.

(6) pH Adjustment

By pH adjustment is meant the addition of either acid or base to adjust the pH for micronizing to within the desired range which may be most efficient for the purpose in question, e.g. to be compatible with the pigmentary, monomeric, and/or surfactant materials being used. Preferred additives are the organic acids such as acetic, formic, hydroxyacetic to lower the pH, and ammonium hydroxide to raise the pH. Inorganic acids and/or bases may be used provided they do not form objectionable amounts of salts which would interfere with the process or attack the equipment being used.

(7) Polymerization Vessel

By polymerization vessel is meant any suitable vessel equipped with the necessary mechanical stirrer, temperature controls, and apertures for addition of reactants prior and during the polymerization step, constructed of suitable materials such as stainless steel or preferably glass lined to avoid contamination of the polymerization ingredients.

(8) Emulsion Polymerization

By the term emulsion polymerization is meant the polymerization in aqueous medium of polymerizable ethylenically unsaturated monomer or monomers, linear or cross-linking in nature, in such a manner that the polymer formed is a latex.

(9) INTRACHROMOSPHERULOID PIGMENT

The term "intrachromospheruloid pigment" as used herein designates spheruloids of essentially transparent polymer material, preferably cross-linked to essential insolubility in all physical solvents, and of an average particle size of not more than 4 microns, having embedded therein still smaller particles of organic color pigment. The transparent spheruloids of preferably cross-linked polymer, in any medium in which they are insoluble, preserve the attained particle size of the embedded organic color pigment material and enhance the hue and apparent strength of the same, thus providing a new and useful organic color pigment composition.

(10) Latex

By the term latex is meant the aqueous dispersion of the intrachromospheruloid pigment composition in which the intrachromospheruloid pigment particles are so small that they are essentially non-settling.

(11) Soft Powdering Agent(s)

The term soft powdering agent(s) or additive(s) as used herein connotes materials selected from the class consisting of aliphatic, cycloaliphatic and aromatic hydrocarbons and their alcohols having boiling points between 90° C. and 200° C. preferably the predominantly aliphatic hydrocarbon solvents of this class such as Solvent Naphtha, and Stoddard Solvent. Naphtha Solvent, or Solvent Naphtha is a mixture of low boiling hydrocarbons having a boiling point range of 90–165° C. obtained in the distillation of coal tar, petroleum or shale oil, and may contain appreciable portions of benzene or its homologues. Stoddard Solvent is a petroleum distillate with a minimum flash point of 100° F., 90% distillable at 375° F. with an end point of 410° F.

In accordance with this invention, said hydrocarbon materials are preferably applied in conjunction with an oil soluble surface active agent. The oil-soluble surface active agent is selected from that class of materials extensively defined by Schwartz, Perry and Berch in their book "Surface Active Agents and Detergents", Vol. II, Interscience Publishers, Inc., New York (1958), especially at pages 244–247 and pages 597–605, herein incorporated by reference. Such useful surface active agents include the dialkyl sulfosuccinates, the mahogany sulfonates, long chain (16–18 carbon atoms) alkyl aromatic sulfonates, dialkyl naphthalene sulfonic acids, esters of higher fatty acids, higher amine salts of naphthalene sulfonic acids, lanolin, lanolin fatty acids, naphthenic acids and their salts, glycol ethers, acyclic alcohols and keto alcohols, fatty alkylol amides and the sorbitan and polyethenoxy sorbitan nonionics.

(12) Soft Powder Products

The term "soft powder" or "soft powdered" intrachromospheruloid pigment as applied to products producible by the present invention connotes the physical characteristic resulting from the treatment herein disclosed of the aqueously wet, never previously dried, cross-linked insoluble intrachromospheruloid pigment with the aforesaid soft powdering agents before drying the same to a dry pigment product, i.e. the characteristic that the soft powdered dried product has such a soft form that it is in, or readily reduced to, a fine soft powder without any extended attrition, thereby being more readily dispersible in any medium than the same product not so treated. The mechanism accounting for this characteristic is not clearly understood, but it is believed that the hydrocarbon components of the soft powdering additives, which are carried on to the surfaces of the intrachromospheruloid pigment particles by means of the oil soluble surfactant components thereof subsequently removed in the wash water, inhibit hydrogen bridging between the intrachromospheruloid pigment particles by occupying the sites at which such could occur until after the elimination from the system of the aqueous phase, and thereafter are substantially removable at a more elevated temperature when their presence is not desired in the soft powdered product.

(13) Coagulant

By coagulant we mean any additive capable of destabilizing the emulsified system under consideration, for causing coagulation of its solids content; the coagulant used will of course vary depending largely on the type of system, i.e. the type of surfactant used and/or the functionality, if any, of the intrachromospheruloid polymer. For example, anionic systems may be coagulated with either acids such as acetic or formic, hydrochloric, sulfuric, alkaline earth metal salts, zinc and aluminum and other colorless ions of heavy metals, water soluble alcohols, or water insoluble amines preferably as their water soluble salts. Cationic systems may be coagulated with water insoluble acids, preferably as the water soluble alkali metal salts thereof and/or the water soluble amines thereof, and ammonium hydroxide or water soluble alcohols. Nonionic systems are often coagulated with water soluble alcohols with or without the addition of acids. Anionic latices of intrachromospheruloid pigment may also be coagulated by combining therewith cationic latices or substrate material surfaced with cationic polymer, and vice versa.

(14) Pigment Modifying Agent

The organic pigment material and/or intrachromospheruloid pigment material may be modified either physically or chemically by the addition or incorporation of modifying material during or following the micronizing step. For example the modifier may be a bonding agent to aid in bonding the organic pigment particles in the polymer spheruloids, or to aid the fixation of the intrachromospheruloid material to a substrate material. The modifying agent may comprise one or more of those substances or compounds which can be employed, although not essential to the process, to obtain certain specific advantages or modifications to the process or products thereof. Such substances may include nitrogenous material such as water soluble or insoluble amines, imines and polyamines and polyimines, added to the organic color pigment during the micronizing step to render it more oleophilic, and/or water soluble or dispersible condensation resin products or the components thereof, added during the micronizing or subsequent steps.

(15) Separation by Screening

Separation by screening, or conventional screening where employed in the Examples herein, connotes that the micronized color pigment is washed away from the micronizing medium and the screen with diluting liquid or a part thereof.

(16) 50% Divinylbenzene

The term 50% divinylbenzene as used herein denotes the commercially available product regarded as an approximately equal mixture of divinyl and mono-vinyl materials.

(17) Sub-pigmentary

The term sub-pigmentary as used hereinafter denotes organic color pigments reduced to an average particle size of 0.2 micron or less in diameter, which size is well below the conventional optimum pigmentary range, as heretofore noted.

(18) Microscopic Examination

The term microscopic examination as used in the Examples hereinafter denotes examination with an optical microscope, i.e. a Leitz "Ortholux" research microscope which is regarded as having a resolving power of 0.2 micron and a lower limit of visibility for well separated particles of 0.02 micron diameter, and average particle sizes herein set forth were determined accordingly.

DETAILED DESCRIPTION

Bearing in mind the foregoing, examples are herein set forth illustrative but not restrictive of the invention, and of the best modes known to applicants for practicing the same, the first group of Examples A–I setting forth detailed procedures for preparation of less preferred embodiments of the invention in latex form; the second group of Examples J–R setting forth detailed procedures for preparation of preferred embodiments of the invention in latex form; the tabulated Examples of Tables 1–21 further exemplifying the preferred mode of practicing the invention for producing the product in latex form; the Examples of tables 22–42 further exemplifying the less preferred modes of practicing the invention for producing a latex product; and Examples 1 et seq. illustrating modification and variants of the preceding Examples.

EXAMPLES A–I

Production of Non-cross-linked Intrachromospheruloid Pigment Compositions Typical Procedural Examples Example A (with single emulsifier)

Charge fifty-seven grams of copper polychlor phthalocyanine presscake (Pigment Green 7, CI No. 74260) containing 35% pigment solids to a sand grinding apparatus together with ten grams of sodium lauryl sulfate (Duponol ME) and two grams of a sodium salt of a condensed naphthalene sulfonic acid (Tamol SN). Add three hundred cc. of a grinding medium such as Ottawa sand together with sufficient water to adjust the solids content to between 20 and 25% pigment concentration by weight. Mill the charge until a representative sample shows essentially no visible particulate organic color pigment material greater than 0.2 micron in diameter on mocroscopic examination. After separation from the grinding medium e.g. by screening, charge the organic color pigment dispersion to a reaction vessel equipped for emulsion polymerization and adjust the volume to 500 cc. with additional water as required, such additional water containing 20 grams further of sodium lauryl sulfate (Duponol ME), then add one hundred grams of styrene monomer containing 3% by weight of azobisisobutyronitrile dissolved therein. Purge the system with nitrogen and heat the reaction vessel to 75 to 80° centigrade and maintain at this temperature under agitation for four to five hours.

On cooling, a highly colored dark green stable colloidal dispersion or latex is obtained. Microscopic examination of this latex reveals it to be composed of subpigmentary organic color pigment particles essentially embedded in polystyrene spheruloids which exhibit the green color of the organic color pigment particles, and the said spheruloids exhibit Brownian movement indicating their average particle size to not exceed 4 microns in diameter. This product may be used in the latex form for such applications as latex paint or textile printing formulations or it may be separated from the aqueous phase and be used wet as a concentrated presscake for the same purposes, or be used wet or dry in any compatible vehicle having a different refractive index from that employed in the intrachromospheruloid pigment itself and in which the intrachromospheruloid pigment will not dissolve.

Example B (with mixed emulsifier)

Charge one hundred and six grams of Vat Blue 6 (CI No. 69825) presscake containing 23.75% pigment solids to a sand grinding apparatus together with two grams of sodium lauryl sulfate (Duponol ME) and ten grams of an octylphenoxypolyethoxy ethanol (Triton X-305). Add three hundred cc. of a grinding medium such as Ottawa sand together with sufficient water to adjust the solids content to about 20%. Mill the charge until the organic color pigment material is so finely divided that it has an average particle size less than 0.2 micron on microscopic examination. After separation from the grinding medium by conventional methods, e.g., by conventional screening, charge the organic color pigment dispersion to a reaction vessel equipped for emulsion polymerization together with ten grams of a dihexyl ester of a sodium sulfosuccinic acid (Aerosol MA) and sufficient water to adjust the volume to 500 cc. Add one hundred grams of freshly distilled acrylonitrile and purge the system with nitrogen. Raise the temperature to 68 to 70° C. and slowly add a solution of 1.25 grams of potassium persulfate and 0.5 grams of sodium bisulfite in one hundred cc. of water over a two hour period, maintaining the reaction temperature at 68–70° C., under agitation. After the addition is complete the reaction vessel is held for a further hour under agitation at 68 to 70° C. and then allowed to cool to room temperature. A bright blue highly colored stable colloidal dispersion is obtained.

Microscopic examination of this colloidal dispersion or latex reveals it to be composed of the subpigmentary organic pigment particles essentially embedded in transparent polyacrylonitrile spheruloids of primary particle size not exceeding 4 microns in diameter, which spheruloids exhibit the blue color of said organic color pigment particles and show Brownian movement.

The product may be used as described in Example A.

Example C (with mixed polymeric and nonpolymeric emulsifiers)

Charge to a ball-mill one hundred and twenty-five grams of Vat Red 1 (CI No. 73360) presscake containing 40% pigment solids, together with two grams of an ammonium salt of a condensed naphthalene sulfonic acid (Tamol SN) and ten grams of the sodium salt of a polymeric carboxylic acid (Tamol 731). Sufficient water is added to bring the pigment solids content to between 20 and 25%. Ball-mill the charge until the organic color pigment material is so finely divided that a representative sample shows essentially no visible particulate matter greater than 0.2 microns on microscopic examination. Separate the organic color pigment dispersion from the grinding medium and charge a representative portion containing 20 grams of organic color pigment solids to a reaction vessel equipped for emulsion polymerization together with twenty-five grams of sodium lauryl sulfate (Duponol ME) dissolved in seventy-five cc. of water. The charge is adjusted to a total volume of five hundred cc. with water, and one hundred grams of a monomer mixture containing sixty grams of styrene and forty grams of methyl methacrylate, in which is dissolved 3% by weight of azobisisobutyronitrile, are added. Purge the system with nitrogen and rapidly raise the temperature to 70–75° C. and hold in this temperature range for four hours. On cooling a brilliant red stable colloidal dispersion or latex is obtained with a slight orange fluorescence. Microscopic examination reveals this latex to be composed of subpigmentary organic color pigment particles essentially embedded in transparent copolymer of styrene and methyl methacrylate spheruloids which exhibit the red color of said particles, and that said spheruloids exhibit Brownian movement.

The product may be used in the manner described in Example A.

Example D (with co-micronized wet organic color pigments)

Charge mixture of one hundred grams of Vat Yellow 1 (CI No. 70600) presscake containing 35% pigment solids and one hundred grams of Vat Green I (CI No. 59825) presscake containing 15% pigment solids (a dark green pigement) to a sand milling apparatus together with five grams of sodium lauryl sulfate (Duponol ME)

and two grams of a sodium salt of a condensed naphthalene sulfonic acid (Tamol SN). Add three hundred cc. of a grinding medium such as Ottawa sand together with sufficient water to adjust the pigment solids content to around 20%. Mill the charge until a representative sample under microscopic examination shows essentially no visible particulate matter greater than 0.2 microns. Separate the organic color pigment dispersion from the grinding medium by conventional screening and charge a representative portion thereof containing 25 grams by weight of organic color pigment material to a reaction vessel equipped for emulsion polymerization together with twenty-five grams of sodium lauryl sulfate (Duponol ME) dissolved in sufficient water to raise the total volume of the charge to 500 cc. Add one hundred grams of methylmethacrylate monomer containing 3% by weight of azobisisobutyronitrile dissolved therein and purge the system with nitrogen. Rapidly raise the temperature to 70-75° C. and hold in this temperature range for three and a half to four hours.

On cooling a bright yellowish green stable colloidal dispersion or latex is obtained. Microscopic examination reveals this latex to be made up of sub-pigmentary organic pigment particles essentially embedded in transparent methylmethacrylate polymer spheruloids which exhibit the yellow green color of said mixed organic particles, and that said spheruloids exhibit Brownian movement. There is no evidence under microscopic examination of any individual dark green or yellow organic pigment color particles.

The product may be used as described in Example A.

Example E (using dry organic color pigment)

Charge fifty grams of Pigment Violet 19 (Color Index Number (CI No. 46500) available as a dry 100% powder, to a sand grinding apparatus together with two hundred and fifty cc. of water, three hundred cc. of a grinding medium such as Ottawa sand, two grams of sodium lauryl sulfate (Duponol ME) and five grams of a sodium salt of a polymeric carboxylic acid (Tamol 731). Mill the charge until a representative sample under microscopic examination shows essentially no visible particulate matter greater than 0.2 micron.

After separation from the grinding medium by conventional screening, charge a portion of the organic color pigment dispersion containing 20 grams of organic pigment material, dry basis by weight, to a reaction vessel equipped for emulsion polymerization, together with twenty-five grams of sodium lauryl sulfate (Duponol ME) dissolved in sufficient water to adjust the total volume of the charge to 500 cc. Add one hundred grams of styrene monomer and purge the system with nitrogen. The reaction temperature is raised to 65-70° C. and one hundred cc. of an aqueous solution containing 1.5 grams of potassium persulfate and 0.5 grams of sodium bisulfite are added during one hour. The reaction temperature is 65-70° C. for four to six hours after the catalyst addition is complete.

On cooling a brilliant pink stable colloidal dispersion or latex is obtained. Microscopic examination reveals this to be made up of sub-pigmentary organic pigment particles essentially embedded within transparent polystyrene spheruloids which exhibit the pink color of said organic color pigment particles and that said spheruloids exhibit Brownian movement.

The product may be used as described in Example A.

Example F (using co-micronized initially dry organic color pigments

Charge twenty-five grams of Pigment Red 53 (CI No. 15585) and twenty-five grams of Pigment Yellow 14 (CI. No. 21095) both available as 100% dry pigment colors, to a sand grinding apparatus together with three hundred cc. of a grinding medium such as Ottawa sand, twenty-five grams of an octylphenoxy polyethoxy ethanol (Triton X-405), two grams of a sodium salt of a sulfonated naphthalene formaldehyde condensate (Tamol SN) and two hundred cc. of water.

Mill the charge until a representative sample under microscopic examination shows essentially no visible particulate matter greater than 0.2 micron.

After separation from the grinding medium (e.g. by conventional screening) charge half of the organic color pigment dispersion containing twenty-five grams of organic color pigment solids to a reaction vessel equipped for emulsion polymerization together with 90 grams of the sodium salt of sulfated alkylphenoxypoly (ethylene oxide) ethanol (Alipal Co-433) and sufficient water to adjust the volume to 400 cc. Add one hundred parts of a monomer mixture consisting of eighty-five grams of styrene and fifteen grams of cyclohexyl methacrylate; having 3% by weight of azobisisobutyronitrile dissolved therein and purge the system with nitrogen. Raise the reaction temperature to 70° C. and hold there for three to four hours.

On cooling a briliant orange stable colloidal dispersion or latex is obtained. Microscopic examination reveals this to be made up of sub-pigmentary organic pigment particles essentially embedded within transparent spheruloids of styrene/cyclohexyl methacrylate copolymer which exhibit the orange color of the mixed organic color pigment particles, and that said spheruloids exhibit Brownian movement. Under said examination there is no evidence of individual red or yellow organic color pigmentary materials. The product may be used as described in Example A.

Example G (with acidic graft polymer).

Charge one hundred and fifty-two grams of Pigment Violet 23 (CI No. 51319) presscake, 33% pigment solids, to a ball-mill together with one hundred and eighty grams of a sodium salt of a sulfate ester of an alkylphenoxy poly(ethylene oxide) ethanol (Alipal CO-433) and sufficient water to bring the pigment solids content to about 25%. Ball mill the charge until a representative sample under microscopic examination shows essentially no visible particulate matter greater than 0.2 micron. Charge the organic color pigment solution after screening out the grinding medium to reaction vessel equipped for emulsion polymerization together with two hundred grams of styrene monomer containing 2% by weight of cumene hydroperoxide dissolved therein. Purge the system with nitrogen and raise the reaction temperature to 68-72° C. and maintain there for eight to ten hours. Then cool the reaction vessel to 35-40° C. and add twenty-five grams of methacrylic acid. Allow the reactor to stir for two hours at ambient temperature to ensure complete absorption of the grafting monomer by the polymer/pigment particles and then raise the temperature to 68-72° C. and add a solution of 0.5 grams of ammonium persulfate and 0.25 grams of sodium bisulfite in fifty cc. of water during one hour. Maintain the reactor temperature at 68-72° C. for four to five hours longer and then allow to cool.

A deep reddish violet stable colloidal dispersion or latex is obtained, which, on microscopic examination shows no evidence of free polymer particles, but rather particles of polymer that have Brownian movement and which exhibit the violet color of the organic pigment evidencing the inclusion of the sub-pigmentary organic pigment therein. The product may be used as described in Example A, and is especially adapted by the fact that it contains active acidic groups. Thus this intrachromospheruloid pigment may be chemically attached to compounds or substrate material containing basic groups.

Example H (with basic polymer)

Charge 139 grams of a copper phthalocyanine blue, Pigment Blue 15:3, (CI No. 74160) presscake of 36% pigment solids to a sand milling apparatus together with 300 cc. of a grinding medium such as Ottawa sand. 10 grams of a 20% solution of the acetic acid salt of N-tallow trimethylene diamine (Duomeen T) and 10 grams of a quaternary derivative of a substituted imidazoline (Monaquat TIBC) are added together with sufficient water to reduce the pigment solids content to about 25%. The charge is milled until a representative sample under microscopic examination shows essentially no visible particulate matter greater than 0.2 micron.

Separate the organic color pigment dispersion from the grinding medium by conventional screening and charge to a reaction vessel equipped for emulsion polymerization. Add 100 grams of a 20% solution of the acetic acid salt of N-tallow trimethylene diamine (Duomeen T), and then adjust the volume to 500 cc. with water. Then add 100 grams of a monomer mixture consisting of 85 grams of styrene and 15 grams of 4-vinyl-pyridine and purge the system with nitrogen. Raise the temperature to 65°–67° C. and slowly add an aqueous solution of 3.0 grams of potassium persulfate and 1.5 grams of sodium bisulfite in 200 cc. of water during one hour. After addition of the catalyst solution is completed maintain the temperature at 65°–67° C. for four hours and then allow to cool.

A bright blue stable colloidal dispersion or latex is obtained. Microscopic examination shows this to be made up of sub-pigmentary organic color pigment particles essentially embedded in transparent spheruloids of polymer which exhibits the blue color of the organic color pigment, and that said spheruloids exhibit Brownian movement.

The product may be used as described in Example A, and as it contains functional amine groups it may be chemically attached to acidic compounds. Also, the latex may be coagulated with anionic surfactant, e.g. Duponol ME (sodium lauryl sulfate), for filtration and washing to form a presscake product, since it contains a cationic emulsifier.

Example I (with acidic polymer and co-micronized organic color pigments

Charge 100 grams of Vat Red 1 (CI No. 73360) presscake of 40% pigment solids and 50 grams of Vat Yellow 1 presscake (CI No. 70600) containing 20% pigment solids, to a sand milling apparatus together with 300 cc. of a grinding medium such as Ottawa sand. 10 grams of sodium lauryl sulfate (Duponol ME) and 10 grams of a sodium salt of a polycarboxylic acid (Tamol 731) are added together with sufficient water to reduce the pigment solids content to about 25%. Mill the charge until a representative sample under microscopic examination shows essentially no visible particulate matter greater than 0.2 micron. After separation from the grinding medium e.g. screening, charge the organic color pigment dispersion to a reaction vessel equipped for emulsion polymerization together with a solution of 25 grams of sodium lauryl (Duponol ME) and 10 grams of a sodium salt of a polymeric carboxylic acid (Tamol 731) with sufficient water to adjust the total volume of the charge to 500 cc. Add 100 grams of a monomer mixture of 80 grams of styrene, 10 grams of acrylonitrile and 10 grams of acrylic acid containing 3% by weight of azobisisobutyronitrile dissolved therein and purge the system with nitrogen. Raise the temperature to 75°–80° C. and maintain this temperature range for five hours. On cooling a bright orange red latex is obtained. Microscopic examination shows this to be made up of subpigmentary organic color pigment particles essentially embedded in transparent polymer spheruloids, that these intrachromospheruloid pigment particles exhibit Brownian movement, and that they exhibit the color of the organic color pigment particle mixture.

The product may be used as described in Example A. Because of the presence of acidic groups the polymeric pigment compound will further co-act with either basic compounds or substrates, for coagulation or other purposes.

In this example, as in other examples herein, either or both of the color pigments employed in presscake form, may be replaced by the counterparts thereof in dry pigment form with appropriate water adjustment, e.g. Vat Red 1 by Pigment Red 181 and/or pigment Vat Yellow 1 by Pigment Yellow 24, with essentially identical results.

EXAMPLES J–R

Production of Various Crosslinked Essentially Insoluble Intrachromospheruloid Pigments — Typical Procedural Examples Example J (with crosslinked graft polymer).

The procedure of Example G is repeated with the sole exception that 50% divinylbenzene is used for the grafting monomer, instead of methacrylic acid.

The product of this example differs from that of Example G in that the crosslinked intrachromospheruloid pigment particles are not soluble in or affected by the action of organic solvents and in that it does not contain acidic groups. Apart from other usages, on removal of the aqueous phase, e.g. by alcohol coagulation, filtration and drying and/or by spray drying, an excellent intrachromospheruloid pigment color for thermoplastics is obtained, which not only utilizes the color pigment more efficiently, but also, being cross-linked and infusible, can be utilized in the coloration of thermoplastics without adversely affecting their working characteristics.

Example K (with cross-linked copolymer).

Charge one hundred and fifty grams of Vat Green I (CI No. 59825) presscake, 20% pigment solids, to a sand grinding apparatus together with three hundred cc. of a grinding medium such as Ottawa sand, and ten grams of sodium lauryl sulfate (Duponol ME).

Mill the charge until the organic color pigment material is so finely divided that a representative sample shows essentially no visible particulate matter on microscopic examination greater than 0.2 micron. Then separate from the grinding medium e.g. by conventional screening, and charge the organic color pigment dispersion to a reaction vessel equipped for emulsion polymerization and adjust the volume to 500 cc. with water after adding a further twenty-five grams of sodium lauryl sulfate (Duponol ME) in aqueous solution. Add one hundred grams of a monomer mixture containing eighty grams of styrene and twenty grams of 50% divinylbenzene, the whole containing 3% by weight of azobisisobutyronitrile dissolved therein, and purge the system with nitrogen. Raise the temperature to 75–80° C. and hold there for five hours. On cooling a deep bluish green stable colloidal dispersion or latex is obtained. Microscopic examination reveals this to be composed of subpigmentary organic pigment particles essentially embedded in transparent spheruloids of styrene-divinyl benzene copolymer said spheruloids exhibiting Brownian movement. This product is insoluble in organic solvents due to the cross-linked nature of the copolymer structure.

This product may be used as described in Examples A and J, and for other purposes for which an insoluble intrachromospheruloid pigment is desirable.

Example L (with co-micronized organic color pigments and cross-linked basic copolymers)

Charge seventy-two grams of a copper polychlor phthalocyanine, Pigment Green 7, (CI No. 74260) presscake, 35% pigment solids, and fifteen grams of Pigment Yellow 14, (CI No. 21095) as dry 100% material, to a ball-mill together with five grams of sodium lauryl sulfate (Duponol ME) two grams of the sodium salt of a condensed naphthalene sulfonic acid (Tamol SN) and five grams of a polymeric carboxylic acid (Tamol 731) together with sufficient water to reduce the pigment solids content to about 25%.

Mill the charge until the organic color pigment material is so finely divided that a representative sample shows essentially no particulate matter on microscopic examination greater than 0.2 micron. Separate from the grinding medium by screening and charge the organic color pigment dispersion to a reaction vessel equipped for emulsion polymerization and adjust the volume to 500 parts with water after adding a further thirty grams of sodium lauryl sulfate (Duponol ME) in aqueous solution. Add one hundred grams of a monomer mixture containing seventy grams methyl methacrylate, ten grams of cyclohexyl methacrylate, ten grams of dimethylaminoethylmethacrylate and ten grams of ethyleneglycol dimethacrylate; the whole having dissolved therein 3% by weight of azobisisbutyronitrile. Purge the reaction vessel with nitrogen, raise the temperature to 75–80° C. and hold there for four to five hours. On cooling a bright green stable colloidal dispersion or latex is obtained.

Microscopic examination shows this to be composed of sub-pigmentary organic pigment particles essentially embedded within transparent copolymer spheruloids which exhibit the bright green color of the mixed organic color pigments and that said spheruloids exhibit Brownian movement. Under said examination there is no evidence of individual dark green or yellow organic pigmentary particles. This latex product contains both acidic groups derived from the polymeric emulsifier and amino groups from the dimethylaminoethylmethacrylate monomer used. It is also cross-linked by virtue of the use of the ethyleneglycol dimethacrylate to insolubility in organic solvents and may be used as in the preceding examples.

Example M (with co-micronized organic color pigments, polymeric emulsifier, and cross-linked copolymer)

Charge fifty grams of a copper phthalocyanine Pigment Blue 15:3 (CI No. 74160) presscake, 35% pigment solids and seven and a half grams of Pigment Violet 23, (CI No. 51319) available as a dry 100% pigment color, to a ball-mill together with ten grams of sodium lauryl sulfate (Duponol ME) and ten grams of the sodium salt of a polymeric carboxylic acid (Tamol 731). Add sufficient water to reduce the solids content of the charge to around 25% pigment solids and mill until the organic color pigment material is so finely divided that a representative sample shows essentially no visible particulate matter on conventional microscopic examination and hence has essentially all of its particles below 0.02 micron. Separate the colloidal pigment dispersion from the grinding medium by conventional means such as screening and charge it to a reaction vessel equipped for emulsion polymerization. Add twenty-five grams of the ammonium salt of a polymeric emulsifier manufactured from the copolymerization of styrene, acrylonitrile and methacrylic acid together with ten grams of sodium lauryl sulfate (Duponol ME) in aqueous solution, and add water to adjust the total volume of the charge to 500 cc. Add one hundred grams of a monomer mixture containing eighty grams of styrene and twenty grams of 50% divinyl benzene with 3% by weight of azobisisobutyronitrile dissolved therein, and purge the system with nitrogen. Raise the temperature to 75–80° C. and hold at this range for 3½ to 4 hours.

On cooling a bright reddish navy blue latex is obtained. Conventional microscopic examination discloses essentially no particulate material, hence the latex particles are essentially all below 0.02 micron in size. A sample on coagulation with alcohol/acid shows no evidence under the microscope of any disassociation of the components into separate component organic color pigment entitles. On isolating and drying the intrachromospheruloid pigment is unaffected by any physical solvent.

The latex can be stored long periods without deterioration and may be used as described in Examples A and J and for other purposes for which an insoluble intrachromospheruloid pigment is desirable.

Example N (with crosslinked copolymer)

Charge one hundred and forth-two grams of copper phthalocyanine, Pigment Blue 15:13 (CI No. 74160) presscake, 35% pigment solids, to a sand grinding apparatus together with three hundred cc. of a grinding medium such as Ottawa sand. Add twenty-five grams of a sodium salt of a sulfate ester of an alkylphenoxypoly(ethyleneoxy)ethanol (Alipal CO-433) and two grams of an acetic acid salt of a N-Tallow trimethylene diamine (Duomac T) together with sufficient water to reduce the pigment solids content to around 25%.

Mill the charge until the organic color pigment material is so finely divided that a representative sample shows essentially no visible particulate matter on conventional microscopic examination and hence has essentially all of its particles below 0.02 micron. Separate the colloidal pigment dispersion from the grinding medium by conventional screening and charge it to a reaction vessel equipped for emulsion polymerization. Add ninety more grams of a sodium salt of a sulfate ester of an alkylphenoxypoly(etheleneoxy)ethanol (Alipal CO- 433), and adjust the total volume of the charge to five hundred parts with water.

Add one hundred grams of a mixture of 98 grams of styrene monomer and 2 grams of citicica oil containing 3% by weight of azobisisobutyronitrile dissolved therein and purge the system with nitrogen. Raise the reaction temperature to 78 to 80° C. and hold there for four hours.

On cooling a bright blue latex is obtained which is stable to storage and shows essentially on visible particulate material on conventional microscopic examination.

The latex product may be stored for long periods without settling or agglomeration occuring, and may be used as described in Example M.

Example O (with co-micronized organic color pigments and basic cross-linked copolymer)

Charge one hundred and fifty grams of Perylene Red, Vat Red 29 (CI No. 71140) presscake containing 28% pigment solids and twenty-five grams of Pigment Violet 23 (CI No. 51319) presscake containing 32.8% pigment solids, to a sand grinding apparatus together with three hundred cc. of a grinding medium such as Ottawa sand. Add ninety grams of a sodium salt of a sulfate ester of an alkylphenoxy (polyetheneoxy)ethanol (Alipal Co. 433) containing 28% active ingredients together with two grams of a sodium salt of a condensed naphthalene sulfonic acid. Add sufficient water to reduce the pigment solids content to about twenty-five percent and mill the charge until the organic color pigment material is so finely divided that a representative sample shows essentially no particulate matter on conventional microscopic examination, and hence has essentially all of the particles below 0.02 micron. Separate the color from the grinding medium by screening and charge the colloidal pigment dispersion to a reaction vessel equipped for emulsion polymerization.

Add ninety grams more of a 28% active solution of a sodium salt of a sulfate ester of alkylphenoxypoly(ethyleneoxy)ethanol (Alipal CO-433) and adjust the volume of the charge to 600 cc. with water. Add two hundred grams of a monomer mixture containing 160 grams of methylmethacrylate, 20 grams of 4-vinyl pyridine and 20 grams of ethyleneglycol dimethacrylate, the whole having 3% by weight of azobisisobutyronitrile dissolved therein. Purge the system with nitrogen and raise the reaction temperature 75-80° C. and hold there for four to five hours. On cooling a deep red violet latex is obtained which shows essentially no visible particulate matter and no color separation on conventional microscopic examination, and is stable to prolonged storage. It may be used as described in Example M.

In this example, as in other examples herein, either or both of the color pigments employed in presscake form may be replaced by the counterparts thereof in dry pigment form with appropriate water adjustments, e.g. Pigment Red 190 (CI No. 71140) and Pigment Violet 23 (CI No. 51319).

Example P (with hue deepening component)

The procedure of Example J is followed with the exception that in addition to the Pigment Violet 23 presscake (CI No. 51319) is charged 3 grams of a hue deepening component Pigment Black 6 (CI No. 77266). A very pronounced deepening of the hue of the violet intrachromospheruloid pigment is obtained with no apparent dulling such as would be encountered in a physical mixture of the said organic pigmentary components.

Example Q (with hue deepening component)

The procedure of Example N is followed with the exception that in addition to the Pigment Blue 15:13 presscake (CI No. 74160) is charged 5 grams of a hue deepening component, Pigment Black 7 (CI No. 77266). A very deep navy blue intrachromospheruloid pigment is obtained with no apparent dulling such as would be encountered in a physical mixture of said organic pigmentary components.

Example R (with hue deepening component)

The procedure of Example O is followed with the exception that in addition to the Vat Red 29 (CI No. 71140) and Pigment Violet 23 (CI No. 51319) is charged 1 gram of a hue deepening component, Pigment Black 7 (CI No. 77266) A very dark red intrachromospheruloid pigment is obtained with no apparent dulling such as would be encountered in a physical mixture of said organic pigmentary components.

In the examples given above and hereinafter, a particular point of distinction between the preferred cross-linked embodiments of the invention and the less preferred noncross-linked embodiments is that the cross-linking renders the spheruloids not only insoluble in physical solvents, but also nonfusible. Thus the preferred embodiments are particularly adapted for coloring plastic melts before extrusion, as the infusibility assures integrity of the spheruloids under extrusion temperatures and insures against any alteration of the flow characteristics of the melt, which may be caused by softening of the spheruloids in the case of the less preferred embodiments. In addition, the cross-linking of a polymer increases its density and thus increases its refractive index to a degree. Therefore the cross-linking, as well as the choice of monomer materials used, aids in adapting the product to have the necessary difference in refractive index from that of a vehicle in which it is intended to be used, particularly when the vehicle has a density or refractive index only slightly below that of the corresponding noncross-linked spheruloids.

Whether the spheruloids are cross-linked or non-cross-linked, their uniformity in size and spheruloidal nature particularly adapt them for use in electrostatic coating systems, and by controlling the polymerization conditions as above exemplified the size of the spheruloids may be maintained within specified limits adapting them for gloss or matte finishes or for special purposes as desired.

The following tabular Examples further exemplify the application of the procedures hereinabove set forth, and give the proportions of ingredients in grams in the order of their addition, and the order of the processing operations, as well as the nature of the products produced thereby.

In the Examples herein set forth, the product from the polymerization step was determined by microscopic examination to be in spheruloids of less than 4.0 microns average diameter, and there noted, was essentially non-settling, i.e. a latex.

TABLE I

Preparation of Aqueous Dispersion of Intrachromospheruloid Pigment Composition (Parts by weight)

| Example No. 1 | −1 | −2 | −3 | −4 | −5 |
|---|---|---|---|---|---|
| A. Micronizing Step | | | | | |
| 1. Pigment | | | | | |
| Pigment Class | | | Phthalocyanine | | |
| Trade Name | Heliogen Blue EG Presscake | Heliogen Green A | Polymon Blue G | Paymosky Blue G | Fastolux Green Y Presscake |
| Color Index Name | Blue 15 | Green 7 | Blue 16 | Green 37 | Green 36 |
| Color Index Number | 74160 | 74260 | 74100 | 74255 | 74160 |
| Pigment, dry basis | 20 | 20 | 30 | 20 | 50 |
| Presscake, % solids | 35 | — | — | — | 30 |
| Presscake, wet | 57 | — | — | — | 167 |
| 2. Surface Active Agent* | | | | | |
| Material (Trade Name) | | | | | |
| Alipal CO-433[1] | 78 | 178 | — | — | — |
| Tamol SN[2] | — | 1 | — | 2 | 1 |
| Duomeen T[3] | — | 1 | 30 | — | — |
| Tallow soap[4] | — | — | — | 35 | 30 |
| Duponal ME[5] | — | — | — | — | 2 |
| Zonyl FSN[6] | 1 | — | — | — | 1 |
| 3. Water | | | | | |
| Quantity | 164 | 230 | 210 | 330 | 149 |
| 4. Micronizing Slurry | | | | | |
| Medium | sand | sand | sand | sand | sand |
| 5. Micronizing | | | | | |
| Time, hrs. approx | 48 | 48 | 48 | 48 | 48 |
| Temperature, °C. | 28 | 28 | 28 | 28 | 28 |
| Average Particle Size | | | | | |
| Diameter (microns) | <0.02 | <0.2 | <0.2 | <0.2 | <0.02 |
| 6. Separation | | | | | |
| Screening (X) | X | X | X | X | X |
| 7. Water Dilution | 100 | 70 | 130 | 113 | 100 |
| 8. Yield | | | | | |
| Aq. Pig. Disp. | 400 | 500 | 400 | 500 | 450 |
| B. Polymerization Step | | | | | |
| 9A. Surface Active Agent* | | | | | |
| a. Quantity, Type | 100[1] | — | 100[3] | — | 25[5] |
| b. Quantity, Type | — | — | — | — | — |
| Water | — | — | — | — | 25 |
| 9B. Monomer Material (non-crosslinking) | | | | | |
| Styrene | 96 | 91 | 85 | — | — |
| Cyclohexylmethacrylate | — | — | — | 93 | 77.9 |
| Methacrylic Acid | — | 5 | — | — | 4.3 |
| 4-vinylpyridine | — | — | 10 | — | — |
| Dimethylaminoethyl-methacrylate | — | — | — | — | 7.8 |
| 9C. Monomer Material (crosslinking) | | | | | |
| Divinylbenzene (50%) | 4 | 4 | — | 2 | — |
| Allyl Acrylate | — | — | — | 5 | — |
| EGDMA[7] | — | — | 5 | — | 10 |
| 9D. Polymerization Initiator | | | | | |
| AZDN[8] | 3 | 3 | 4 | 4 | 4 |
| 10. Polymerization Conditions | | | | | |
| Time, hrs. approx. | 5 | 5 | 5 | 5 | 5 |
| Temperature, °C. | 80 | 80 | 80 | 80 | 80 |
| Conversion | | | | | |
| approx. 100% (X) | X | X | X | X | X |
| 11. Intrachromospheruloid Pigment Comp. (latex) | | | | | |
| Yield | 600 | 600 | 600 | 600 | 600 |
| Essentially non-settling (X) | X | X | X | X | X |

*Capable of effecting emulsion polymerization
[1] sodium salt of a sulfate ester of an alkylphenoxy poly(ethyleneoxy)ethanol (28% active)
[2] sodium salt of condensed naphthalene sulfonic acid
[3] N-tallow trimethylene diamine (20% solution as diacetate)
[4] sodium salt of hydrogenated tallow
[5] sodium lauryl sulfate
[6] fluorochemical surface active agent (100% active)
[7] ethyleneglycoldimethacrylate
[8] azobisisobutyronitrile

TABLE 2

Preparation of Aqueous Dispersion of Intrachromospheruloid Pigment Composition (Parts by weight)

| Example No. 2 | −1 | −2 | −3 | −4 | −5 |
|---|---|---|---|---|---|
| A. Micronizing Step | | | | | |
| 1. Pigment | | | | | |
| Pigment Class | | | Quinacridone | | |
| Trade Name | Monastral Red B | Monastral Red Y | Fastelux Magenta | — | Quinacridene Magenta Presscake |
| Color Index Name | Violet 19 | Violet 19 | Red 122 | Red 192 | Red 122 |
| Color Index Number | 46500 | 46500 | — | — | — |

TABLE 2-continued

Preparation of Aqueous Dispersion of Intrachromospheruloid Pigment Composition (Parts by weight)

| Example No. 2 | −1 | −2 | −3 | −4 | −5 |
|---|---|---|---|---|---|
| Pigment, dry basis | 30 | 40 | 50 | 20 | 40 |
| Presscake, % solids | — | — | — | — | 25 |
| Presscake, wet | — | — | — | — | 160 |
| 2. Surface Active Agent* | | | | | |
| Material (Trade Name) | | | | | |
| Alipal CO-433[1] | 178 | — | — | — | — |
| Zonyl FSH[2] | — | 1 | — | 1 | 1 |
| Santomerse ME[3] | — | 20 | — | — | — |
| Daxad 11[4] | — | — | 20 | — | — |
| Deriphat 154[5] | — | — | — | 20 | — |
| Duponol ME[6] | — | — | — | 5 | — |
| Duomac C[7] | — | — | — | — | 20 |
| Triton X-405[8] | — | — | 30 | — | 6 |
| 3. Water | | | | | |
| Quantity | 122 | 211 | 182 | 231 | 113 |
| 4. Micronizing Slurry | | | | | |
| Medium | sand | ball | sand | sand | sand |
| 5. Micronizing | | | | | |
| Time, hrs. approx. | 48 | 60 | 48 | 48 | 48 |
| Temperature, °C. | 28 | 28 | 28 | 28 | 28 |
| Average Particle Size | | | | | |
| Diameter (microns) | <0.2 | <0.2 | <0.2 | <0.02 | 0.02 |
| 6. Separation | | | | | |
| Screening (X) | X | X | X | X | X |
| 7. Water Dilution | 170 | 128 | 118 | 123 | 100 |
| 8. Yield | | | | | |
| Aq. Plg. Dis. | 500 | 400 | 400 | 400 | 400 |
| B. Polymerization Step | | | | | |
| 9A. Surface Active Agent* | | | | | |
| a. Quantity, Type | — | 50[8] | 20[6] | 25[6] | 40[8] |
| b. Quantity, Type | — | — | — | — | — |
| Water | — | 50 | 80 | 75 | 60 |
| 9B. Monomer Material | | | | | |
| (non-crosslinking) | | | | | |
| Vinyltoluene | 90 | — | — | — | — |
| Acrylonitrile | 5 | — | — | — | — |
| Methylmethacrylate | — | 80 | — | 85 | 75 |
| Butylacrylate | — | — | 90 | — | — |
| Hydroxyethyl-methacrylate | — | 10 | — | — | — |
| Acrylic Acid | — | — | — | 5 | — |
| Dimethylaminoethyl-methacrylate | — | — | — | — | 15 |
| 9C. Monomer Material (crosslinking) | | | | | |
| Divinylbenzene (50%) | 5 | — | 10 | — | — |
| EGDMA[9] | — | 5 | — | 10 | 10 |
| Allyl Acrylate | — | 5 | — | — | — |
| 9D. Polymerization Initiator | | | | | |
| AZDN[10] | 3 | 4 | 4 | 4 | 4 |
| 10. Polymerization Conditions | | | | | |
| Time, hrs. approx. | 4 | 4 | 4 | 4 | 4 |
| Temperature, °C. | 80 | 80 | 80 | 80 | 80 |
| Conversion | | | | | |
| Approx. 100% (X) | X | X | X | X | X |
| 11. Intrachromospheruloid Pigment Comp. (latex) | | | | | |
| Yield | 600 | 600 | 600 | 600 | 600 |
| Essentially non-settling (X) | X | X | X | X | X |

*Capable of effecting emulsion polymerization
[1] sodium salt of a sulfate ester of an alkylphenoxy poly(ethyleneoxy) ethanol (28% active)
[2] flurochemical surface active agent (100% active)
[3] linear dodecylbenzene sodium sulfonate (58% active)
[4] polymerized sodium salts of alkyl naphthalene sulfonic acid (87% active)
[5] disodium salt of N-tallow beta amino dipropionate
[6] sodium lauryl sulfate
[7] N-cocoa trimethylene diaminediacetate
[8] octylphenoxy polyethoxy ethanol
[9] ethyleneglycoldimethacrylate (70% active)
[10] azobisisobutyronitrile

TABLE 3

Preparation of Aqueous Dispersion of Intrachromospheruloid Pigment Composition (Parts by weight)

| Example No. 3 | −1 | −2 | −3 | −4 | −5 |
|---|---|---|---|---|---|
| A. Micronizing Step | | | | | |
| 1. Pigment | | | | | |
| Pigment Class | Azamethine (Tetrachloroisoindolines) | | | | |
| Trade Name | Irgazin Yellow 3RLT | Irgazin Yellow 2GLT | Irgazin Orange RLT | Irgazine Red 2BLT | Irgazin Yellow 3RLT |
| Color Index Name | Yellow 110 | Yellow 109 | Orange 42 | Red 180 | Yellow 110 |
| Color Index Number | — | — | — | — | — |
| Pigment, dry basis | 25 | 40 | 30 | 40 | 30 |
| Presscake, % solids | 30 | — | — | — | — |

TABLE 3-continued

Preparation of Aqueous Dispersion of Intrachromospheruloid Pigment Composition

| Example No. 3 | −1 | −2 | −3 | −4 | −5 |
|---|---|---|---|---|---|
| | (Parts by weight) | | | | |
| Presscake, wet | 84 | — | — | — | — |
| 2. Surface Active Agent* | | | | | |
| Material (Trade Names) | | | | | |
| Alipal CO-433[1] | 50 | 89 | — | — | — |
| Tamol SN[2] | 2 | 2 | — | — | — |
| Dowfax 2A1[3] | — | — | 20 | — | — |
| Emkal NNS[4] | — | — | — | 20 | — |
| Duomac T[5] | — | — | — | — | 25 |
| Triton X-305[6] | — | 10 | — | — | 15 |
| Triton X-405[7] | — | — | 80 | 80 | 73 |
| 3. Water | | | | | |
| Quantity | 120 | 139 | 202 | 192 | 152 |
| 4. Micronizing Slurry | | | | | |
| Medium | sand | sand | ball | ball | sand |
| 5. Micronizing | | | | | |
| Time, hrs. approx. | 48 | 48 | 72 | 72 | 72 |
| Temperature, °C. | 28 | 28 | 28 | 28 | 28 |
| Average Particle Size | | | | | |
| Diameter (microns) | <0.02 | <0.02 | <0.02 | <0.2 | <0.2 |
| 6. Separation | | | | | |
| Screening (X) | X | X | X | X | X |
| 7. Water Dilution | 144 | 120 | 118 | 118 | 105 |
| 8. Yield | | | | | |
| Aq. Pig. Disp. | 400 | 400 | 450 | 450 | 400 |
| B. Polymerization Step | | | | | |
| 9A. Surface Active Agent* | | | | | |
| a. Quantity, Type | 130[1] | 89[1] | — | — | 25[5] |
| b. Quantity, Type | — | — | — | — | — |
| Water | 70 | 11 | 50 | 50 | 75 |
| 9B. Monomer Material | | | | | |
| (non-crosslinking) | | | | | |
| Styrene | — | 80 | 75 | — | — |
| 4-vinylpyridine | — | 10 | — | — | — |
| Methylmethacrylate | — | — | — | 80.7 | 72.9 |
| Methacrylic Acid | — | — | 15 | — | 7.8 |
| Diethylaminoethyl- | | | | | |
| methacrylate | — | — | — | 9.3 | 9.3 |
| 9C. Monomer Material | | | | | |
| (crosslinking) | | | | | |
| Divinylbenzene (50%) | — | 10 | 10 | 10 | — |
| EGDMA[8] | 100 | — | — | — | 10 |
| 9D. Polymerization Initiator | | | | | |
| AZDN[9] | 4 | 4 | 4 | 4 | 4 |
| 10. Polymerization Conditions | | | | | |
| Time, hrs. approx. | 4 | 4 | 4 | 4 | 4 |
| Temperature °C. | 80 | 80 | 80 | 80 | 80 |
| Conversion | | | | | |
| approx. 100% (X) | X | X | X | X | X |
| 11. Inrachromospheruloid | | | | | |
| Pigment Comp. (latex) | | | | | |
| Yield | 700 | 600 | 600 | 600 | 600 |
| Essentially non- | | | | | |
| settling (X) | X | X | X | X | X |

*Capable of effecting emulsion polymerization
[1]sodium salt of a sulfate ester of an alkylphenoxy poly(ethyleneoxy) ethanol (28% active)
[2]sodium salt of condensed naphthalene sulfonic acid
[3]sodium dodecyl diphenylether disulfonate
[4]nonyl napthalene sodium sulfonate
[5]N-tallow trimethylene diamine diacetate
[6]octylphenoxy polyethoxy ethanol
[7]octylphenoxy polyethoxy ethanol (70% active)
[8]ethyleneglycoldimethacrylate
[9]azobisisobutyronitrile

TABLE 4

Preparation of Aqueous Dispersion of Intrachromospheruloid Pigment Composition

| Example No. 4 | −1 | −2 | −3 | −4 | −5 |
|---|---|---|---|---|---|
| | (Parts by weight) | | | | |
| A. Micronizing Step | | | | | |
| 1. Pigment | | | | | |
| Pigment Class | | | Dioxazine | | |
| Trade Name | Irgazin Violet 6RLT | Carbazole Violet Presscake | Irgazin Violet BLT | Chromo-phtal Violet B | Heliogen Violet Presscake |
| Color Index Name | 1 | Violet 23 | 1 | 1 | Violet 23 |
| Color Index Number | — | 51319 | — | — | 51319 |
| Pigment, dry basis | 30 | 30 | 10 | 20 | 10 |
| Presscake, % solids | — | 20 | — | — | 20 |
| Presscake, wet | — | 150 | — | — | 50 |
| 2. Surface Active Agent* | | | | | |
| Material (Trade Names) | | | | | |
| Alipal CO-433[2] | 88 | 178 | — | — | — |
| Tamol SN[3] | 2 | 2 | — | — | — |
| Aerosol MA[4] | — | — | 10 | 10 | — |
| Aerosol OT[5] | — | — | — | — | 5 |
| Aerosol TR[6] | — | — | — | 10 | 5 |
| Aerosol 22[7] | — | — | 20 | 10 | 5 |

TABLE 4-continued
Preparation of Aqueous Dispersion of Intrachromspheruloid Pigment Composition (Parts by weight)

| Example No. 4 | −1 | −2 | −3 | −4 | −5 |
|---|---|---|---|---|---|
| Triton X-405[8] | — | — | — | 30 | 5 |
| 3. Water |  |  |  |  |  |
| Quantity | 200 | 50 | 230 | 300 | 240 |
| 4. Micronizing Slurry |  |  |  |  |  |
| Medium | sand | sand | sand | sand | sand |
| 5. Micronizing |  |  |  |  |  |
| Time, hrs. approx. | 48 | 48 | 48 | 48 | 48 |
| Temperature, °C. | 28 | 28 | 28 | 28 | 28 |
| Average Particle Size |  |  |  |  |  |
| Diameter (microns) | <0.2 | <0.02 | <0.02 | <0.2 | <0.02 |
| 6. Separation |  |  |  |  |  |
| Screening (X) | X | X | X | X | X |
| 7. Water Dilution | 130 | 120 | 130 | 120 | 140 |
| 8. Yield |  |  |  |  |  |
| Aq. Pig. Dis. | 450 | 500 | 400 | 500 | 450 |
| B. Polymerization Step |  |  |  |  |  |
| 9A. Surface Active Agent* |  |  |  |  |  |
| a. Quantity, Type | 50[2] | — | 10[7] | — | 35[8] |
| b. Quantity, Type | 40[8] | — | 40[8] | — | — |
| Water | 60 | — | 50 | 100 | 15 |
| 9B. Monomer Material |  |  |  |  |  |
| (non-crosslinking) |  |  |  |  |  |
| Styrene | 95 | 85 | 70.9 | 79.5 | 71.4 |
| 4-Vinylpyridene | — | — | 10.5 | 10.5 | — |
| Methacrylic Acid | — | — | 8.6 | — | 8.6 |
| Acrylonitrile | — | 10 | — | — | — |
| 9C. Monomer Material |  |  |  |  |  |
| (crosslinking) |  |  |  |  |  |
| Divinylbenzene (50%) | 5 | 5 | 10 | 10 | 20 |
| 9D. Polymerization Initiator |  |  |  |  |  |
| AZDN[9] | 4 | 4 | 4 | 4 | 4 |
| 10. Polymerization Conditions |  |  |  |  |  |
| Time, hrs. approx. | 4 | 4 | 4 | 4 | 4 |
| Temperature, °C. | 28 | 28 | 28 | 28 | 28 |
| Conversion |  |  |  |  |  |
| approx. 100% (X) | X | X | X | X | X |
| 11. Intrachromospheruloid |  |  |  |  |  |
| Pigment Comp. (latex) |  |  |  |  |  |
| Yield | 700 | 600 | 600 | 700 | 600 |
| Essentially non- |  |  |  |  |  |
| settling (X) | X | X | X | X | X |

*Capable of effecting emulsion polymerization
[1] see The Chemistry of Synthetic Dyes by K. Venkataraman, Vol. V, page 425
[2] sodium salt of a sulfate ester of an alkylphenoxy poly(ethyleneoxy) ethanol (28% active)
[3] sodium salt of condensed naphthalene sulfonic acid
[4] dihexyl ester of sodium sulfosuccinic acid (80% active)
[5] diacetyl ester of sodium sulfosuccinic acid (100% active)
[6] bis(tridecyl)ester of sodium slfosuccinic acid (100% active)
[7] tetra sodium N-(1,2-dicarboxyethyl)-N-octadecylsulfosuccinamate (35% active)
[8] octylphenoxy polyethoxy ethanol (70% active)
[9] azobisisobutyronitrile

TABLE 5
Preparation of Aqueous Dispersion of Intrachromospheruloid Pigment Composition (Parts by weight)

| Example No. 5 | −1 | −2 | −3 | −4 | −5 |
|---|---|---|---|---|---|
| A. Micronizing Step |  |  |  |  |  |
| 1. Pigment |  |  |  |  |  |
| Pigment Class | Azo | | | | |
| Trade Name | Hansa Yellow G Toner | Hansa Yellow 10G | Hansa Yellow 3R | Benzidine Yellow Presscake | Permanent Carmine FB |
| Color Index Name | Yellow 1 | Yellow 3 | Orange 1 | Yellow 12 | Red 5 |
| Color Index Number | 11680 | 11710 | 11725 | 21090 | 12490 |
| Pigment, dry basis | 20 | 25 | 20 | 40 | 30 |
| Presscake, % solids | — | — | — | 38 | — |
| Presscake, wet | — | — | — | 105 | — |
| 2. Surface Active Agent* |  |  |  |  |  |
| Material (Trade Names) |  |  |  |  |  |
| Alipal CO-433[1] | 20 | 180 | — | — | — |
| Tamol SN[2] | 2 | 2 | — | — | 2 |
| Duponol ME[3] | — | — | 25 | — | — |
| Armac T[4] | — | — | — | 20 | — |
| Duomac T[5] | — | — | — | 10 | — |
| Potassium Oleate | — | — | — | — | 30 |
| Triton X-405[6] | — | — | 20 | 20 | 20 |
| 3. Water |  |  |  |  |  |
| Quantity | 230 | 125 | 200 | 200 | 200 |
| 4. Micronizing Slurry |  |  |  |  |  |
| Medium | sand | sand | ball | sand | ball |
| 5. Micronizing |  |  |  |  |  |
| Time, hrs. approx. | 48 | 48 | 60 | 60 | 60 |
| Temperature, °C. | 28 | 28 | 28 | 28 | 28 |
| Average Particle Size |  |  |  |  |  |
| Diameter (microns) | <0.02 | <0.02 | <0.2 | <0.2 | <0.02 |
| 6. Separation |  |  |  |  |  |

TABLE 5-continued
Preparation of Aqueous Dispersion of Intrachromospheruloid Pigment Composition

| Example No. 5 | -1 | -2 | -3 | -4 | -5 |
|---|---|---|---|---|---|
| | (Parts by weight) | | | | |
| Screening (X) | X | X | X | X | X |
| 7. Water Dilution | 128 | 168 | 105 | 125 | 118 |
| 8. Yield | | | | | |
| Aq. Pig. Dis. | 400 | 500 | 370 | 480 | 400 |
| B. Polymerization Step | | | | | |
| 9A. Surface Active Agent* | | | | | |
| a. Quantity, Type | $100^1$ | — | — | $10^4$ | — |
| b. Quantity, Type | — | — | — | $10^5$ | — |
| Water | — | — | 30 | — | — |
| 9B. Monomer Material | | | | | |
| (non-crosslinking) | | | | | |
| Styrene | — | 85 | — | 80 | — |
| Vinyltoluene | — | — | 76.4 | — | — |
| Methylmethacrylate | 80 | — | — | — | 90 |
| Methacrylic Acid | 10 | — | 4.3 | — | — |
| 4-Vinylpyridine | — | 10 | — | 10 | — |
| Diethylaminoethyl- | | | | | |
| methacrylate | — | — | 9.3 | — | — |
| 9C. Monomer Material | | | | | |
| (crosslinking) | | | | | |
| $EGDMA^7$ | 10 | — | 5 | — | 10 |
| Divinylbenzene (50%) | — | 5 | — | 10 | — |
| Allylacrylate | — | — | 5 | — | — |
| 9D. Polymerization Initiator | | | | | |
| $AZDN^8$ | 4 | 4 | 4 | 4 | 4 |
| 10. Polymerization Conditions | | | | | |
| Time, hrs. approx. | 5 | 5 | 5 | 5 | 5 |
| Temperature, ° C. | 80 | 80 | 80 | 80 | 80 |
| Conversion | | | | | |
| approd. 100% (X) | X | X | X | X | X |
| 11. Intrachromospheruloid | | | | | |
| Pigment Comp. (latex) | | | | | |
| Yield | 600 | 600 | 500 | 600 | 500 |
| Essentially non- | | | | | |
| settling (X) | X | X | X | X | X |

*Capable of effecting emulsion polymerization
[1] sodium salt of a sulfate ester of an alkylphenoxy poly(ethyleneoxy) ethanol (28% active)
[2] sodium salt of condensed naphthalene sulfonic acid
[3] sodium lauryl sulfate
[4] N-tallow amine acetate
[5] N-tallow-trimethylene diaminediacetate
[6] octylphenoxy polyethoxy ethanol (70% active)
[7] ethyleneglycol dimethacrylate
[8] azobisisobutyronitrile

TABLE 6
Preparation of Aqueous Dispersion of Intrachromospheruloid Pigment Composition

| Example No. 6 | -1 | -2 | -3 | -4 | -5 |
|---|---|---|---|---|---|
| | (Parts by weight) | | | | |
| A. Micronizing Step | | | | | |
| 1. Pigment | | | | | |
| Pigment Class | | | Triphenylmethane | | |
| Trade Name | Rhod-amine Y | Rhod-amine B | Consol Green | Irgalite Violet TCR | Victoria Blue |
| Color Index Name | Red 81 | Violet 1 | Green 2 | Violet 3 | Blue 1 |
| Color Index Number | 45160 | 45170 | 42040 & 49010 | 42535 | 52595 |
| Pigment, dry basis | 40 | 30 | 20 | 25 | 25 |
| Presscake, % solids | — | — | — | — | 35 |
| Presscake, wet | — | — | — | — | 72 |
| 2. Surface Active Agent* | | | | | |
| Material (Trade Names) | | | | | |
| Alipal CO-433[1] | 160 | 130 | — | — | — |
| Tamol SN[2] | 2 | — | — | — | — |
| Blancol[3] | — | 2 | — | 2 | 2 |
| Triton X-305[4] | — | 30 | 30 | — | 20 |
| Triton X-405[5] | — | — | — | 50 | 50 |
| Armac C[5] | — | — | 25 | — | — |
| Zonyl FSC[6] | — | — | 2 | — | — |
| 3. Water | | | | | |
| Quantity | 130 | 100 | 100 | 200 | 156 |
| 4. Micronizing Slurry | | | | | |
| Medium | sand | ball | sand | sand | ball |
| 5. Micronizing | | | | | |
| Time, hrs. approx. | 24 | 24 | 48 | 48 | 60 |
| Temperature, ° C. | 28 | 28 | 28 | 28 | 28 |
| Average Particle Size | | | | | |
| Diameter (microns) | <0.2 | <0.2 | <0.02 | <0.2 | <0.02 |
| 6. Separation | | | | | |
| Screening (X) | X | X | X | X | X |
| 7. Water Dilution | 168 | 108 | 123 | 123 | 100 |
| 8. Yield | | | | | |
| Aq. Pig. Dis. | 500 | 400 | 300 | 400 | 400 |
| B. Polymerization Step | | | | | |
| 9A. Surface Active Agent* | | | | | |
| a. Quantity, Type | — | — | $25^4$ | — | — |

TABLE 6-continued
Preparation of Aqueous Dispersion of Intrachromospheruloid Pigment Composition

| Example No. 6 | −1 | −2 | −3 | −4 | −5 |
|---|---|---|---|---|---|
| b. Quantity, Type | — | — | 25[5] | — | — |
| Water | — | — | 50 | — | — |
| 9B. Monomer Material (non-crosslinking) | | | | | |
| Cyclohexylmethacrylate | 85 | 80 | 80 | 80 | 80 |
| Acrylonitrile | — | 5 | — | — | — |
| Vinyltrifluoroacetate | — | — | 5 | — | — |
| Vinylethylketone | — | — | — | 5 | — |
| Isoprene | — | — | — | — | 5 |
| 9C. Monomer Material (crosslinking) | | | | | |
| Allyl Methacrylate | 10 | 10 | 10 | 10 | 10 |
| EGDMA[7] | 5 | 5 | 5 | 5 | 5 |
| 9D. Polymerization Initiator | | | | | |
| AZDN[8] | 4 | 4 | 4 | 4 | 4 |
| 10. Polymerization Conditions | | | | | |
| Time, hrs. approx. | 4 | 4 | 3 | 3 | 3 |
| Temperature, °C. | 80 | 80 | 90 | 90 | 90 |
| Conversion approx. 100% (X) | X | X | X | X | X |
| 11. Intrachromospheruloid Pigment Comp. (latex) | | | | | |
| Yield | 600 | 500 | 500 | 500 | 500 |
| Essentially non-settling (X) | X | X | X | X | X |

*Capable of effecting emulsion polymerization
[1] sodium salt of a sulfate ester of an alkylphenoxy poly(ethyleneoxy) ethanol (28% active)
[2] sodium salt of condensed naphthalene sulfonic acid
[3] sodium salt of a sulfonated naphthaleneformaldehyde condensate
[4] octylphenoxy polyethoxy ethanol (70% active)
[5] N-cocoa amine acetate
[6] fluorochemical surface active agent (50% active)
[7] ethyleneglycol dimethacrylate
[8] azobisisobutyronitrile

TABLE 7
Preparation of Aqueous Dispersion of Intrachromospheruloid Pigment Composition

| Example No. 7 | −1 | −2 | −3 | −4 | −5 |
|---|---|---|---|---|---|
| A. Micronizing Step | | | | | |
| 1. Pigment | | | | | |
| Pigment Class | Vat | | | | |
| Trade Name | Perylene Red Toner | Indanthren Rubine R | Sandothrene Blue NGCD | Indenthren Brilliant Orange RK | Inden. threne Red FBBA |
| Color Index Name | Pigment Red 123 | Vat Red 13 | Vat Blue 6 | Vat Orange 7 | Vat Red 10 |
| Color Index Number | 71145 | 70320 | 69825 | 71105 | 67000 |
| Pigment, dry basis | 25 | 20 | 35 | 30 | 35 |
| Presscake, % solids | — | — | 20 | 28 | — |
| Presscake, wet | — | — | 175 | 107 | — |
| 2. Surface Active Agent* Material (Trade Names) | | | | | |
| Alipal CO-433[1] | 178 | 15 | — | — | — |
| Tamol SN[2] | 2 | — | 2 | — | — |
| Igepon CN-42[3] | — | 25 | 20 | — | — |
| Gafac RE-610[4] | — | — | — | 30 | — |
| Gafac RE-870[5] | — | — | — | — | 20 |
| Triton X-405[6] | — | 25 | 30 | 30 | 20 |
| Zonyl FSP[7] | — | — | — | 1 | 1 |
| Aqueous Ammonia (28%) | — | — | — | 14 | 14 |
| 3. Water | | | | | |
| Quantity | 150 | 220 | 75 | 100 | 225 |
| 4. Micronizing Slurry | | | | | |
| Medium | sand | ball | ball | ball | sand |
| 5. Micronizing | | | | | |
| Time, hrs. approx. | 48 | 48 | 60 | 60 | 48 |
| Temperature, °C. | 28 | 28 | 28 | 28 | 28 |
| Average Particle Size Diameter (microns) | <0.2 | <0.2 | <0.02 | <0.02 | <0.2 |
| 6. Separation | | | | | |
| Screening (X) | X | X | X | X | X |
| 7. Water Dilution | 145 | 95 | 98 | 118 | 135 |
| 8. Yield | | | | | |
| Aq. Pig. Dis. | 500 | 400 | 400 | 400 | 450 |
| B. Polymerization Step | | | | | |
| 9A. Surface Active Agent* | | | | | |
| a. Quantity, Type | — | — | 25[3] | — | 10[4] |
| b. Quantity, Type | — | — | 25[5] | — | 30[6] |
| Water | — | — | 50 | — | — |
| 9B. Monomer Material (non-crosslinking) | | | | | |
| Styrene | 90 | — | — | 70 | 70 |
| Vinylidene Chloride | — | 85 | — | — | — |
| Vinylchloride | — | — | 85 | — | — |

TABLE 7-continued
Preparation of Aqueous Dispersion of Intrachromospheruloid Pigment Composition

| | (Parts by weight) | | | | |
|---|---|---|---|---|---|
| Example No. 7 | −1 | −2 | −3 | −4 | −5 |
| 4-Vinylpyridine | — | — | — | 20 | — |
| Acrylic Acid | — | — | — | — | 20 |
| 9C. Monomer Material (crosslinking) | | | | | |
| Divinylbenzene (50%) | 10 | 15 | 15 | 10 | 10 |
| 9D. Polymerization Initiator | | | | | |
| AZDN[8] | 4 | 4 | 4 | 4 | 4 |
| 10. Polymerization Conditions | | | | | |
| Time, hrs. approx. | 4 | 4 | 4 | 4 | 4 |
| Temperature, °C. | 80 | 80 | 80 | 80 | 80 |
| Conversion | | | | | |
| approx. 100% (X) | X | X | X | X | X |
| 11. Intrachromospheruloid Pigment Comp. (latex) | | | | | |
| Yield | 600 | 500 | 600 | 500 | 600 |
| Essentially non-settling (X) | X | X | X | X | X |

*Capable of effecting emulsion polymerization
[1]sodium salt of a sulfate ester of an alkylphenoxy poly(ethyleneoxy) ethanol (28% active)
[2]sodium salt of condensed naphthalene sulfonic acid
[3]sodium N-cyclohexyl-N-palmitoyl-taurate
[4]free acid of complex organic phosphate ester (100% active)
[5]free acid of complex organic phosphate ester (100% active)
[6]octylphenoxy polyethoxy ethanol (70% active)
[7]fluorochemical surface active agent (35% active)
[8]azobisisobutyronitrile

TABLE 8
Preparation of Aqueous Dispersion of Intrachromospheruloid Pigment Composition

| | (Parts by weight) | | | | |
|---|---|---|---|---|---|
| Example No. 8 | −1 | −2 | −3 | −4 | −5 |
| A. Micronizing Step | | | | | |
| 1. Pigment | | | | | |
| Pigment Class | Fluorubines | | | | |
| Trade Name | a | b | c | d | e |
| Color Index Name | — | — | — | — | — |
| Color Index Number | — | — | — | — | — |
| Pigment, dry basis | 20 | 40 | 30 | 20 | 20 |
| Presscake, % solids | — | 30 | 20 | — | — |
| Presscake, wet | — | 133 | 150 | — | — |
| 2. Surface Active Agent* Material (Trade Names) | | | | | |
| Alipal CO-433[1] | 180 | — | — | 150 | — |
| Tamol SN[2] | 2 | — | — | — | — |
| Aerosol MA[3] | — | 10 | 10 | — | 10 |
| Aerosol TR[4] | — | — | 10 | 10 | 10 |
| Blancol[5] | — | — | — | 2 | 2 |
| Triton X-405[6] | — | 10 | 40 | — | 30 |
| 3. Water | | | | | |
| Quantity | 200 | 200 | 140 | 150 | 230 |
| 4. Micronizing Slurry | | | | | |
| Medium | ball | sand | sand | ball | sand |
| 5. Micronizing | | | | | |
| Time, hrs. approx. | 72 | 48 | 48 | 60 | 48 |
| Temperature, °C. | 28 | 28 | 28 | 28 | 28 |
| Average Particle Size Diameter (microns) | <0.2 | <0.02 | <0.02 | <0.2 | <0.2 |
| 6. Separation | | | | | |
| Screening (X) | X | X | X | X | X |
| 7. Water Dilution | 98 | 147 | 150 | 168 | 148 |
| 8. Yield | | | | | |
| Aq. Pig. Dis. | 500 | 500 | 500 | 500 | 450 |
| B. Polymerization Step | | | | | |
| 9A. Surface Active Agent* | | | | | |
| a. Quantity, Type | — | 40[6] | — | 25[4] | 50[6] |
| b. Quantity, Type | — | — | — | 25[6] | — |
| Water | — | 60 | — | 50 | — |
| 9B. Monomer Material (non-crosslinking) | | | | | |
| Methylmethacrylate | 90 | 63.9 | 71.5 | 82.4 | — |
| Dimethylaminoethyl-methacrylate | — | 18.5 | 18.5 | — | — |
| Acrylic Acid | — | 7.6 | — | 7.6 | — |
| 9C. Monomer Material (crosslinking) | | | | | |
| EGDMA[7] | 10 | 10 | 10 | 10 | 10 |
| 9D. Polymerization Initiator | | | | | |
| AZDN[8] | 4 | 4 | 4 | 4 | 4 |
| 10. Polymerization Conditions | | | | | |
| Time, hrs. approx. | 4 | 4 | 4 | 4 | 4 |
| Temperature, °C. | 80 | 80 | 80 | 80 | 80 |
| Conversion | | | | | |
| approx. 100% (X) | X | X | X | X | X |
| 11. Intrachromospheruloid Pigment Comp. (latex) | | | | | |
| Yield | 600 | 700 | 600 | 700 | 600 |
| Essentially non-settling (X) | X | X | X | X | X |

*Capable of effecting emulsion polymerization
[1]sodium salt of a sulfate ester of an alkylphenoxy poly(ethyleneoxy) ethanol (28% active)
[2]sodium salt of condensed naphthalene sulfonic acid
[3]dihexyl ester of sodium sulfosuccinic acid (100% active)
[4]bis(tridecyl)ester of sodium sulfosuccinic acid (100% active)
[5]sodium salt of a sulfonated naphthaleneformaldehyde condensate
[6]octylphenoxy polyethoxy ethanol (70% active)
[7]ethyleneglycoldimethacrylate
[8]azobisisobutyronitrile

[a]6,13-dihydro-pyrazino-(2,3-b; 5,6-b)diquinoxaline, a bright yellow pigment of structure

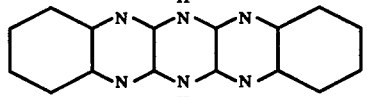

[b]fluoflavine, a greenish yellow pigment of structure

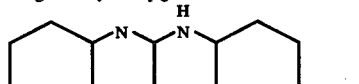

[c]quinoxalophenazinoxazine, a greenish yellow pigment of structure

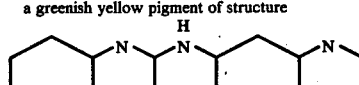

[d]quinoxaloanthraquinoneoxazine a red pigment of structure

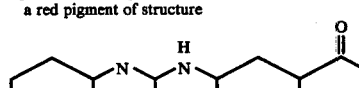

[e]quinoxalobenzothiazine, a bluish red pigment of structure

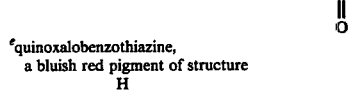

TABLE 9

Preparation of Aqueous Dispersion of Intrachromospheruloid Pigment Composition (Parts by weight)

| Example No. 9 | −1 | −2 | −3 | −4 | −5 |
|---|---|---|---|---|---|
| A. Micronizing Step | | | | | |
| 1. Pigment | | | | | |
| Pigment Class | | | Miscellaneous | | |
| Trade Name | Pigment Green B | Aniline Black | Naphtol Green B | Aniline Black | Pigment Green B |
| Color Index Name | Green 8 | Black 1 | Green 12 | Black 1 | Green 8 |
| Color Index Number | 10006 | 50440 | 10020 | 50440 | 10006 |
| Pigment, dry basis | 30 | 35 | 35 | 40 | 30 |
| Presscake, % solids | — | — | — | — | 40 |
| Presscake, wet | — | — | — | — | 75 |
| 2. Surface Active Agent* | | | | | |
| Material (Trade Names) | | | | | |
| Alipal CO-433[1] | 178 | — | — | 50 | 80 |
| Tamol SN[2] | 2 | — | 2 | — | — |
| Blancol[3] | — | 2 | — | 1 | 1 |
| Igepal CA-897[4] | — | 35 | — | 20 | — |
| Igepal CO-995[5] | — | — | 35 | — | 20 |
| Triton X-405[6] | — | 20 | 20 | — | — |
| 3. Water | | | | | |
| Quantity | 200 | 200 | 200 | 195 | 200 |
| 4. Micronizing Slurry | | | | | |
| Medium | ball | sand | ball | sand | ball |
| 5. Micronizing | | | | | |
| Time, hrs. approx. | 72 | 48 | 48 | 48 | 60 |
| Temperature, °C. | 28 | 28 | 28 | 28 | 28 |
| Average Particle Size | | | | | |
| Diameter (microns) | <0.02 | <0.2 | <0.2 | <0.02 | <0.02 |
| 6. Separation | | | | | |
| Screening (X) | X | X | X | X | X |
| 7. Water Dilution | 90 | 158 | 108 | 94 | 124 |
| 8. Yield | | | | | |
| Aq. Pig. Dis. | 500 | 450 | 400 | 400 | 500 |
| B. Polymerization Step | | | | | |
| 9A. Surface Active Agent* | | | | | |
| a. Quantity, Type | — | 20[4] | 15[5] | 45[1] | 20[4] |
| b. Quantity, Type | — | 20[6] | 10[6] | — | 20[5] |
| Water | — | 10 | 25 | 50 | 60 |
| 9B. Monomer Material (non-crosslinking) | | | | | |
| Methylmethacrylate | 80 | — | — | — | — |
| Styrene | — | 80 | 80 | 90 | 63.8 |
| Dodecylvinyl Ether | 10 | — | 5 | — | — |
| Octadecylvinyl Ether | — | 5 | — | 5 | — |
| 4-Vinylpyridine | — | 5 | — | — | 15.8 |
| Acrylic Acid | — | — | 5 | — | 10.4 |
| 9C. Monomer Material (crosslinking) | | | | | |
| Divinylbenzene (50%) | — | 10 | 10 | 5 | 10 |
| EGDMA | 10 | — | — | 5 | — |
| 9D. Polymerization Initiator | | | | | |
| AZDN[8] | 4 | 4 | 4 | 4 | 4 |
| 10. Polymerization Conditions | | | | | |
| Time, hrs. approx. | 4 | 4 | 4 | 4 | 4 |
| Temperature, °C. | 80 | 80 | 80 | 80 | 80 |
| Conversion approx. 100% (X) | X | X | X | X | X |
| 11. Intrachromospheruloid Pigment Comp. (latex) | | | | | |
| Yield | 600 | 600 | 550 | 600 | 700 |
| Essentially non-settling (X) | X | X | X | X | X |

*Capable of effecting emulsion polymerization
[1] sodium salt of a sulfate ester of an alkylphenoxy poly(ethyleneoxy) ethanol (28% active)
[2] sodium salt of condensed naphthalene sulfonic acid
[3] sodium salt of a sulfonated naphthaleneformaldehyde condensate (90% active)
[4] octylphenoxy poly(ethyleneoxy)ethanol
[5] nonylphenoxy poly(ethyleneoxy)ethanol
[6] octylphenoxypoly ethoxyethanol (70% active)
[7] ethyleneglycoldimethacrylate
[8] azobisisobutyronitrile

TABLE 10

Preparation of Aqueous Dispersion of Intrachromospheruloid Pigment Composition
(Parts by weight)

| Example No. 10 | −1 | −2 | −3 | −4 | −5 |
|---|---|---|---|---|---|
| A. Micronizing Step | | | | | |
| 1. Pigment | | | | | |
| Pigment Class | Dioxazine | Phthalocyanine | Vat | Cond. Azo | Quinacridone |
| Trade Name | Carlazole Violet Presscake | Heliogen Blue BG | Indanthrene Pink R Presscake | Chromophtal Red BR | Quinacridone Magenta |
| Color Index Name | Pigment Violet 23 | Pigment Blue 15 | Vat Red 1 | — | Pigment Red 122 |
| Color Index Number | 51319 | 74160 | 73360 | — | — |
| Pigment, dry basis | 20 | 25 | 35 | 20 | 30 |
| Presscake, % solids | 28 | — | 38 | — | — |
| Presscake, wet | 72 | — | 92 | — | — |
| 2. Surface Active Agent* | | | | | |
| Material (Trade Names) | | | | | |
| DACQ[1] | 30 | — | — | 25 | — |
| Acetic Acid | 10 | — | — | 9 | — |
| Monoquat TIBC[2] | — | 15 | — | 15 | — |
| Hyamine 10-X[3] | — | — | 10 | — | 10 |
| Tamol SN[4] | — | — | 2 | — | 2 |
| Triton X-405[5] | — | — | 40 | — | 40 |
| 3. Water | | | | | |
| Quantity | 220 | 220 | 210 | 200 | 200 |
| 4. Micronizing Slurry | | | | | |
| Medium | ball | sand | ball | sand | ball |
| 5. Micronizing | | | | | |
| Time, hrs. approx. | 60 | 48 | 72 | 48 | 60 |
| Temperature, °C. | 28 | 28 | 28 | 28 | 28 |
| Average Particle Size | | | | | |
| Diameter (microns) | <0.02 | <0.2 | <0.02 | <0.02 | <0.2 |
| 6. Separation | | | | | |
| Screening (X) | X | X | X | X | X |
| 7. Water Dilution | 118 | 140 | 96 | 131 | 118 |
| 8. Yield | | | | | |
| Aq. Pig. Dis. | 450 | 400 | 450 | 400 | 400 |
| B | Polymerization Step | | | | |
| 9A. Surface Active Agent* | | | | | |
| a. Quantity, Type | 10[1] | 10[2] | — | 10[2] | — |
| b. Quantity, Type | 40[5] | 35[5] | — | 30[5] | — |
| Water | — | 55 | 50 | 60 | — |
| 9B. Monomer Material (non-crosslinking) | | | | | |
| Methylmethacrylate | 95 | 95 | — | — | — |
| Styrene | — | — | 90 | — | — |
| Vinylidene Chloride | — | — | — | 90 | — |
| Cyclohexylmethacrylate | — | — | — | — | 90 |
| 9C. Monomer Material (crosslinking) | | | | | |
| EGDMA[6] | 5 | 5 | — | 10 | 10 |
| Divinylbenzene (50%) | — | — | 10 | — | — |
| 9D. Polymerization Initiator | | | | | |
| AZDN[7] | 3 | 3 | 3 | 3 | 3 |
| 10. Polymerization Conditions | | | | | |
| Time, hrs. approx. | 4.5 | 4.5 | 4.5 | 5 | 5 |
| Temperature, °C. | 80 | 80 | 80 | 80 | 80 |
| Conversion | | | | | |
| approx. 100% (X) | X | X | X | X | X |
| 11. Intrachromospheruloid Pigment Comp. (latex) | | | | | |
| Yield | 600 | 600 | 600 | 600 | 500 |
| Essentially non-settling (X) | X | X | X | X | X |

*Capable of effecting emulsion polymerization
[1] 1 mole Tallow aminopropylamine quaternized with 2 moles of allyl chloride
[2] substituted imidazoline quaternized with benzyl chloride
[3] diisobutylcresoxyethoxyethyl dimethyl benzyl ammonium chloride monohydrate
[4] sodium salt of condensed naphthalene sulfonic acid
[5] oxtylphenoxy polyethoxy ethanol (70% active)
[6] ethyleneglycoldimethacrylate
[7] azobisisobutyronitrile

TABLE 11

Preparation of Aqueous Dispersion of Intrachromospheruloid Pigment Composition
(Parts by weight)

| Example No. 11 | −1 | −2 | −3 | −4 | −5 |
|---|---|---|---|---|---|
| A. Micronizing Step | | | | | |
| 1. Pigment | | | | | |
| Pigment Class | Phthalocyanine | Azo | Dioxazine | Vat | Tetrachloroisoindoline |
| Trade Name | Heliogen Green G Presscake | Lithol Red Ba Toner | Irgazin Violet BLT | Indanthren Blue BC Presscake | Irgazin Yellow 3RLT |
| Color Index Name | Pigment Green 7 | Pigment Red 49 | — | Vat Blue 6 | Pigment Yellow 110 |
| Color Index Number | 74260 | 15630 | — | 69825 | — |
| Pigment, dry basis | 35 | 25 | 40 | 30 | 20 |
| Presscake, % solids | 35 | — | — | 20 | — |
| Presscake, wet | 100 | — | — | 150 | — |
| 2. Surface Active Agent* | | | | | |
| Material (Trade Names) | | | | | |
| Duomeen T[1] | 100 | — | — | — | — |
| Armeen T[2] | — | 100 | — | — | — |
| Manazoline T[3] | — | — | 20 | — | — |
| Armac C[4] | — | — | — | 26 | 26 |
| Triton X-405[5] | 30 | 30 | — | 30 | 30 |
| Acetic Acid | — | — | 4 | — | — |
| Hydroxyacetic Acid | — | — | — | 4 | 4 |
| 3. Water | | | | | |
| Quantity | 70 | 200 | 300 | 100 | 200 |
| 4. Micronizing Slurry | | | | | |
| Medium | ball | sand | sand | ball | ball |
| 5. Micronizing | | | | | |
| Time, hrs. approx. | 48 | 60 | 48 | 48 | 48 |
| Temperature, °C. | 28 | 28 | 28 | 28 | 28 |
| Average Particle Size | | | | | |
| Diameter (microns) | <0.02 | <0.02 | <0.2 | <0.2 | <0.2 |
| 6. Separation | | | | | |
| Screening (X) | X | X | X | X | X |
| 7. Water Dilution | 100 | 195 | 136 | 90 | 100 |
| 8. Yield | | | | | |
| Aq. Pig. Dis. | 400 | 500 | 500 | 400 | 300 |
| B. Polymerization Step | | | | | |
| 9A. Surface Active Agent* | | | | | |
| a. Quantity, Type | — | — | 10[4] | 50[1] | 10[3] |
| b. Quantity, Type | — | — | 30[5] | — | — |
| Water | — | — | 60 | — | 90 |
| 9B. Monomer Material (non-crosslinking) | | | | | |
| Styrene | 80 | 95 | 95 | 85 | — |
| Acrylonitrile | 10 | — | — | — | — |
| Hydroxypropylmethacrylate | — | — | — | 5 | — |
| Vinyltoluene | — | — | — | — | 90 |
| 9C. Monomer Material (crosslinking) | | | | | |
| Divinylbenzene (50%) | 10 | 5 | 5 | 10 | 10 |
| 9D. Polymerization Initiator | | | | | |
| AZDN[6] | 3 | 3 | 3 | 3 | 3 |
| 10. Polymerization Conditions | | | | | |
| Time, hrs. approx. | 4 | 4 | 4 | 5 | 5 |
| Temperature, °C. | 80 | 80 | 85 | 80 | 80 |
| Conversion | | | | | |
| approx. 100% (X) | X | X | X | X | X |
| 11. Intrachromospheruloid | | | | | |
| Pigment Comp. (latex) | | | | | |
| Yield | 500 | 600 | 700 | 550 | 500 |
| Essentially non-settling (X) | X | X | X | X | X |

*Capable of effecting emulsion polymerization
[1] tallow amino propylene amine (20% solution as diacetate)
[2] tallow amine (20% solution as acetate)
[3] substituted imidazoline of tall oil
[4] N-cocoa amine acetate
[5] octylphenoxy polyethoxy ethanol (70% active)
[6] azobisisobutyronitrile

TABLE 12

Preparation of Aqueous Dispersion of Intrachromospheruloid Pigment Composition
(Parts by weight)

| Example No. 12 | -1 | -2 | -3 | -4 | -5 |
|---|---|---|---|---|---|
| A. Micronizing Step | | | | | |
| 1. Pigment | | | | | |
| Pigment Class | Vat | Phthalocyanine | Misc. Pig. | Misc. Pig. | Azo Pig. |
| Trade Name | Ponsol Jade Green Presscake | Heliogen Blue B | Green Gold | Aniline Black | Permagen Yellow GAN Presscake |
| Color Index Name | Vat Green 1 | Pigment Blue 15 | Pigment Green 10 | Pigment Black 1 | Pigment Yellow 14 |
| Color Index Number | 59825 | 74160 | 12775 | 40440 | 21095 |
| Pigment, dry basis | 35 | 50 | 30 | 35 | 35 |
| Presscake, % solids | 20 | — | — | — | 36 |
| Presscake, wet | 175 | — | — | — | 98 |
| 2. Surface Active Agent* | | | | | |
| Material (Trade Names) | | | | | |
| Surfactant QS-20[1] | 25 | — | — | — | 10 |
| Surfactant QS-9[2] | — | 25 | — | — | — |
| Surfactant QS-5[3] | — | — | 20 | — | — |
| Surfactant QS-44[4] | — | — | — | 20 | 10 |
| Tamol SN[5] | — | 2 | 2 | — | 2 |
| Triton X-405[6] | 30 | 20 | — | 20 | — |
| Zonyl FSF[7] | 1 | — | — | 1 | — |
| 3. Water | | | | | |
| Quantity | 101 | 220 | 200 | 206 | 180 |
| 4. Micronizing Slurry | | | | | |
| Medium | sand | ball | sand | sand | ball |
| 5. Micronizing | | | | | |
| Time, hrs. approx. | 48 | 36 | 36 | 48 | 48 |
| Temperature, °C. | 28 | 28 | 28 | 28 | 28 |
| Average Particle Size | | | | | |
| Diameter (microns) | <0.02 | <0.2 | <0.2 | <0.2 | <0.02 |
| 6. Separation | | | | | |
| Screening (X) | X | X | X | X | X |
| 7. Water Dilution | 118 | 133 | 148 | 168 | 150 |
| 8. Yield | | | | | |
| Aq. Pig. Dis. | 450 | 450 | 400 | 450 | 450 |
| B. Polymerization Step | | | | | |
| 9A. Surface Active Agent* | | | | | |
| a. Quantity, Type | — | — | 10[4] | — | 10[3] |
| b. Quantity, Type | — | — | 40[6] | — | 60[6] |
| Water | 50 | 50 | 50 | 50 | 30 |
| 9B. Monomer Material (non-crosslinking) | | | | | |
| Styrene | 90 | — | 80 | 87 | — |
| Vinyltoluene | — | 92 | — | — | 85 |
| Acrylonitrile | — | — | 10 | — | — |
| methacrylamide | — | — | — | 5 | — |
| Stearylacrylate | — | — | — | — | 10 |
| 9C. Monomer Material (crosslinking) | | | | | |
| Divinylbenzene (50%) | 10 | — | 10 | — | — |
| Allylacrylate | — | 6 | — | 4 | — |
| Ethyleneglycoldi-methacrylate | — | 2 | — | 4 | 5 |
| 9D. Polymerization Initiator | | | | | |
| Cumene Hydroperoxide | 2 | — | — | — | — |
| AZDN[8] | — | 4 | 4 | 4 | 4 |
| 10. Polymerization Conditions | | | | | |
| Time, hrs. approx. | 8 | 5 | 5 | 5 | 5 |
| Temperature, °C. | 70 | 80 | 80 | 80 | 80 |
| Conversion | | | | | |
| approx. 100% (X) | X | X | X | X | X |
| 11. Interchromospheruloid Pigment Comp. (latex) | | | | | |
| Yield | 600 | 600 | 600 | 600 | 650 |
| Essentially non-settling (X) | X | X | X | X | X |

*Capable of effecting emulsion polymerization
[1]complex phosphate ester (70% active) used as ammonium salt
[2]complex phosphate ester (70% active) used as ammonium salt
[3]complex phosphate ester (100% active) used as ammonium salt
[4]complex phosphate ester (80% active) used as ammonium salt
[5]sodium salt of condensed naphthalene sulfonic acid
[6]octylphenoxy polyethoxy ethanol (70% active)
[7]fluorochemical surface active agent (35% active)
[8]azobisisobutyronitrile

TABLE 13

Preparation of Aqueous Dispersion of Intrachromospheruloid Pigment Composition
(Parts by weight)

| Example No. 13 | −1 | −2 | −3 | −4 | −5 |
|---|---|---|---|---|---|
| A. Micronizing Step | | | | | |
| 1. Pigment | | | | | |
| Pigment Class | Quin-acridone | Azo | Phthalo-cyanine | Misc. Pigment | Vat Pigment |
| Trade Name | Monastral Red Y | Permanent Carmine | Heliogen Blue BG Presscake | Green Gold | Amaplast Pink FF |
| Color Index Name | Pigment Violet 19 | Pigment Red 5 | Pigment Blue 15 | Pigment Green 10 | Vat Red 1 |
| Color Index Number | 46500 | 12490 | 74160 | 12775 | 73360 |
| Pigment, dry basis | 30 | 25 | 35 | 25 | 40 |
| Presscake, % solids | — | — | 35 | — | — |
| Presscake, wet | — | — | 100 | — | — |
| 2. Surface Active Agent* | | | | | |
| Material (Trade Names) | | | | | |
| Deriphat 154[1] | 32 | — | — | — | — |
| Tanaphen A-600[2] | — | 50 | — | — | 55 |
| Monateric CY Na 50%[3] | — | — | 50 | — | — |
| Sulfobetaine DC 50%[4] | — | — | — | 50 | — |
| Uniterge K[5] | — | — | — | 30 | — |
| Duponol ME[6] | 28 | — | — | — | — |
| Alipal CO-433[7] | — | 10 | — | — | — |
| Triton X-405[8] | — | — | 45 | — | — |
| Zonyl FSB[9] | — | — | 1 | 1 | — |
| 3. Water | | | | | |
| Quantity | 210 | 225 | 200 | 224 | 220 |
| 4. Micronizing | | | | | |
| Medium | ball | sand | sand | sand | ball |
| 5. Micronizing | | | | | |
| Time, hrs. approx. | 60 | 36 | 48 | 36 | 72 |
| Temperature, °C. | 28 | 28 | 28 | 28 | 28 |
| Average Particle Size | | | | | |
| Diameter (microns) | <0.2 | <0.2 | <0.02 | <0.2 | <0.02 |
| 6. Separation | | | | | |
| Screening (X) | X | X | X | X | X |
| 7. Water Dilution | 100 | 140 | 154 | 170 | 135 |
| 8. Yield | | | | | |
| Aq. Pig. Dis. | 400 | 450 | 550 | 500 | 450 |
| B. Polymerization Step | | | | | |
| 9A. Surface Active Agent* | | | | | |
| a. Quantity, Type | — | 25[7] | — | 20[6] | 10[6] |
| b. Quantity, Type | — | — | — | — | 30[7] |
| Water | — | 25 | 50 | 80 | 10 |
| 9B. Monomer Material (non-crosslinking) | | | | | |
| Styrene | — | 80 | 80 | — | 80 |
| Methylmethacrylate | 80 | — | — | 50 | — |
| Cyclohexylmethacrylate | — | — | — | 40 | — |
| Acrylic Acid | 10 | — | — | — | — |
| 9C. Monomer Material (crosslinking) | | | | | |
| Divinylbenzene 50% | — | 20 | 20 | — | 20 |
| EGDM[10] | 10 | — | — | 10 | — |
| 9D. Polymerization Initiator | | | | | |
| AZDN[11] | 3 | 3 | 3 | 3 | 3 |
| 10. Polymerization Conditions | | | | | |
| Time, hrs. approx. | 5 | 4½ | 4½ | 5 | 4½ |
| Temperature, C. | 80 | 80 | 80 | 80 | 80 |
| Conversion | | | | | |
| approx. 100% (X) | X | X | X | X | X |
| 11. Intrachromospheruloid Pigment Comp. (latex) | | | | | |
| Yield | 500 | 600 | 700 | 700 | 600 |
| Essentially non-settling (X) | X | X | X | X | X |

*Capable of effecting emulsion polymerization
[1] disodium salt of N-tallow beta amino dipropionate
[2] modified phenolic derivative
[3] sodium salt of 2-caprylic-1-(ethyl beta oxipropanoic acid)imidazoline
[4] stripped cocoa ammonium sulfonic acid betaine
[5] fatty nitrogen ether carboxylate
[6] sodium lauryl sulfate
[7] sodium salt of a sulfate ester of an alkylphenoxy poly(ethyleneoxy) ethanol (8% active)
[8] octylphenoxy polyethoxy ethanol (70% active)
[9] fluorochemical surface active agent (50% active)
[10] ethyleneglycol dimethacrylate
[11] azobisisobutyronitrile

TABLE 14

Preparation of Aqueous Dispersion of Intrachromospheruloid Pigment Composition
(Parts by weight)

| Example No. 14 | −1 | −2 | −3 | −4 | −5 |
|---|---|---|---|---|---|
| A. Micronizing Step | | | | | |
| 1. Pigment | | | | | |
| Pigment Class | Phthalocyanine | Dioxazine | Vat | Quinacridone | Azo |
| Trade Name | Heliogen Blue BG Presscake | Heliogen Violet Toner | Amanthrene Black BBN Presscake | Monastral Red Y | Para Toner |
| Color Index Name | Blue 15 | Violet 23 | Green 9 | Violet 19 | Red 1 |
| Color Index Number | 74160 | 51319 | 59850 | 46500 | 12070 |
| Pigment, dry basis | 40 | 30 | 40 | 25 | 30 |
| Presscake, % solids | 35 | — | 20 | — | — |
| Presscake, wet | 114 | — | 150 | — | — |
| 2. Surface Active Agent* Material (Trade Names) | | | | | |
| Triton X-305[1] | — | 10 | 10 | 10 | — |
| Alipal CO-433[2] | 25 | — | — | — | — |
| Duponol ME[3] | — | 25 | — | — | 25 |
| Polymeric Emulsifier Material | | | | | |
| Tamol 731[4] | 25 | — | — | — | — |
| SMA Copolymer[5] | — | 25 | 50 | — | — |
| SAMV Amphoteric Copol.[6] | — | — | — | 50 | 50 |
| Ammonium Acetate | — | — | — | 20 | — |
| Aqueous Ammonia (28%) | — | 10 | 20 | — | 10 |
| 3. Water | | | | | |
| Quantity | 200 | 210 | 120 | 220 | 200 |
| 4. Microinizing Slurry | | | | | |
| Medium | ball | ball | sand | sand | ball |
| 5. Micronizing | | | | | |
| Time, hrs. approx. | 60 | 60 | 48 | 48 | 72 |
| Temperature, °C. | 28 | 28 | 28 | 28 | 28 |
| Average Particle Size | | | | | |
| Diameter (microns) | <0.02 | <0.2 | <0.02 | <0.2 | <0.02 |
| 6. Separation | | | | | |
| Screening (X) | X | X | X | X | X |
| 7. Water Dilution | 136 | 140 | 150 | 125 | 85 |
| 8. Yield | | | | | |
| Aq. Pig. Dis. | 400 | 450 | 500 | 450 | 400 |
| B. Polymerization Step | | | | | |
| 9A. Surface Active Agent* | | | | | |
| a. Quantity, Type | — | 25[4] | 25[1] | — | — |
| b. Quantity, Type | — | 25[5] | — | — | — |
| Water | | | | | |
| 9B. Monomter Material (non-crosslinking) | | | | | |
| Styrene | 85 | — | — | — | — |
| Methylmethacrylate | — | 85 | 85 | — | 85 |
| Methacrylic acid | — | — | 5 | — | 5 |
| Vinylidene Chloride | — | — | — | 90 | — |
| 4-Vinylpyridine | 5 | — | — | — | — |
| 9C. Monomer Material (crosslinking) | | | | | |
| divinylbenzene (50%) | 10 | — | — | 10 | — |
| EGDM[7] | — | 15 | 10 | — | 10 |
| 9D. Polymerization Initiator | | | | | |
| AZDN[8] | 4 | 4 | 4 | 4 | 4 |
| 10. Polymerization Conditions | | | | | |
| Time, hrs. approx. | 5 | 5 | 5 | 5 | 5 |
| Temperature, °C. | 80 | 80 | 80 | 80 | 80 |
| Conversion | | | | | |
| approx. 100% (X) | X | X | X | X | X |
| 11. Intrachromospheruloid Pigment Comp. (latex) | | | | | |
| Yield | 600 | 600 | 650 | 600 | 600 |
| Essentially non-settling (X) | X | X | X | X | X |

*Capable of effecting emulsion polymerization
[1] octylphenoxy polyethoxy ethanol (70% active)
[2] sodium salt of a sulfate ester of an alkylphenoxy poly(ethyleneoxy) ethanol (28% active)
[3] sodium lauryl sulfate
[4] sodium salt of polymeric carboxylic acid
[5] copolymer of styrene, methacrylic acid and acrylonitrile ratio 25/65/10
[6] copolymer of styrene, acrylonitrile, methacrylic acid and 4-vinylpyridine ratio 25/10/29/36
[7] ethyleneglycoldimethacrylate
[8] azobisisobutyronitrile

TABLE 15

Preparation of Aqueous Dispersion of Intrachromospheruloid Pigment Composition (Parts by weight)

| Example No. 15- | -1 | -2 | -3 | -4 | -5 |
|---|---|---|---|---|---|
| A. Micronizing Step | | | | | |
| 1. Pigment | | | | | |
| Pigment Class | Vat | Azo | Cond. Azo | Triphenyl-methane | Azo |
| Trade Name | Flavan-throne Yellow | Red Lake CR | Chrom-phtal Red BR | Reflex Blue | Permanent Orange Toner |
| Color Index Name | Toner Yellow 1 | Red 53 | — | Blue 18 | Orange 5 |
| Color Index Number | 70600 | 15585 | — | 142770A | 12075 |
| Pigment, dry basis | 40 | 35 | 30 | 25 | 30 |
| Presscake, % solids | — | — | — | — | — |
| Presscake, wet | — | — | — | — | — |
| 2. Surface Active Agent* | | | | | |
| Material (Trade Names) | | | | | |
| Triton X-305[1] | 44 | — | — | — | — |
| Triton X-405[2] | 56 | 30 | — | — | — |
| Duomeen T[3] | — | — | 25 | — | — |
| Igepon CN-42[4] | — | — | — | 25 | — |
| Acetic Acid | — | — | 10 | — | — |
| Polymeric Emulsifier | | | | | |
| Material | | | | | |
| N-group polymer[5] | 10 | 10 | — | — | — |
| SAMV Amphoteric Copol.[6] | — | — | 25 | 25 | 50 |
| Acetic Acid | 6 | 5 | 21 | — | 20 |
| 3. Water | | | | | |
| Quantity | 204 | 215 | 215 | 215 | 210 |
| 4. Micronizing Slurry | | | | | |
| Medium | ball | sand | sand | sand | sand |
| 5. Micronizing | | | | | |
| Time, hrs. approx. | 72 | 48 | 48 | 48 | 48 |
| Temperature, °C. | 28 | 28 | 28 | 28 | 28 |
| Average Particle Size Diameter (microns) | <0.2 | <0.02 | <0.02 | <0.2 | <0.2 |
| 6. Separation | | | | | |
| Screening (X) | X | X | X | X | X |
| 7. Water Dilution | 90 | 155 | 124 | 160 | 140 |
| 8. Yield | | | | | |
| Aq. Pig. Dis. | 450 | 450 | 450 | 450 | 450 |
| B. Polymerization Step | | | | | |
| 9A. Surface Active Agent* | | | | | |
| a. Quantity, Type | — | 20[4] | — | 20[1] | 35[1] |
| b. Quantity, Type | — | 20[5] | — | 20[6] | 25[6] |
| Water | | | | | |
| 9B. Monomer Material (non-crosslinking) | | | | | |
| Styrene | 90 | 70 | — | 75 | — |
| Acrylonitrile | — | — | — | 10 | — |
| 4-Vinylpyridine | 5 | 10 | — | — | — |
| Methacrylic Acid | — | — | 5 | — | — |
| Methylmethacrylate | — | — | 85 | — | 85 |
| 9C. Monomer Material (crosslinking) | | | | | |
| Divinylbenzene (50%) | 5 | 20 | — | — | — |
| EGDM[7] | — | — | 10 | 15 | 15 |
| 9D. Polymerization Initiator | | | | | |
| AZDN[8] | 4 | 4 | 4 | 4 | 4 |
| 10. Polymerization Conditions | | | | | |
| Time, hrs. approx. | 5 | 5 | 5 | 5 | 5 |
| Temperature, °C. | 80 | 80 | 80 | 80 | 80 |
| Conversion approx. 100% (X) | X | X | X | X | X |
| 11. Intrachromospheruloid Pigment Comp. (latex) | | | | | |
| Yield | 600 | 600 | 550 | 600 | 650 |
| Essentially non-settling (X) | X | X | X | X | X |

*Capable of effecting emulsion polymerization
[1] octylphenoxy polyethoxy ethanol (70% active)
[2] octylphenoxy polyethoxy ethanol (70% active)
[3] N-tallow trimethylene diamine
[4] sodium N-cyclohexyl-N-palmetoyl-taurate
[5] 4-vinylpyridine homopolymer
[6] copolymer of styrene, acrylonitrile, methacrylic acid and 4-vinylpyridine ratio 25/10/29/36
[7] ethyleneglycoldimethacrylate
[8] azobisisobutyronitrile

TABLE 16

Preparation of Aqueous Dispersion of Intrachromospheruloid Pigment Composition
(Parts by weight)

| Example No. 16- | -1 | | -2 | |
|---|---|---|---|---|
| A. Micronizing step | | | | |
| 1. Pigment | | | | |
|    Pigment Class | Phthalocyanine | Dioxazine Carbazole | Vat Brilliant Orange GR | Vat |
|    Trade Name | Blue CR Presscake | Violet Presscake | Presscake | Red FBB Presscake |
|    Color Index Name | Blue 15 | Violet 23 | Orange 7 | Red 10 |
|    Color Index Number | 74160 | 51319 | 71105 | 67000 |
|    Pigment, dry basis | 25 | 5 | 5 | 35 |
|    Presscake, % solids | 35 | 29 | 30 | 35 |
|    Presscake, wet | 72 | 17 | 16 | 100 |
| 2. Surface Active Agent | | | | |
|    Material (Trade Names) | | | | |
|    Alipal CO-433[1] | 10 | | — | |
|    Tamol SN[2] | — | | 2 | |
|    Duponol ME[3] | — | | 5 | |
|    Tamol 731[4] | 7 | | 7 | |
|    Zonyl FSA[5] | 1 | | — | |
| 3. Water | | | | |
|    Quantity | 200 | | 170 | |
| 4. Micronizing Slurry | | | | |
|    Medium | ball | | sand | |
| 5. Micronizing | | | | |
|    Time, hrs., approx. | 60 | | 48 | |
|    Temperature, °C. | 28 | | 28 | |
|    Average Particle Size Diameter (microns) | <0.2 | | <0.02 | |
| 6. Separation | | | | |
|    Screening (X) | X | | X | |
| 7. Water Dilution | 93 | | 150 | |
| 8. Yield | | | | |
|    Aq. Pig. Disp. | 400 | | 400 | |
| B. Polymerization Step | | | | |
| 9A. Surface Active Agent* | | | | |
|    a. Quantity, Type | 10[1] | | 60[1] | |
|    b. Quantity, Type | 20[3] | | 20[3] | |
|    Water | 70 | | 20 | |
| 9B. Monomer Material (non-crosslinking) | | | | |
|    Styrene | 50 | | 10 | |
|    Methylmethacrylate | 20 | | 78 | |
|    Cyclohexylmethacrylate | 20 | | — | |
|    Dimethylaminoethylmethacrylate | — | | 2 | |
| 9C. Monomer Material (crosslinking) | | | | |
|    Divinylbenzene (50%) | 10 | | — | |
|    EGDM[6] | — | | 10 | |
| 9D. Polymerization Initiator | | | | |
|    Potassium Persulfate | — | | 2.5 | |
|    Sodium Bisulfite | — | | 1.25 | |
|    AZDN[7] | 3 | | — | |
| 10. Polymerization Conditions | | | | |
|    Time, hrs. approx. | 7 | | 5 | |
|    Temperature, °C. | 80 | | 70 | |
|    Conversion, approx. 100% (X) | X | | X | |
| 11. Intrachromospheruloid Pigment Comp. (latex) | | | | |
|    Yield | 600 | | 600 | |
|    Essentially non-settling (X) | X | | X | |

*Capable of effecting emulsion polymerization
[1] sodium salt of a sulfate ester of an alkylphenoxy poly(ethyleneoxy)ethanol (28% active)
[2] sodium salt of condensed napthalene sulfonic acid
[3] sodium lauryl sulfate (100% active)
[4] sodium salt of a polymeric carboxylic acid
[5] fluorochemical surface active agent (50% active)
[6] ethyleneglycoldimethacrylate
[7] azobisisobutyronitrile

TABLE 17

Preparation of Aqueous Dispersion of Intrachromospheruloid Pigment Composition
(Parts by weight)

| Example No. 17- | -1 | | -2 | |
|---|---|---|---|---|
| A. Micronizing Step | | | | |
| 1. Pigment | | | | |
| Pigment Class | Phthalocyanine | Azo Benzedine | Phthalocyanine | Vat |
| Trade Name | Heliogen Green BA Presscake | Yellow AAOT Presscake | Heliogen Blue NC Toner | Blue BCL Presscake |
| Color Index Name | Pigment Green 7 | Pigment Yellow 14 | Pigment Blue 15 | Vat Blue 6 |
| Color Index Number | 74260 | 21095 | 74160 | 69825 |
| Pigment, dry basis | 25 | 25 | 5 | 35 |
| Presscake, % solids | 30 | 29 | — | 20 |
| Presscake, wet | 84 | 86 | — | 175 |
| 2. Surface Active Agent* | | | | |
| Material (Trade Names) | | | | |
| Alipal CO-433[1] | 180 | | — | |
| Tamol SN[2] | — | | 2 | |
| Duponol ME[3] | — | | — | |
| Tamol 731[4] | — | | 7 | |
| Blancol[5] | 2 | | — | |
| 3. Water | 48 | | 109 | |
| Quantity | 48 | | 109 | |
| 4. Micronizing Slurry | | | | |
| Medium | sand | | sand | |
| 5. Micronizing | | | | |
| Time, hrs., approx. | 48 | | 48 | |
| Temperature, °C | 28 | | 28 | |
| Average Particle Size Diameter (microns) | <0.02 | | <0.02 | |
| 6. Separation | | | | |
| Screening (X) | X | | X | |
| 7. Water Dilution | 100 | | 150 | |
| 8. Yield | | | | |
| Aq. Pig. Disp. | 500 | | 450 | |
| B. Polymerization Step | | | | |
| 9A. Surface Active Agent* | | | | |
| a. Quantity, Type | — | | 25[3] | |
| b. Quantity, Type | — | | — | |
| Water | — | | 25 | |
| 9B. Monomer Material (non-crosslinking) | | | | |
| Styrene | 68 | | — | |
| Methylmethacrylate | 10 | | 65 | |
| Cyclohexylmethacrylate | 10 | | 23 | |
| Dimethylaminoethylmethacrylate | 2 | | 2 | |
| 9C. Monomer Material (crosslinking) | | | | |
| Divinylbenzene (50%) | 10 | | — | |
| EGDM[6] | — | | 10 | |
| 9D. Polymerization Initiator | | | | |
| Potassium Persulfate | — | | 3.0 | |
| Sodium Bisulfite | — | | 1.5 | |
| AZDN[7] | 3 | | — | |
| 10. Polymerization Conditions | | | | |
| Time, hrs. approx. | 6 | | 6 | |
| Temperature, °C. | 80 | | 70 | |
| Conversion approx. 100% (X) | X | | X | |
| 11. Intrachromospheruloid Pigment Comp. (latex) | | | | |
| Yield | 600 | | 600 | |
| Essentially non-settling (X) | X | | X | |

*Capable of effecting emulsion polymerization
[1] sodium salt of a sulfate ester of an alkylphenoxy poly(ethyleneoxy)ethanol (28% active)
[2] sodium salt of a condensed napthalene sulfonic acid [3] sodium lauryl sulfate (100% active)
[4] sodium salt of a polymeric carboxylic acid
[5] sodium salt of a sulfonated napthaleneformaldehyde condensate (90% active)
[6] ethyleneglycol dimethacrylate
[7] azobisisobutyronitrile

TABLE 18

Preparation of Aqueous Dispersion of Intrachromospheruloid Pigment Composition
(Parts by weight)

| Example No. 18- | -1 | | -2 | |
|---|---|---|---|---|
| A. Micronizing Step | | | | |
| 1. Pigment | | | | |
| Pigment Class | Quinacridone | Triphenylmethane | Vat isoindoline | Tetrachloro- |
| Trade Name | Pigment Monastral Red Y | Pigment Rhodamine Y | Vat Brilliant Green Presscake | Pigment Irgazin Yellow 2GLT |
| Color Index Name | Violet 19 | Red 81 | Green 1 | Yellow 109 |
| Color Index Number | 46500 | 45160 | 59825 | — |
| Pigment, dry basis | 20 | 20 | 20 | 25 |
| Presscake, solids | — | — | 18 | — |
| Presscake, wet | — | — | 111 | — |
| 2. Surface Active Agent* | | | | |
| Material (Trade Names) | | | | |
| Duponol ME[1] | 2 | | | |
| Tamol 731[2] | 5 | | | |
| Alipal CO-433[3] | — | | 20 | |
| Tamol SN[4] | 2 | | 2 | |
| SMA Copolymer[5] | — | | 20 | |
| 3. Water | | | | |
| Quantity | 200 | | 100 | |
| 4. Micronizing Slurry | | | | |
| Medium | sand | | ball | |
| 5. Micronizing | | | | |
| Time, hrs., approx. | 36 | | 40 | |
| Temperature, °C. | 28 | | 28 | |
| Average Particle Size Diameter (microns) | <0.2 | | <0.2 | |
| 6. Separation | | | | |
| Screening (X) | X | | X | |
| 7. Water Dilution | 151 | | 122 | |
| 8. Yield | | | | |
| Aq. Pig. Disp. | 400 | | 400 | |
| B. Polymerization Step | | | | |
| 9A. Surface Active Agent* | | | | |
| a. Quantity, Type | 30[1] | | 40[3] | |
| b. Quantity, Type | — | | — | |
| Water | 70 | | 60 | |
| 9B. Monomer Material (non-crosslinking) | | | | |
| Styrene | 78 | | 40 | |
| Methylmethacrylate | 20 | | 40 | |
| 9C. Monomer Material (crosslinking) | | | | |
| Divinylbenzene (50%) | — | | 20 | |
| Oiticica Oil | 2 | | — | |
| 9D. Polymerization Initiator | | | | |
| AZDN[6] | 3 | | 3 | |
| 10. Polymerization Conditions | | | | |
| Time, hrs., approx. | 5 | | 5 | |
| Temperature, °C. | 80 | | 80 | |
| Conversion approx. 100% (X) | X | | X | |
| 11. Intrachromospheruloid Pigment Comp. (latex) | | | | |
| Yield | 600 | | 600 | |
| Essentially non-settling (X) | X | | X | |

*Capable of effecting emulsion polymerization.
[1] sodium lauryl sulfate (100% active)
[2] sodium salt of polymeric carboxylic acid
[3] sodium salt of a sulfate ester of an alkylphenoxy poly(ethyleneoxy) ethanol (28% active)
[4] sodium salt of a condensed napthalene sulfonic acid
[5] copolymer of styrene, methacrylic acid and acrylonitrile ratio 25/65/10
[6] azobisisobutyronitrile

TABLE 19

Preparation of Aqueous Dispersion of Intrachromospheruloid Pigment Composition
(Parts by weight)

| Example No. 19- | | -1 | | -2 | |
|---|---|---|---|---|---|
| A. Micronizing Step | | | | | |
| 1. | Pigment | | | | |
| | Pigment Class | Vat | Quinacridone | Vat | Vat Flavanthrene |
| | Trade Name | Brilliant Pink FFT | Monastral Red Y | Orange GR Toner | Yellow Toner |
| | Color Index Name | Red 1 | Pigment Violet 19 | Vat Orange 7 | Vat Yellow 1 |
| | Color Index Number | 73360 | 46500 | 71105 | 70600 |
| | Pigment, dry basis | 25 | 25 | 20 | 30 |
| | Presscake, % solids | — | — | — | — |
| | Presscake, wet | — | — | — | — |
| 2. | Surface Active Agent* | | | | |
| | Material (Trade Names) | | | | |
| | Duponol ME[1] | — | | 2 | |
| | Tamol 731[2] | —6 | | | |
| | Alipal CO-433[3] | 180 | | — | |
| | Tamol SN[4] | 2 | | 2 | |
| | SMA Copolymer[5] | — | | 20 | |
| 3. | Water | | | | |
| | Quantity | 168 | | 220 | |
| 4. | Micronizing Slurry | | | | |
| | Medium | sand | | ball | |
| 5. | Microninzing | | | | |
| | Time, hrs., approx. | 48 | | 72 | |
| | Temperature, °C. | 28 | | 28 | |
| | Average Particle Size Diameter (microns) | <0.2 | | <0.2 | |
| 6. | Separation | | | | |
| | Screening (X) | X | | X | |
| 7. | Water Dilution | 100 | | 100 | |
| 8. | Yield | | | | |
| | Aq. Pig. Disp. | 500 | | 400 | |
| B. Polymerization Step | | | | | |
| 9A. | Surface Active Agent* | | | | |
| | a. Quantity, Type | — | | 20[1] | |
| | b. Quantity, Type | — | | — | |
| | Water | — | | 80 | |
| 9B. | Monomer Material (non-crosslinking) | | | | |
| | Styrene | 40 | | 40 | |
| | Methylmethacrylate | 40 | | 50 | |
| | Cyclohexylmethacrylate | 17 | | — | |
| 9C. | Monomer Material (crosslinking) | | | | |
| | Tung Oil | — | | 2 | |
| | Oiticica Oil | 3 | | — | |
| | EGDM[6] | — | | 8 | |
| 9D. | Polymerization Initiator | | | | |
| | AZDN[7] | 3 | | — | |
| | Potassium Persulfate | — | | 3.0 | |
| | Sodium Bisulfite | — | | 1.5 | |
| 10. | Polymerization Conditions | | | | |
| | Time, hrs., approx. | 5 | | 6 | |
| | Temperature, °C. | 80 | | 70 | |
| | Conversion approx. 100% (X) | X | | X | |
| 11 | Intrachromospheruloid Pigment Comp. (latex) | | | | |
| | Yield | 600 | | 600 | |
| | Essentially non-settling (X) | X | | X | |

*Capable of effecting emulsion polymerization
[1] sodium lauryl sulfate
[2] sodium salt of polymeric carboxylic acid
[3] sodium salt of a sulfate ester of an alkylphenoxypoly(ethyleneoxy) ethanol (28% active)
[4] sodium salt of condensed napthalene sulfonic acid
[5] copolymer of styrene, methacrylic acid acrylonitrile ratio 25/65/10
[6] ethyleneglycoldimethacrylate
[7] azobisisobutyronitrile

TABLE 20

Preparation of Aqueous Dispersion of Intrachromospheruloid Pigment Composition
(Parts by weight)

| Example No. 20 | | -1 | | -2 | |
|---|---|---|---|---|---|
| A. Micronizing Step | | | | | |
| 1. | Pigment | | | | |
| | Pigment Class | Tetrachloroisoindoline | Cond. Azo | Quinacridone | Azo |
| | Trade Name | Irgazin Yellow 3RLT Presscake | Chromophtal Red BR | Fastolux Magenta | Permanent Carmine FB |

TABLE 20-continued

Preparation of Aqueous Dispersion of Intrachromospheruloid Pigment Composition
(Parts by weight)

Example No. 20

| | | -1 | | -2 | |
|---|---|---|---|---|---|
| | Color Index Name | Yellow 110 | | Red 122 | Red 5 |
| | Color Index Number | | | | 12490 |
| | Pigment, dry basis | 10 | 35 | 5 | 35 |
| | Presscake, % solids | 25 | — | — | — |
| | Presscake, wet | 40 | — | — | — |
| 2. | Surface Active Agent* | | | | |
| | Material (Trade Names) | | | | |
| | Alipal CO-433[1] | — | | 80 | |
| | Tamol SN[2] | — | | 2 | |
| | Duomeen T[3] | 100 | | — | |
| | Triton X-405[4] | — | | — | |
| 3. | Water | | | | |
| | Quantity | 125 | | 200 | |
| 4. | Micronizing Slurry | | | | |
| | Medium | ball | | sand | |
| 5. | Micronizing | | | | |
| | Time, hrs., approx. | 60 | | 48 | |
| | Temperature, °C. | 28 | | 28 | |
| | Average Particle Size | | | | |
| | Diameter (microns) | <0.2 | | <0.02 | |
| 6. | Separation | | | | |
| | Screening (X) | X | | X | |
| 7. | Water Dilution | 100 | | 128 | |
| 8. | Yield | | | | |
| | Aq. Pig. Disp. | 400 | | 450 | |
| B. Polymerization Step | | | | | |
| 9A. | Surface Active Agent* | | | | |
| | a. Quantity, Type | 50[3] | | 30[4] | |
| | b. Quantity, Type | 50[4)] | | — | |
| | Water | — | | 20 | |
| 9B. | Monomer Material | | | | |
| | (non-crosslinking) | | | | |
| | Methylmethacrylate | 80 | | 80 | |
| | 4-Vinylpyridine | 10 | | — | |
| | Acrylic Acid | — | | — | |
| 9C. | Monomer Material | | | | |
| | (crosslinking) | | | | |
| | EGDM[5] | 10 | | 10 | |
| 9D. | Polymerization Initiator | | | | |
| | AZDN[6] | 3 | | 3 | |
| 10. | Polymerization Conditions | | | | |
| | Time, hrs., approx. | 6 | | 6 | |
| | Temperature, °C. | 75 | | 75 | |
| | Conversion | | | | |
| | approx. 100% (X) | X | | X | |
| 11. | Intrachromospheruloid | | | | |
| | Pigment Comp. (latex) | | | | |
| | Yield | 600 | | 600 | |
| | Essentially non-settling (X) | X | | X | |

*Capable of effecting emulsion polymerization
[1] sodium salt of a sulfate ester of an alkylphenoxy poly(ethyleneoxy) ethanol (28% active)
[2] sodium salt of a condensed naphthalene sulfonic acid
[3] N-tallow trimethylene diamine (20% solution as diacetate)
[4] octylphenoxy polyethoxy ethanol (70% active)
[5] ethyleneglycoldimethacrylate
[6] azobisisobutyronitrile

TABLE 21

Preparation of Aqueous Dispersion of Intrachromospheruloid Pigment Composition
(Parts by weight)

Example No. 21

| | | -1 | | -2 | |
|---|---|---|---|---|---|
| A. | Micronizing Step | | | | |
| 1. | Pigment | | | | |
| | Pigment Class | Vat | Vat | Quinacri-done | Dioxazine |
| | Trade Name | Brilliant Green I Presscake | Benzidine Yellow AOT Presscake | Magenta Presscake | Irgazin Violet 6 RLT |
| | Color Index Name | Green 1 | Yellow 14 | Red 122 | |
| | Pigment, dry basis | 20 | 30 | 30 | 5 |
| | Presscake, % solids | 20 | 28 | — | — |
| | Presscake, wet | 100 | 107 | — | — |
| 2. | Surface Active Agent* | | | | |
| | Material (Trade Names) | | | | |
| | Alipal CO-433[1] | 80 | | — | |
| | Tamol SN[2] | 2 | | | |
| | Duponol ME[3] | 1 | | 2 | |
| | Tamol 731[4] | — | | 7 | |
| | Zonyl FSH[5] | — | | 1 | |
| 3. | Water | | | | |

TABLE 21-continued

Preparation of Aqueous Dispersion of Intrachromospheruloid Pigment Composition
(Parts by weight)

| Example No. 21 | | −1 | −2 |
|---|---|---|---|
| | Quantity | 10 | 205 |
| 4. | Micronizing Slurry | | |
| | Medium | ball | sand |
| 5. | Micronizing | | |
| | Time, hrs., approx. | 40 | 48 |
| | Temperature, °C. | 28 | 28 |
| | Average Particle Size Diameter (microns) | <0.2 | <0.2 |
| 6. | Separation | | |
| | Screening (X) | X | X |
| 7. | Water Dilution | 100 | 150 |
| 8. | Yield | | |
| | Aq. Pig. Disp. | 400 | 400 |
| B. | Polymerization Step | | |
| 9A. | Surface Active Agent* | | |
| | a. Quantity, Type | 20[1] | 35[3] |
| | b. Quantity, Type | 10[3] | — |
| | Water | 70 | 65 |
| 9B. | Monomer Material (non-crosslinking) | | |
| | Methylmethacrylate | 80 | 70 |
| | Cyclohexylmethacrylate | — | 20 |
| | Methacrylic Acid | 10 | — |
| 9C. | Monomer Material (crosslinking) | | |
| | EGIM[6] | 10 | 10 |
| 9D. | Polymerization Initiator | | |
| | AZDN[7] | 3 | 3 |
| 10. | Polymerization Conditions | | |
| | Time, hrs., approx. | 6 | 6 |
| | Temperature, °C. | 80 | 75 |
| | Conversion approx. 100% (X) | X | X |
| 11. | Intrachromospheruloid Pigment Comp. (latex) | | |
| | Yield | 600 | 600 |
| | Essentially non-settling (X) | X | X |

*Capable of effecting emulsion polymerization
[1]sodium salt of a sulfate ester of an alkylphenoxy poly(ethyleneoxy) ethanol (28% active)
[2]sodium salt of condensed naphthalene sulfonic acid
[3]sodium lauryl sulfate (100% active)
[4]sodium salt of polymeric carboxylic acid
[5]fluorochemical surface active agent (100% active)
[6]ethyleneglycoldimethacrylate
[7]azobisisobutyronitrile

TABLE 22

Preparaton of Aqueous Dispersion of Intrachromospheruloid Pigment Composition
(Parts by weight)

| Example No. 22 | 1 | 2 | 3 | 4 | 5 |
|---|---|---|---|---|---|
| A. Micronizing Step | | | | | |
| 1. Pigment | | | | | |
| Pigment Class | | | Phthalocyanine | | |
| Trade Name | Heliogen Blue BG Presscake | Heliogen Green A | Polymon Blue G | Phthalocyanine Green Ex.Y Presscake | Heliogen Viridine Presscake |
| Color Index Name | Blue 15 | Green 7 | Blue 16 | Green 41 | Green 36 |
| Color Index Number | 74160 | 74260 | 74100 | | 74160 |
| Pigment, dry basis | 20 | 10 | 30 | 20 | 20 |
| Presscake, % solids | 35 | — | — | 20 | 25 |
| Presscake, wet | 57 | — | — | 100 | 80 |
| 2. Surface Active Agent* Material (Trade Names) | | | | | |
| Alipal CO-433[1] | 18 | 178 | — | — | — |
| Tamol SN[2] | 2 | — | — | 2 | — |
| Duomeen T[3] | — | — | 10 | — | — |
| Tallow soap[4] | — | — | — | 15 | — |
| Duponol ME[5] | — | — | — | — | 5 |
| Triton X-405[6] | — | — | — | — | 20 |
| 3. Water | | | | | |
| Quantity | 163 | 230 | 225 | 213 | 220 |
| 4. Micronizing Slurry | | | | | |
| Medium | sand | sand | sand | sand | sand |
| 5. Micronizing | | | | | |
| Time, hrs. approx. | 48 | 24 | 24 | 48 | 48 |
| Temperature, °C. | 28 | 28 | 28 | 28 | 28 |
| Average Particle Size Diameter (microns) | <0.02 | <0.2 | <0.2 | <0.02 | <0.02 |
| 6. Separation | | | | | |

TABLE 22-continued
Preparaton of Aqueous Dispersion of Intrachromospheruloid Pigment Composition

| Example No. 22 | 1 | 2 | 3 | 4 | 5 |
|---|---|---|---|---|---|
| Screening (X) | X | X | X | X | X |
| 7. Water Dilution | 160 | 82 | 135 | 170 | 175 |
| 8. Yield | | | | | |
| Aq. Pig. Disp. | 400 | 500 | 400 | 500 | 500 |
| B. Polymerization Step | | | | | |
| 9A. Surface Active Agent* | | | | | |
| a. Quant./type | 160[1] | — | 100[3] | 1[2] | 25[5] |
| b. Quant./type | — | — | — | 20[4] | 25[6] |
| Water | 40 | — | — | 79 | 50 |
| 9B. Monomer Material (non-crosslinking) | | | | | |
| Styrene | 100 | 95 | 90 | — | — |
| Cyclohexylmethacrylate | — | — | — | 100 | 86.6 |
| Methacrylic acid | — | 5 | — | — | — |
| 4-vinylpyridine | — | — | 10 | — | 4.8 |
| Dimethylaminoethyl-methacrylate | — | — | — | — | 8.6 |
| 9D. Polymerizaton Iniator | | | | | |
| "AZDN"[7] | 3 | 3 | 4 | 4 | 4 |
| 10. Polymerization Conditions | | | | | |
| Time, hrs. | 5 | 5 | 5 | 5 | 5 |
| Temperature, °C. | 80 | 80 | 80 | 80 | 80 |
| Conversion, approx. 100% (X) | X | X | X | X | X |
| 11. Intrachromospheruloid Pigment Comp. (latex) | | | | | |
| Yield | 700 | 600 | 600 | 700 | 700 |
| Essentially non-settling (X) | X | X | X | X | X |

*Capable of effecting emulsion polymerization
[1] sodium salt of sulfate ester of an alkylphenoxy poly(ethyleneoxy) ethanol (28% active)
[2] sodium salt of condensed naphthalene sulfonic acid
[3] N-tallow trimethylene diamine (20% solution as diacetate)
[4] sodium salt of hydrogenated tallow
[5] sodium lauryl sulfate (100% active)
[6] octylphenoxy polyethethoxy ethanol (70% active)
[7] azobisisobutyronitrile

TABLE 23
Preparation of Aqueous Dispersion of Intrachromospheruloid Pigment Composition

| Example No. 23 | 1 | 2 | 3 | 4 | 5 |
|---|---|---|---|---|---|
| A. Micronizing Step | | | | | |
| 1. Pigment | | | | | |
| Pigment Class | | | Quinacridone | | |
| Trade Name | Monastral Red B | Monastral Red Y | Quinacridone Magenta Presscake | — | Quinacridone Magenta |
| Color Index Name | Violet 19 | Violet 19 | Red 122 | Red 192 | Red 122 |
| Color Index Number | 46500 | 46500 | — | — | — |
| Pigment, dry basis | 30 | 40 | 30 | 32 | 40 |
| Pigment, % solids | — | — | 25 | — | — |
| Presscake, wet | — | — | 120 | — | — |
| 2. Surface Active Agent* Material (Trade Names) | | | | | |
| Alipal Co-433[1] | 178 | — | — | — | — |
| Tamol SN[2] | 2 | 2 | — | — | — |
| Santomerse Me[3] | — | 20 | — | — | — |
| Daxad 11[4] | — | — | 20 | — | — |
| Deriphat 154[5] | — | — | — | 20 | — |
| Duponol ME[6] | — | — | — | 10 | — |
| Duomac C[7] | — | — | — | — | 20 |
| Triton X-405[8] | — | 10 | 12 | — | — |
| 3. Water | | | | | |
| Quantity | 220 | 240 | 230 | 320 | 220 |
| 4. Micronizing Slurry | | | | | |
| Medium | sand | ball | sand | sand | sand |
| 5. Micronizing | | | | | |
| Time, hrs. approx. | 24 | 60 | 12 | 24 | 48 |
| Temperature, °C. | 28 | 28 | 28 | 28 | 28 |
| Average Particle Size Diameter (microns) | <0.2 | <0.02 | <0.2 | <0.2 | <0.02 |
| 6. Separation | | | | | |
| Screening (X) | X | X | X | X | X |
| 7. Water Dilution | 70 | 88 | 118 | 118 | 110 |
| 8. Yield | | | | | |
| Aq. Pig. Disp. | 500 | 400 | 500 | 500 | 400 |
| B. Polymerization Step | | | | | |
| 9A. Surface Active Agent* | | | | | |
| a. Quantity type | — | 30[8] | 20[1] | 25[6] | 10[7] |

TABLE 23-continued

Preparation of Aqueous Dispersion of Intrachromospheruloid Pigment Composition

| Example No. 23 | 1 | 2 | 3 | 4 | 5 |
|---|---|---|---|---|---|
| (Parts by weight) | | | | | |
| b. Quantity type | — | — | 20[8] | — | 35[8] |
| Water | — | 70 | 60 | 75 | 55 |
| 9B. Monomer Material (non-crosslinking) | | | | | |
| Vinyltoluene | 95 | — | — | — | — |
| Acrylonitrile | 5 | — | — | — | — |
| Methylmethacrylate | — | 90 | — | 95 | 85 |
| Butyl acrylate | — | — | 100 | — | — |
| Hydroxyethylmethacrylate | — | 10 | — | — | — |
| Acrylic acid | — | — | — | 5 | — |
| Dimethylaminoethyl-methacrylate | — | — | — | — | 15 |
| 9D. Polymerization Initiator AZDN[9] | | | | | |
| 10. Polymerization Condition | | | | | |
| Time, hrs. | 4 | 4 | 4 | 4 | 4 |
| Temperature, °C. | 80 | 80 | 80 | 80 | 80 |
| Conversion, approx. 100% (X) | X | X | X | X | X |
| 11. Intrachromospheruloid Pigment Comp. (latex) | | | | | |
| Yield | 600 | 600 | 700 | 700 | 700 |
| Essentially non-settling (X) | X | X | X | X | X |

*Capable of effecting emulsion polymerization
[1] sodium salt of a sulfate ester of an alkylphenoxy poly(ethyleneoxy) ethanol (28% active)
[2] sodium salt of condensed naphthalene sulfonic acid
[3] linear dodecylbenzene sodium sulfonate (58% active)
[4] polymerized sodium salts of alkyl naphthalene sulfonic acid (87% active)
[5] disodium salt of N-tallow beta amino diproprionate (100% active)
[6] sodium lauryl sulfate (100% active)
[7] N-cocoa trimethylene diamine acetate (85% active)
[8] octylphenoxy polyethoxy ethanol (70% active)
[9] azobisisobutyronitrile

TABLE 24

Preparation of Aqueous Dispersion of Intrachromospheruloid Pigment Composition

| Example No. 24 | 1 | 2 | 3 | 4 | 5 |
|---|---|---|---|---|---|
| (Parts by weight) | | | | | |
| A. Micronizing Step | | | | | |
| 1. Pigment | | | | | |
| Pigment Class | Azamethine (Tetrachleroisoindoline) | | | | |
| Trade Name | Irgazin Yellow 3RLT | Irgazin Yellow 2GLT | Irgazin Orange RLT | Irgazin Red 2BLT | Irgazin Yellow 3RLT |
| Color Index Name | Yellow 110 | Yellow 109 | Orange 42 | Red 180 | Yellow 110 |
| Color Index Number | — | — | — | — | — |
| Pigment, dry basis | 40 | 25 | 30 | 32 | 30 |
| Presscake, % solids | — | — | — | — | 30 |
| Presscake, wet | — | — | — | — | 100 |
| 2. Surface Active Agent* Material (Trade Names) | | | | | |
| Alipal CO-433[1] | 55 | 180 | — | — | — |
| Tamol SN[2] | 2 | — | 2 | — | 2 |
| Dowfax 2A1[3] | — | — | 20 | — | — |
| Emkal NNS[4] | — | — | — | 20 | — |
| Duomac T[5] | — | — | — | — | 25 |
| Triton X-305[6] | — | — | — | — | 15 |
| Triton X-405[7] | — | — | 5 | 5 | — |
| 3. Water | | | | | |
| Quantity | 177 | 215 | 220 | 220 | 199 |
| 4. Micronizing Slurry | | | | | |
| Medium | sand | sand | ball | ball | sand |
| 5. Micronizing | | | | | |
| Time, hrs. approx. | 36 | 48 | 72 | 30 | 72 |
| Temperature, °C. | 28 | 28 | 28 | 28 | 28 |
| Average Particle Size Diameter (microns) | <0.2 | <0.02 | <0.2 | <0.2 | <0.02 |
| 6. Separation | | | | | |
| Screening (X) | X | X | X | X | X |
| 7. Water Dilution | 126 | 80 | 123 | 123 | 109 |
| 8. Yield | | | | | |
| Aq. Pig. Disp. | 400 | 500 | 400 | 400 | 450 |
| B. Polymerization Step | | | | | |
| 9A. Surface Active Agent* | | | | | |
| a. Quantity, Type | 87[1] | — | 25[6] | 25[7] | 10[5] |
| b. Quantity, Type | 2[2] | — | 25[7] | — | 25[7] |
| Water | 111 | — | 50 | 75 | 15 |
| 9B. Monomer Material (non-crosslinking) | | | | | |
| Styrene | 80 | 90 | 85 | — | — |

TABLE 24-continued

Preparation of Aqueous Dispersion of Intrachromospheruloid Pigment Composition

| Example No. 24 | (Parts by weight) 1 | 2 | 3 | 4 | 5 |
|---|---|---|---|---|---|
| 4-vinylpyridine | — | 10 | — | — | — |
| Methylmethacrylate | 10 | — | — | 90.7 | 82.9 |
| Methacrylic acid | 8 | — | 15 | — | 7.8 |
| Diethylamino-ethylmethacrylate | 2 | — | — | 9.3 | 9.3 |
| 9D. Polymerization Initiator | | | | | |
| AZDN[8] | 4 | 4 | 4 | 4 | 4 |
| 10. Polymerization Condition | | | | | |
| Time, hrs. | 4 | 4 | 4 | 4 | 4 |
| Temperature, °C. | 80 | 80 | 80 | 80 | 80 |
| Conversion, approx. 100% (X) | X | X | X | X | X |
| 11. Intrachromospheruloid Pigment Comp. (latex) | | | | | |
| Yield | 700 | 600 | 600 | 600 | 600 |
| Essentially non-settling (X) | X | X | X | X | X |

*Capable of effecting emulsion polymerization
[1] sodium salt of a sulfate ester of an alkylphenoxy poly(ethyleneoxy) ethanol (28% active)
[2] sodium salt of condensed napthalene sulfonic acid
[3] sodium dodecyl diphenylether disulfonate (45% active)
[4] nonyl naphthalene sodium sulfonate (35% active)
[5] N-tallow trimethylene diamine diacetate (85% active)
[6] octylphenoxy polyethoxy ethanol (70% active)
[7] octylphenoxypolyethoxy ethanol (70% active)
[8] azobisisobutyronitrile

TABLE 25

Preparation of Aqueous Dispersion of Intrachromospheruloid Pigment Composition

| Example No. 25 | (Parts by weight) 1 | 2 | 3 | 4 | 5 |
|---|---|---|---|---|---|
| A. Micronizing Step | | | | | |
| 1. Pigment | | | | | |
| Pigment Class | | | Dioxazine | | |
| Trade Name | Irgazin Violet 6RLT | Carbazol Violet Presscake | Irgazin Violet BLT | Chromo-phtal Violet B | Heliogen Violet Presscake |
| Color Index Name | | Violet 23 | | | Violet 23 |
| Color Index Number | — | 51319 | — | — | 51319 |
| Pigment, dry basis | 20 | 10 | 10 | 15 | 10 |
| Presscake, % solids | — | 20 | — | — | 20 |
| Presscake, wet | — | 50 | — | — | 50 |
| 2. Surface Active Agent* Material (Trade Names) | | | | | |
| Alipal CO-433[2] | 178 | 89 | — | — | — |
| Tamol SN[3] | 2 | 2 | — | — | — |
| Aerosol MA[4] | — | — | 10 | 10 | — |
| Aerosol OT[5] | — | — | — | — | 5 |
| Aerosol TR[6] | — | — | — | 10 | 5 |
| Aerosol 22[7] | — | — | 20 | — | 5 |
| Triton X-405[8] | — | — | 5 | — | 5 |
| 3. Water | | | | | |
| Quantity | 200 | 240 | 120 | 220 | 205 |
| 4. Micronizing Slurry | | | | | |
| Medium | sand | sand | sand | sand | sand |
| 5. Micronizing | | | | | |
| Time, hrs. approx. | 48 | 24 | 24 | 24 | 48 |
| Temperarture, °C. | 28 | 28 | 28 | 28 | 28 |
| Average Particle Size Diameter (microns) | <0.02 | <0.2 | <0.02 | <0.2 | <0.02 |
| 6. Separation | | | | | |
| Screening (X) | X | X | X | X | X |
| 7. Water Dilution | 100 | 119 | 133 | 145 | 125 |
| 8. Yield | | | | | |
| Aq. Pig. Disp. | 500 | 500 | 300 | 400 | 400 |
| B. Polymerizaton Step | | | | | |
| 9A. Surface Active Agent* | | | | | |
| a. Quantity, Type | — | 89[2] | 25[2] | 20[7] | 25[8] |
| b. Quantity, Type | — | — | 25[8] | 25[8] | — |
| Water | 98 | 11 | 50 | 55 | 75 |
| 9B. Monomer Material (non-crosslinking) | | | | | |
| Styrene | 2 | 90 | 180.9 | 89.5 | 91.4 |
| 4-Vinylpyridine | — | — | 10.5 | 10.5 | — |
| Methacrylic acid | — | — | 8.6 | — | 8.6 |
| Acrylonitrile | — | 10 | — | — | — |
| 9D. Polymerization Initiator | | | | | |
| AZDN[9] | 1 | 3 | 5 | 3 | 2 |
| 10. Polymerization Conditions | | | | | |
| Time, hrs. approx. | 4 | 4 | 4 | 4 | 4 |
| Temperature, °C. | 80 | 80 | 80 | 80 | 80 |
| Conversion approx. | | | | | |

TABLE 25-continued

Preparation of Aqueous Dispersion of Intrachromospheruloid Pigment Composition

| Example No. 25 | 1 | 2 | 3 | 4 | 5 |
|---|---|---|---|---|---|
| (Parts by weight) | | | | | |
| 100% (X) | X | X | X | X | X |
| 11. Intrachromospheruloid Pigment Comp. (latex) | | | | | |
| Yield | 600 | 700 | 600 | 600 | 600 |
| Essentially non-settling (X) | X | X | X | X | X |

*Capable of effecting emulsion polymerization.
[1] See the Chemistry of Synthetic Dyes by K. Venkataraman, Vol. V, page 425
[2] sodium salt of a sulfate ester of an alkylphenoxy poly(ethleneoxy) ethanol (28% active)
[3] sodium salt of condensed naphthalene sulfonic acid
[4] dihexyl ester of sodium sulfosuccinic acid (80% active)
[5] dioctylester of sodium sulfosuccinic (100% active)
[6] bis(tridecyl)ester of sodium sulfosuccinic acid (70% active)
[7] tetrasodium N-(1,2-dicarboxyethyl)-N-octadecylsulfosuccinamate (35% active)
[8] octylphenoxy polyethoxy ethanol (70% active)
[9] azobisisobutyronitrile

TABLE 26

Preparation of Aqueous Dispersion of Intrachromospheruloid Pigment Composition

| Example No. 26 | 1 | 2 | 3 | 4 | 5 |
|---|---|---|---|---|---|
| (Parts by weight) | | | | | |
| A. Micronizing Step | | | | | |
| 1. Pigment | | | | | |
| Pigment Class | Azo | | | | |
| Trade Name | Hansa Yellow G Presscake | Hansa Yellow 10G | Hansa Yellow 3R | Benzidine Yellow Toner | Pigment Carmine FFY Presscake |
| Color Index Name | Yellow 1 | Yellow 3 | Orange 1 | Yellow 12 | Red 5 |
| Color Index Number | 11680 | 11710 | 11725 | 21090 | 12490 |
| Pigment, dry basis | 40 | 25 | 20 | 30 | 25 |
| Presscake, % solids | 35 | — | — | — | 25 |
| Presscake, wet | 115 | — | — | — | 100 |
| 2. Surface Active Agent* Material (Trade Names) | | | | | |
| Alipal CO-433[1] | 89 | 89 | — | — | 25 |
| Tamol SN[2] | 2 | — | — | — | — |
| Duponol ME[3] | — | — | 5 | — | — |
| Armac T[4] | — | — | — | 20 | — |
| Duomac T[5] | — | — | — | 10 | — |
| Triton X-405[6] | — | — | 20 | 20 | 20 |
| 3. Water | | | | | |
| Quantity | 94 | 152 | 230 | 220 | 130 |
| 4. Micronizing Slurry | | | | | |
| Medium | sand | sand | ball | ball | ball |
| 5. Micronizing | | | | | |
| Time, hrs. approx. | 48 | 24 | 60 | 30 | 60 |
| Temperature, °C. | 28 | 28 | 28 | 28 | 28 |
| Average Particle Size Diameter (microns) | <0.02 | <0.2 | <0.02 | <0.2 | <0.02 |
| 6. Separation | | | | | |
| Screening (X) | X | X | X | X | X |
| 7. Water Dilution | 100 | 134 | 125 | 100 | 125 |
| 8. Yield | | | | | |
| Aq. Pig. Disp. | 400 | 400 | 400 | 400 | 400 |
| B. Polymerization Step | | | | | |
| 9A. Surface Active Agent* | | | | | |
| a. Quantity, Type | 89[1] | 89[1] | 2[2] | 20[5] | 89[1] |
| b. Quantity, Type | — | — | 23[3] | 20[6] | — |
| Water | 11 | 11 | 75 | 60 | 11 |
| 9B. Monomer Material (non-crosslinking) | | | | | |
| Styrene | — | 90 | 8 | 90 | — |
| Vinyl Toluene | — | — | 78.4 | — | — |
| Methylmethacrylate | 90 | — | — | — | 100 |
| Methacrylic Acid | 10 | — | 4.3 | — | — |
| 4-vinylpyridine | — | 10 | — | 10 | — |
| Diethylaminoethylmethacrylate | — | — | 9.3 | — | — |
| 9D. Polymerization Initiator | | | | | |
| AZDN[7] | 3 | 3 | 3 | 3 | 3 |
| 10. Polymerization Conditions | | | | | |
| Time, hrs. | 5 | 5 | 5 | 5 | 5 |
| Temperature, °C. | 80 | 80 | 80 | 80 | 80 |
| Conversion, approx. 100% (X) | X | X | X | X | X |
| 11. Intrachromospheruloid Pigment Comp. (latex) | | | | | |
| Yield | 600 | 600 | 600 | 600 | 600 |
| Essentially non- | | | | | |

TABLE 26-continued

Preparation of Aqueous Dispersion of Intrachromospheruloid Pigment Composition

| Example No. 26 | (Parts by weight) 1 | 2 | 3 | 4 | 5 |
|---|---|---|---|---|---|
| settling (X) | X | X | X | X | X |

*Capable of effecting emulsion polymerization
[1] sodium salt of a sulfate ester of an alkylphenoxy poly(ethyleneoxy) ethanol (28% active)
[2] sodium salt of condensed naphthalene sulfonic acid
[3] sodium lauryl sulfate (100% active)
[4] N-tallow amine acetate (100% active)
[5] N-tallow trimethylene diamine deacetate (85% active)
[6] octylphenoxy polyethoxy ethanol (70% active)
[7] azobisisobutyronitrile

TABLE 27

Preparation of Aqueous Dispersion of Intrachromospheruloid Pigment Composition

| Example No. 27 | (Parts by weight) 1 | 2 | 3 | 4 | 5 |
|---|---|---|---|---|---|
| A. Micronizing Step | | | | | |
| 1. Pigment | | | | | |
| Pigment Class | Triphenylmethane | | | | |
| Trade Name | Rhodamine Y | Rhodamine B | Consul Green | Irgalite Violet TCR | Victoria Blue |
| Color Index Name | Red 81 | Violet 1 | Green 2 | Violet 3 | Blue 1 |
| Color Index No. | 45160 | 45170 | 42040 49010 | 42535 | 42595 |
| Pigment, dry basis | 20 | 10 | 20 | 10 | 5 |
| Presscake, % solids | 30 | — | 40 | — | — |
| Presscake, wet | 67 | — | 50 | — | — |
| 2. Surface Active Agent* Material (Trade Names) | | | | | |
| Alipal CO-433[1] | 160 | 130 | — | — | — |
| Tamol SN[2] | 2 | — | — | — | — |
| Blancol[3] | — | 2 | — | — | 2 |
| Triton X-305[4] | — | — | 32 | — | 20 |
| Triton X-405[5] | — | — | — | — | 50 |
| Armac C[6] | — | — | 25 | — | — |
| Potassium stearate | — | — | — | 22 | — |
| 3. Water | | | | | |
| Quantity | 183 | 130 | 200 | 220 | 200 |
| 4. Micronizing Slurry | | | | | |
| Medium | sand | sand | sand | sand | ball |
| 5. Micronizing | | | | | |
| Time, hrs. approx. | 24 | 24 | 48 | 36 | 40 |
| Temperature, °C. | 28 | 28 | 28 | 28 | 28 |
| Average Particle Size Diameter (microns) | <0.2 | <0.2 | <0.02 | <0.02 | <0.2 |
| 6. Separation | | | | | |
| Screening (X) | X | X | X | X | X |
| 7. Water Dilution | 88 | 128 | 93 | 158 | 123 |
| 8. Yield | | | | | |
| Aq. Pig. Disp. | 500 | 400 | 400 | 400 | 400 |
| B. Polymerization Step | | | | | |
| 9A. Surface Active Agent* | | | | | |
| a. Quantity, Type | — | 30[4] | — | 2[3] | — |
| b. Quantity, Type | — | — | — | 50[5] | — |
| Water | — | 70 | — | 48 | — |
| 9B. Monomer Material (non-crosslinking) | | | | | |
| Cyclohexylmethacrylate | 100 | 95 | 95 | 95 | 95 |
| Acrylonitrile | — | 5 | — | — | — |
| Vinyltrifluoroacetate | — | — | 5 | — | — |
| Vinylethylketone | — | — | — | 5 | — |
| Isoprene | — | — | — | — | 5 |
| 9D. Polymerization Initiator | | | | | |
| AZDN[7] | 3 | 3 | 3 | 3 | 3 |
| 10. Polymerization Conditions | | | | | |
| Time, hrs. | 4 | 4 | 4 | 4 | 4 |
| Temperature, °C. | 80 | 80 | 80 | 80 | 80 |
| Conversion approx. 100% (X) | X | X | X | X | X |
| 11. Intrachromospheruloid Pigment Comp. (latex) | | | | | |
| Yield | 600 | 600 | 500 | 600 | 500 |
| Essentially non- | | | | | |

TABLE 27-continued

Preparation of Aqueous Dispersion of Intrachromospheruloid Pigment Composition (Parts by weight)

| Example No. 27 | 1 | 2 | 3 | 4 | 5 |
|---|---|---|---|---|---|
| settling (X) | X | X | X | X | X |

*Capable of effecting emulsion polymerization
[1] sodium salt of a sulfate ester of an alkylphenoxy poly(ethyleneoxy) ethanol (28% active)
[2] sodium salt of condensed naphthalene sulfonic acid
[3] sodium salt of a sulfonated naphthaleneformaldehyde condensate (86% active)
[4] octylphenoxy polyethoxy ethanol (70% active)
[5] octylphenoxy polyethoxy ethanol (70% active)
[6] N-cocoa amine acetate (100% active)
[7] azobisisobutyronitrile

TABLE 28

Preparation of Aqueous Dispersion of Intrachromospheruloid Pigment Composition (Parts by weight)

| Example No. 28 | | 1 | 2 | 3 | 4 | 5 |
|---|---|---|---|---|---|---|
| A. | Micronizing Step | | | | | |
| 1 | Pigment | | | | | |
| | Pigment Class | | Vat | | | |
| | Trade Name | | Perylene Red Presscake | Indanthren Rubine R | Sandothrene Blue NCCD | Indenthren Bril. Orange RK | Indenthren Red FBBA |
| | Color Index Name | | Vat Red 29 | Vat Red 13 | Vat Blue 14 | Vat Orange 3 | Vat Red 10 |
| | Color Index Number | | 71140 | 70320 | 69810 | 59300 | 67000 |
| | Pigment, dry basis | | 25 | 30 | 25 | 45 | 50 |
| | Presscake, % solids | | 25 | 28 | 20 | — | — |
| | Presscake, wet | | 100 | 107 | 125 | — | — |
| 2. | Surface Active Agent* | | | | | | |
| | Material (Trade Names) | | | | | | |
| | Alipal CO-433[1] | | 78 | 15 | — | — | — |
| | Tamol SN[2] | | 2 | — | 2 | — | — |
| | Igepon CN-42[3] | | — | 25 | 20 | — | — |
| | Gafac RE-610[4] | | — | — | — | 30 | — |
| | Gafac RE-870[5] | | — | — | — | — | 20 |
| | Triton X-405[6] | | — | 25 | 30 | 5 | 5 |
| | Aqueous ammonia (28%) | | — | — | — | 15 | 10 |
| 3. | Water | | | | | | |
| | Quantity | | 200 | 220 | 220 | 205 | 200 |
| 4. | Micronizing Slurry | | | | | | |
| | Medium | | sand | sand | ball | ball | sand |
| 5. | Micronizing | | | | | | |
| | Time, hrs. approx. | | 48 | 48 | 30 | 60 | 24 |
| | Temperature, °C. | | 28 | 28 | 28 | 28 | 28 |
| | Average Particle Size Diameter (microns) | | <0.02 | <0.02 | <0.2 | <0.02 | <0.2 |
| 6. | Separation | | | | | | |
| | Screening (X) | | X | X X | X | X | X |
| 7. | Water Dilution | | 120 | 108 | 103 | 100 | 115 |
| 8. | Yield | | | | | | |
| | Aq. Pig. Disp. | | 500 | 500 | 500 | 400 | 400 |
| B. | Polymerization Step | | | | | | |
| 9A. | Surface Active Agent* | | | | | | |
| | a. Quantity, Type | | 100[1] | — | — | 50[6] | 50[6] |
| | b. Quantity, Type | | — | — | — | — | — |
| | Water | | — | — | — | 50 | 50 |
| 9B. | Monomer Material (non crosslinking) | | | | | | |
| | Styrene | | 100 | — | 80 | — | 80 |
| | Vinylidene Chloride | | — | 100 | — | — | — |
| | Vinylchloride | | — | — | — | 100 | — |
| | 4-Vinylpyridine | | — | — | 20 | — | — |
| | Acrylic Acid | | — | — | — | — | 20 |
| 9B. | Polymerization Initiator | | | | | | |
| | AZDN[7] | | 3 | 3 | 3 | 3 | 3 |
| 10. | Polymerization Conditions | | | | | | |
| | Time, hrs. approx. | | 4 | 4 | 4 | 4 | 4 |
| | Temperature, °C. | | 80 | 80 | 80 | 80 | 80 |
| | Conversion approx. 100% (X) | | X | X | X | X | X |
| 11. | Intrachromospheruloid Pigment Comp. (latex) | | | | | | |
| | Yield | | 700 | 600 | 600 | 600 | 600 |
| | Essentially non- | | | | | | |

TABLE 28-continued

Preparation of Aqueous Dispersion of Intrachromospheruloid Pigment Composition

| Example No. 28 | 1 | 2 | 3 | 4 | 5 |
|---|---|---|---|---|---|
| settling (X) | X | X | X | X | X |

*Capable of effecting emulsion polymerization
[1] sodium salt of a sulfate ester of an alkylphenoxy poly(ethyleneoxy) ethanol (28% active)
[2] sodium salt of condensed naphthalene sulfonic acid
[3] sodium N-cyclohexyl-N-palmitoyl-taurate (24% active)
[4] free acid of complex organic phosphate ester (100% active)
[5] free acid of complex organic phosphate ester (100% active)
[6] octylphenoxy polyethoxy ethanol (70% active)
[7] azobisisobutyronitrile

TABLE 29

Preparation of Aqueous Dispersion of Intrachromospheruloid Pigment Compositions

| Example No. 29- | 1 | 2 | 3 | 4 | 5 |
|---|---|---|---|---|---|
| A. Micronizing Step | | | | | |
| 1. Pigment | | | | | |
| Pigment Class | | | Fluorubines | | |
| Trade Name | (a) | (b) | (c) | (d) | (e) |
| Color Index Name | — | — | — | — | — |
| Color Index Number | — | — | — | — | — |
| Pigment, dry basis | 20 | 10 | 20 | 20 | 20 |
| Presscake, % solids | 18 | — | 20 | — | 25 |
| Presscake, wet | 90 | — | 100 | — | 80 |
| 2. Surface Active Agent* | | | | | |
| Material (Trade Names) | | | | | |
| Alipal CO-433 [1/] | 80 | — | — | 50 | — |
| Tamol SN [2/] | 2 | — | — | — | — |
| Aerosol MA [3/] | — | 10 | 10 | — | 10 |
| Aerosol TR [4/] | — | — | 10 | 10 | 10 |
| Blancol [5/] | — | — | — | 2 | 2 |
| Triton X-405 [6/] | — | 20 | 10 | — | 30 |
| 3. Water | | | | | |
| Quantity | 130 | 230 | 250 | 180 | 220 |
| 4. Micronizing Slurry | | | | | |
| Medium | sand | ball | ball | sand | sand |
| 5. Micronizing | | | | | |
| Time, hrs. approx. | 48 | 60 | 60 | 48 | 24 |
| Temperature, °C. | 28 | 28 | 28 | 28 | 28 |
| Average Particle Size Diameter (microns) | < 0.02 | < 0.2 | < 0.02 | < 0.2 | < 0.2 |
| 6. Separation | | | | | |
| Screening (X) | X | X | X | X | X |
| 7. Water Dilution | 98 | 130 | 120 | 138 | 148 |
| 8. Yield | | | | | |
| Aq. Pig. Disp. | 400 | 400 | 500 | 400 | 500 |
| B. Polymerization Step | | | | | |
| 9A. Surface Active Agent* | | | | | |
| a. Quantity, Type | 50 [1/] | 50 [6/] | 2 [5/] | 100 [1/] | 50 [1/] |
| b. Quantity, Type | 50 [6/] | — | 50 [6/] | — | — |
| Water | — | 50 | 48 | — | 50 |
| 9B. Monomer Material (non-crosslinking) | | | | | |
| Methylmethacrylate | 100 | 73.9 | 81.5 | 92.4 | 100 |
| Dimethylaminoethyl-methacrylate | — | 18.5 | 18.5 | — | — |
| Acrylic Acid | — | 7.6 | — | 7.6 | — |
| 9D. Polymerization Initiator | | | | | |
| AZDN [7/] | 3 | 3 | 3 | 3 | 3 |
| 10. Polymerization Conditions | | | | | |
| Time, hrs,. approx. | 4 | 4 | 4 | 4 | 4 |
| Temperature, °C. | 80 | 80 | 80 | 80 | 80 |
| Conversion approx. 100% (X) | X | X | X | X | X |
| 11. Intrachromospheruloid Pigment Comp. (latex) | | | | | |
| Yield | 600 | 600 | 700 | 600 | 700 |
| Essentially non-setteling (X) | X | X | X | X | X |

*Capable of effecting emulsion polymerication
[1/] sodium salt of a sulfate ester of an alkylphenoxy poly (ethyleneoxy) ethanol (28% active)
polymerization sodium salt of condensed naphthalene sulfonic acid
[3/] dihexyl ester of sodium sulfosuccinic acid (80% active)
[4/] bis(tridecyl)ester of sodium sulfosuccinic acid (100% active)
[5/] sodium salt of a sulfonated naphthaleneformaldehyde condensate (80% active)
[6/] octylphenoxy polyethoxy ethanol (70% active)
[7/] azobisisobutyronitrile
(a) 6,13-dihydropyrazino-(2,3-b; 5,6-b)diquinoxaline,- a bright yellow pigment

TABLE 29-continued
Preparation of Aqueous Dispersion of Intrachromospheruloid Pigment Compositions

| Example No. 29- | 1 | 2 | 3 | 4 | 5 |
|---|---|---|---|---|---|

(b) fluoflavine, a greenish yellow pigment of structure (c) quinoxalophenazinoxazine, a greenish yellow pigment of structure (d) quinoxaloanthraquinonoxazine, a red pigment of structure (e) quinoxalobenzothiazine, a bluish red pigment of structure

TABLE 30
Preparation of Aqueous Dispersion of Intrachromospheruloid Pigment Composition
(Parts by weight)

| Example No. 30- | | 1 | 2 | 3 | 4 | 5 |
|---|---|---|---|---|---|---|
| A. | Micronizing Step | | | | | |
| | 1. Pigment | | | | | |
| | Pigment Class | | | —Miscellaneous— | | |
| | Trade Name | Green B | Aniline Black | Naphtol Green B | Aniline Black | Green B |
| | Color Index Name | Green 8 | Black 1 | Green 12 | Black 1 | Green 8 |
| | Color Index Number | 10006 | 50440 | 10020 | 50440 | 10006 |
| | Pigment, dry basis | 25 | 45 | 25 | 35 | 25 |
| | Presscake, % solids | 40 | — | 30 | — | 40 |
| | Presscake, wet | 63 | — | 84 | — | 63 |
| | 2. Surface Active Agent* | | | | | |
| | Material (Trade Names) | | | | | |
| | Alipal CO-433[1] | 78 | — | — | 40 | 50 |
| | Tamol SN[2] | 2 | — | — | — | — |
| | Blancol[3] | — | 2 | — | 1 | 1 |
| | Igepal CA-897[4] | — | 15 | — | 20 | — |
| | Igepal CO-995[5] | — | — | 35 | — | 20 |
| | Triton X-405[6] | — | 20 | 22 | — | — |
| | 3. Water | | | | | |
| | Quantity | 225 | 225 | 225 | 225 | 225 |
| | 4. Micronizing Slurry | | | | | |
| | Medium | sand | sand | sand | sand | sand |
| | 5. Micronizing | | | | | |
| | Time, hrs. approx. | 48 | 24 | 24 | 48 | 48 |
| | Temperature, °C. | 28 | 28 | 28 | 28 | 28 |
| | Average Particle Size Diameter (microns) | <0.02 | <0.2 | <0.2 | <0.02 | <0.07 |
| | 6. Separation | | | | | |
| | Screening (X) | X | X | X | X | X |
| | 7. Water Dilution | 132 | 93 | 134 | 79 | 141 |
| | 8. Yield | | | | | |
| | Aq. Pig. Disp. | 500 | 400 | 500 | 400 | 500 |
| B. | Polymerization Step | | | | | |
| | 9A. Surface Active Agent* | | | | | |
| | a. Quantity, Type | 100[1] | — | — | 50[1] | 25[1] |
| | b. Quantity, Type | — | — | — | 1[3] | 25[5] |
| | Water | — | — | — | 49 | 50 |
| | 9B. Monomer Material | | | | | |

TABLE 30-continued

Preparation of Aqueous Dispersion of Intrachromospheruloid Pigment Composition
(Parts by weight)

|  |  |  |  |  |  |
|---|---|---|---|---|---|
| (non-crosslinking) |  |  |  |  |  |
| Methylmethacrylate | 90 | — | 5 | — | — |
| Styrene | — | 90 | 90 | 90 | 73.8 |
| Dodecylvinyl Ether | 10 | — | 5 | — | — |
| Octadecylvinyl Ether | — | 5 | — | 5 | — |
| 4-Vinylpyridine | — | 5 | — | — | 15.8 |
| Acrylic Acid | — | — | — | 5 | 10.4 |
| 9D. Polymerization Initiator |  |  |  |  |  |
| AZDN[7] | 3 | 3 | 3 | 3 | 3 |
| 10. Polymerization Conditions |  |  |  |  |  |
| Time, hrs. approx. | 4 | 4 | 4 | 4 | 4 |
| Temperature, °C. | 80 | 80 | 80 | 80 | 80 |
| Conversion approx. 100% (X) | X | X | X | X | X |
| 11. Intrachromospheruloid Pigment Comp. (latex) |  |  |  |  |  |
| Yield | 700 | 500 | 600 | 600 | 700 |
| Essentially non-setteling (X) | X | X | X | X | X |

*Capable of effecting emulsion polymerization
[1]sodium salt of a sulfate ester of an alkylphenoxy poly(ethyleneoxy) ethanol (28% active)
[2]sodium salt of condensed naphthalene sulfonic acid
[3]sodium salt of a sulfonated naphthaleneformaldehyde condensate (86% active)
[4]octylphenoxy poly(ethyleneoxy) ethanol (70% active)
[5]nonylphenoxy poly(ethyleneoxy) ethanol (50% active)
[6]octylphenoxy polyethoxy ethanol (70% active)
[7]azobisisobutyronitrile

TABLE 31

Preparation of Aqueous Dispersion of Intrachromospheruloid Pigment Composition
(Parts by weight)

| Example No. 31- | 1 | 2 | 3 | 4 | 5 |
|---|---|---|---|---|---|
| A. Micronizing Step |  |  |  |  |  |
| 1. Pigment |  |  |  |  |  |
| Pigment Class | Dioxazine | Phthalocyanine | Vat | Cond. Azo | Quinacridone |
| Trade Name | Heliogen Violet R Toner | Heliogen Blue BG Presscake | Indanthrene Pink R | Chromophtal Red BR | Quinacridone Magenta |
| Color Index Name | Violet 23 | Blue 15 | Vat Red 1 | — | Red 122 |
| Color Index Number | 51319 | 74160 | 73360 | — | — |
| Pigment, dry basis | 20 | 35 | 25 | 20 | 25 |
| Presscake, % solids | — | 35 | — | — | 25 |
| Presscake, wet | — | 100 | — | — | 100 |
| 2. Surface Active Agent* Material (Trade Names) |  |  |  |  |  |
| DACQ[1] | 30 | — | — | 25 | — |
| Acetic Acid | 10 | — | — | 9 | — |
| Monoquat TIBC[2] | — | 5 | — | 15 | — |
| Hyamine 10-X[3] | — | — | 10 | — | 10 |
| Tamol SN[4] | — | — | 2 | — | 2 |
| Triton X-405[5] | — | 5 | 40 | — | 20 |
| 3. Water |  |  |  |  |  |
| Quantity | 220 | 170 | 225 | 220 | 145 |
| 4. Micronizing Slurry |  |  |  |  |  |
| Medium | sand | sand | sand | sand | sand |
| 5. Micronizing |  |  |  |  |  |
| Time, hrs. approx. | 48 | 12 | 48 | 24 | 48 |
| Temperature, °C. | 28 | 28 | 28 | 28 | 28 |
| Average Particle Size Diameter (microns) | <0.02 | <0.2 | <0.2 | <0.2 | <0.02 |
| 6. Separation |  |  |  |  |  |
| Screening (X) | X | X | X | X | X |
| 7. Water Dilution | 120 | 120 | 98 | 111 | 123 |
| 8. Yield |  |  |  |  |  |
| Aq. Pig. Disp. | 400 | 400 | 400 | 400 | 400 |
| B. Polymerization Step |  |  |  |  |  |
| 9A. Surface Active Agent* |  |  |  |  |  |
| a. Quantity, Type | 50[5] | 10[2] | — | 50[5] | 30[5] |
| b. Quantity, Type | — | 40[5] | — | — | — |
| Water | 50 | 50 | — | 50 | 70 |
| 9B. Monomer Material (non-crosslinking) |  |  |  |  |  |
| Methylmethacrylate | 100 | 100 | — | — | — |
| Styrene | — | — | 100 | — | — |
| Vinylidene Chloride | — | — | — | 100 | — |
| Cyclohexylmethacrylate | — | — | — | — | 100 |
| 9D. Polymerization Initiator |  |  |  |  |  |
| AZDN[6] | 3 | 3 | 3 | 3 | 3 |
| 10. Polymerization Conditions |  |  |  |  |  |
| Time, hrs. approx. | 4.5 | 4.5 | 4.5 | 5 | 5 |
| Temperature, °C. | 80 | 80 | 80 | 80 | 80 |
| Conversion |  |  |  |  |  |

TABLE 31-continued

Preparation of Aqueous Dispersion of Intrachromospheruloid Pigment Composition
(Parts by weight)

|  |  |  |  |  |  |
|---|---|---|---|---|---|
| approx. 100% (X) | X | X | X | X | X |
| 11. Intrachromospheruloid Pigment Comp. (latex) |  |  |  |  |  |
| Yield | 600 | 600 | 500 | 600 | 600 |
| Essentially non-settling (X) | X | X | X | X | X |

*Capable of effecting emulsion polymerization
[1] 1 mole tallow amino propyl amine quaternized with 2 moles of allyl chloride
[2] substituted imidazoline quaternized with benzyl chloride (100% active)
[3] diisobutylcresoxyethoxyethyl dimethyl benzyl ammonium chloride monohydrate
[4] sodium salt of condensed naphthalene sulfonic acid
[5] octylphenoxy polyethoxy ethanol (70% active)
[6] azobisisobutyronitrile

TABLE 32

Preparation of Aqueous Dispersion of Intrachromospheruloid Pigment Composition
(Parts by weight)

| Example No. 32- | 1 | 2 | 3 | 4 | 5 |
|---|---|---|---|---|---|
| A. Micronizing Step |  |  |  |  |  |
| 1. Pigment |  |  |  |  |  |
| Pigment Class | Phthalocyanine | Azo | Dioxzine | Vat | Tetrachloroisoindoline |
| Trade Name | Heliogen Green G | Lithol Red Ba Toner | Irgazin Violet BLT | Indanthren Blue BC Presscake | Irgazin Yellow 3 RLT |
| Color Index Name | Green 7 | Red 49 | — | Vat Blue 6 | Yellow 110 |
| Color Index Number | 74260 | 15630 | — | 69825 | — |
| Pigment, dry basis | 20 | 25 | 20 | 30 | 20 |
| Presscake, % solids | 37 | — | — | 20 | 20 |
| Presscake, wet | 54 | — | — | 150 | 100 |
| 2. Surface Active Agent* Material (Trade Names) |  |  |  |  |  |
| Duomeen T[1] | 40 | — | — | — | — |
| Armeen T[2] | — | 50 | — | — | — |
| Monazoline T[3] | — | — | 20 | — | — |
| Armac C[4] | — | — | — | 15 | 15 |
| Triton X-405[5] | 30 | 30 | 30 | 30 | 30 |
| Acetic Acid | — | — | 4 | — | — |
| Hydroxyacetic Acid | — | — | — | 4 | 4 |
| 3. Water |  |  |  |  |  |
| Quantity | 170 | 195 | 220 | 191 | 220 |
| 4. Micronizing Slurry |  |  |  |  |  |
| Medium | sand | ball | sand | sand | ball |
| 5. Micronizing |  |  |  |  |  |
| Time, hrs. approx. | 48 | 60 | 24 | 48 | 48 |
| Temperature, °C. | 28 | 28 | 28 | 28 | 28 |
| Average Particle Size Diameter (microns) | <0.02 | <0.02 | <0.2 | <0.02 | <0.2 |
| 6. Separation |  |  |  |  |  |
| Screening (X) | X | X | X | X | X |
| 7. Water Dilution | 106 | 100 | 106 | 120 | 141 |
| 8. Yield |  |  |  |  |  |
| Aq. Pig. Disp. | 400 | 400 | 11 | 500 | 500 |
| B. Polymerization Step |  |  |  |  |  |
| 9A. Surface Active Agent* |  |  |  |  |  |
| a. Quantity, Type | 60[1] | 70[2] | 40[3] | 50[1] | 20[1] |
| b. Quantity, Type | — | — | — | — | 40[2] |
| Water | 40 | 30 | 60 | 50 | 40 |
| 9B. Monomer Material (non-crosslinking) |  |  |  |  |  |
| Styrene | 90 | 100 | 100 | 95 | — |
| Acrylonitrile | 10 | — | — | — | — |
| Hydroxypropylmethacrylate | — | — | — | 5 | — |
| Vinyltoluene | — | — | — | — | 100 |
| 9D. Polymerization Initiator |  |  |  |  |  |
| AZDN[6] | 3 | 3 | 3 | 3 | 3 |
| 10. Polymerization Conditions |  |  |  |  |  |
| Time, hrs. approx. | 4 | 4 | 4 | 4 | 4 |
| Temperature, °C. | 80 | 80 | 80 | 80 | 80 |
| Conversion approx. 100% (X) | X | X | X | X | X |
| 11. Intrachromospheruloid Pigment Comp. (latex) |  |  |  |  |  |
| Yield | 600 | 600 | 600 | 700 | 700 |
| Essentially non- |  |  |  |  |  |

TABLE 32-continued

Preparation of Aqueous Dispersion of Intrachromospheruloid Pigment Composition
(Parts by weight)

| | | | | | |
|---|---|---|---|---|---|
| settelting (X) | X | X | X | X | X |

*Capable of effecting emulsion polymerization
[1] N-tallow trimethylene diamine 20% solution as diacetate
[2] N-tallow amine 20% solution as acetate
[3] substituted imidazoline of tall oil (100% active)
[4] N-cocoa amine acetate (100% active)
[5] octylphenoxy polyethoxy ethanol (70% active)
[6] azobisisobutyronitrile

TABLE 33

Preparation of Aqueous Dispersion of Intrachromospheruloid Pigment Composition
(Parts by weight)

| Example No. 33- | -1 | -2 | -3 | -4 | -5 |
|---|---|---|---|---|---|
| A. Micronizing Step | | | | | |
| 1. Pigment | | | | | |
| Pigment Class | Vat | Phthalocyanine | Misc. Pig. | Misc. Pig. | Azo Pig. |
| Trade Name | Ponsol Jade Green Presscake | Heliogen Blue B | Green Gold | Aniline Black | Permagen Yellow |
| Color Index Name | Green 1 | Blue 15 | Green 10 | Black 1 | Yellow 14 |
| Color Index Number | 59825 | 74160 | 12775 | 40440 | 21095 |
| Pigment, dry basis | 35 | 50 | 30 | 25 | 30 |
| Presscake, % solids | 20 | 35 | — | — | — |
| Presscake, wet | 175 | 143 | — | — | — |
| 2. Surface Active Agent* Material (Trade Names) | | | | | |
| Surfactant QS-20[1] | 25 | — | — | — | 10 |
| Surfactant QS-9[2] | — | 25 | — | — | — |
| Surfactant QS-5[3] | — | — | 20 | — | — |
| Surfactant QS-44[4] | — | — | — | 20 | 10 |
| Tamol SN[5] | 2 | 1 | 2 | — | 2 |
| Triton X-405[6] | 5 | 6 | 30 | 7 | 5 |
| 3. Water | | | | | |
| Quantity | 100 | 110 | 200 | 230 | 225 |
| 4. Micronizing Slurry | | | | | |
| Medium | sand | sand | ball | sand | sand |
| 5. Micronizing | | | | | |
| Time, hrs. approx. | 48 | 36 | 40 | 36 | 48 |
| Temperature, °C. | 28 | 28 | 28 | 28 | 28 |
| Average Particle Size Diameter (microns) | <0.02 | <0.02 | <0.2 | <0.2 | <0.02 |
| 6. Separation | | | | | |
| Screening (X) | X | X | X | X | X |
| 7. Water Dilution | 93 | 115 | 113 | 118 | 118 |
| 8. Yield | | | | | |
| Aq. Pig. Disp. | 400 | 400 | 400 | 400 | 400 |
| B. Polymerization Step | | | | | |
| 9A. Surface Active Agent* | | | | | |
| a. Quantity, Type | 2[5] | 30[6] | — | 30[6] | 2[5] |
| b. Quantity, Type | 30[6] | — | — | — | 30[6] |
| Water | 68 | 70 | — | 70 | 68 |
| 9B. Monomer Material (non-crosslinking) | | | | | |
| Styrene | 90 | 8 | 90 | 95 | — |
| Vinyltoluene | 10 | 92 | — | — | 90 |
| Methacrylic Acid | — | — | 10 | — | — |
| Methacrylamide | — | — | — | 5 | — |
| Stearylacrylate | — | — | — | — | 10 |
| 9D. Polmerization Initiator | | | | | |
| Cumene Hydroperoxide | 2 | — | — | — | — |
| AZDN[7] | — | 4 | 4 | 4 | 4 |
| 10. Polymerization Conditions | | | | | |
| Time, hrs. approx. | 8 | 5 | 5 | 5 | 5 |
| Temperature, °C. | 70 | 80 | 80 | 80 | 80 |
| Conversion approx. 100% (X) | X | X | X | X | X |
| 11. Intrachromospheruloid Pigment Comp. (latex) | | | | | |
| Yield | 600 | 600 | 500 | 600 | 600 |
| Essentially non-settling (X) | X | X | X | X | X |

*Capable of effecting emulsion polymerization
[1] Complex phosphate ester (70% active) (used as NH$_4$OH salt)
[2] Complex phosphate ester (70% active) (used as NH$_4$OH salt)
[3] Complex phosphate ester (100% active) (used as NH$_4$OH salt)
[4] Complex phosphate ester (80% active) (used as NH$_4$OH salt)
[5] sodium salt of condensed naphthalene sulfonic acid
[6] octylphenoxy polyethoxy ethanol (70% active)
[7] azobisisobutyronitrile

TABLE 34

Preparation of Aqueous Dispersion of Intrachromospheruloid Pigment Composition
(Parts by weight)

| Example No. 34- | -1 | -2 | -3 | -4 | -5 |
|---|---|---|---|---|---|
| A. Micronizing Step | | | | | |
| 1. Pigment | | | | | |
| Pigment Class | Quinacridone | Azo | Phthalocyanine | Misc. Pig. | Vat |
| Trade Name | Monastral Red B | Permanent Carmine | Heliogen Blue BGS Toner | Green Gold | Indanthrene Pink R Presscake |
| Color Index Name | Violet 19 | Red 5 | Blue 15 | Green 10 | Vat Red 1 |
| Color Index Number | 46500 | 12490 | 74160 | 12775 | 73360 |
| Pigment, dry basis | 25 | 35 | 25 | 25 | 20 |
| Presscake, % solids | — | — | — | — | 35 |
| Presscake, wet | — | — | — | — | 57 |
| 2. Surface Active Agent* Material (Trade Names) | | | | | |
| Deriphat 154[1] | 32 | — | — | — | — |
| Tanaphen A-600[2] | — | 50 | — | — | 55 |
| Monateric Cy-Na 50%[3] | — | — | 50 | — | — |
| Sulfobetaine DC 50%[4] | — | — | — | 50 | — |
| Uniterge K[5] | — | — | — | 30 | — |
| Duponol ME[6] | 20 | — | — | — | — |
| Alipal CO-433[7] | — | 10 | — | — | — |
| Triton X-405[8] | — | — | 45 | — | — |
| 3. Water | | | | | |
| Quantity | 225 | 215 | 200 | 225 | 183 |
| 4. Micronizing Slurry | | | | | |
| Medium | sand | sand | Ball | Ball | sand |
| 5. Micronizing | | | | | |
| Time, hrs. approx. | 48 | 36 | 60 | 72 | 24 |
| Temperature, °C. | 28 | 28 | 28 | 28 | 28 |
| Average Particle Size Diameter (microns) | <0.2 | <0.2 | <0.02 | <0.02 | <0.2 |
| 6. Separation | | | | | |
| Screening (X) | X | X | X | X | X |
| 7. Water Dilution | 98 | 90 | 80 | 70 | 105 |
| 8. Yield | | | | | |
| Aq. Pig. Disp. | 400 | 400 | 400 | 400 | 400 |
| B. Polymerization Step | | | | | |
| 9A. Surface Active Agent* | | | | | |
| a. Quantity, Type | 20[6] | — | — | 20[7] | 30[7] |
| b. Quantity, Type | 20[7] | — | — | — | — |
| Water | 60 | — | — | 80 | 70 |
| 9B. Monomer Material (non-crosslinking) | | | | | |
| Styrene | 10 | 80 | 80 | 10 | 100 |
| Methylmethacrylate | 80 | 20 | — | 50 | — |
| Cyclohexylmethacrylate | — | — | 20 | 40 | — |
| Acrylic Acid | 10 | — | — | — | — |
| 9D. Polymerization Initiator | | | | | |
| AZDN[9] | 3 | 3 | 3 | 3 | 3 |
| 10. Polymerization Conditions | | | | | |
| Time, hrs. approx. | 5 | 46 | 46 | 5 | 46 |
| Temperature, °C. | 80 | 80 | 80 | 80 | 80 |
| Conversion approx. 100% (X) | X | X | X | X | X |
| 11. Intrachromospheruloid Pigment Comp. (latex) | | | | | |
| Yield | 600 | 500 | 500 | 600 | 600 |
| Essentially non-settling (X) | X | X | X | X | X |

*Capable of effecting emulsion polymerization
[1] disodium salt of N-tallow beta amino dipropionate (100% active)
[2] modified phenolic derivative (50% active)
[3] sodium salt of 2-caprylic-1-(ethyl beta oxipropanoic acid)imidazoline (50% active)
[4] stripped coco ammonium sulfonic acid betaine (50% active)
[5] fatty nitrogen ether carboxylate (40% active)
[6] sodium lauryl sulfate (100% active)
[7] sodium salt of a sulfate ester of an alkylphenoxy poly(ethyleneoxy) ethanol (28% active)
[8] octylphenoxy polyethoxy ethanol (70% active)
[9] azobisisobutyronitrile

TABLE 35

Preparation of Aqueous Dispersion of Intrachromospheruloid Pigment Composition
(Parts by weight)

| Example No. 35- | -1 | -2 | -3 | -4 | -5 |
|---|---|---|---|---|---|
| A. Micronizing Step | | | | | |
| 1. Pigment | | | | | |
| Pigment Class | Phthalocyanine | Dioxazine | Vat | Quinacrodone | Azo |
| Trade Name | Heliogen Blue BG Violet Toner | Heliogen rene Presscake | Amanthrene Red Y Black BBN | Monastral Toner | Para |

TABLE 35-continued

Preparation of Aqueous Dispersion of Intrachromospheruloid Pigment Composition
(Parts by weight)

| | | Blue 15 | Violet 23 | Green 9 | Violet 19 | Red 1 |
|---|---|---|---|---|---|---|
| | Color Index Name | Blue 15 | Violet 23 | Green 9 | Violet 19 | Red 1 |
| | Color Index Number | 74160 | 51319 | 59850 | 46500 | 12070 |
| | Pigment, dry basis | 20 | 30 | 20 | 20 | 35 |
| | Presscake, % solids | — | 30 | 20 | — | — |
| | Presscake, wet | — | 100 | 100 | — | — |
| 2. | Surface Active Agent* Material (Trade Names) | | | | | |
| | Triton X-305[1] | — | 10 | 10 | 10 | — |
| | Alipal CO-433[2] | 5 | — | — | — | — |
| | Duponol ME[3] | — | 25 | — | — | 25 |
| | Polymeric Emulsifier Material | | | | | |
| | Tamol 731[4] | 25 | — | — | — | — |
| | SMA Copolymer[5] | — | 25 | 50 | — | — |
| | CAMV Amphoteric Copol.[6] | — | — | — | 50 | 50 |
| | Ammonium Acetate | — | — | — | 30 | — |
| | Aqueous Ammonia (28%) | — | 10 | 20 | — | 10 |
| 3. | Water | | | | | |
| | Quantity | 220 | 140 | 140 | 210 | 185 |
| 4. | Micronizing Slurry | | | | | |
| | Medium | sand | sand | Ball | sand | sand |
| 5. | Micronizing | | | | | |
| | Time, hrs. approx. | 48 | 48 | 60 | 48 | 48 |
| | Temperature, °C. | 28 | 28 | 28 | 28 | 28 |
| | Average Particle Size Diameter (microns) | <0.2 | <0.02 | <0.2 | <0.02 | <0.02 |
| 6. | Separation | | | | | |
| | Screening (X) | X | X | X | X | X |
| 7. | Water Dilution | 130 | 140 | 130 | 130 | 95 |
| 8. | Yield | | | | | |
| | Aq. Pig. Disp. | 400 | 450 | 450 | 450 | 400 |
| B. | Polymerization Step | | | | | |
| 9A. | Surface Active Agent* Material (Trade Names) | | | | | |
| | a. Quantity, Type | 25[2] | — | — | — | 10[3] |
| | b. Quantity, Type | 20[4] | — | — | — | — |
| | Water | 55 | 100 | 100 | 50 | 90 |
| 9B. | Monomer Material (non-crosslinking) | | | | | |
| | Styrene | 85 | 15 | 10 | 10 | 10 |
| | Methylmethacrylate | 10 | 85 | 85 | — | 85 |
| | Methacrylic Acid | — | — | 5 | — | 5 |
| | Vinylidine Chloride | — | — | — | 90 | — |
| | 4-Vinylpyridine | 5 | — | — | — | — |
| 9D. | Polymerization Initiator | | | | | |
| | AZDN[7] | 3 | 3 | 3 | 3 | 3 |
| 10. | Polymerization Conditions | | | | | |
| | Time, hrs. approx. | 5 | 5 | 5 | 5 | 5 |
| | Temperature, °C. | 80 | 80 | 80 | 80 | 80 |
| | Conversion approx. 100% (X) | X | X | X | X | X |
| 11. | Intrachromospheruloid Pigment Comp. (latex) | | | | | |
| | Yield | 600 | 650 | 650 | 600 | 600 |
| | Essentially non-settling (X) | X | X | X | X | X |

*Capable of effecting emulsion polymerization
[1] octylphenoxy polyethoxy ethanol (70% active)
[2] sodium salt of a sulfate ester of an alkylphenoxy poly(ethyleneoxy) ethanol (28% active)
[3] sodium lauryl sulfate (100% active)
[4] sodium salt of polymeric carboxylic acid (100% active)
[5] copolymer of styrene, methacrylic acid and acrylonitrile ratio 25/65/10
[6] copolymer of styrene, acrylonitrile, methacrylic acid and 4-vinylpyridine ratio 25/10/29/36
[7] azobisisobutyronitrile

TABLE 36

Preparation of Aqueous Dispersion of Intrachromospheruloid pigment Composition
(Parts by weight)

| Example No. 36- | | -1 | -2 | -3 | -4 | -5 |
|---|---|---|---|---|---|---|
| A. | Micronizing Step | | | | | |
| 1. | Pigment | | | | | |
| | Pigment Class | Vat | Azo | Cond. Azo | Triphenyl-methane | Azo |
| | Trade Name | Cibanone Yellow GC Presscake | Red Lake CR | Chromphtal Red BR | Reflex Blue | Permanent Orange Toner |
| | Color Index Name | Yellow 2 | Red 53 | — | Blue 18 | Orange 5 |
| | Color Index Number | 67300 | 15585 | — | 142770A | 12075 |
| | Pigment, dry basis | 25 | 35 | 45 | 20 | 25 |
| | Presscake, % solids | 20 | — | — | — | — |
| | Presscake, wet | 125 | — | — | — | — |
| 2. | Surface Active Agent* | | | | | |

TABLE 36-continued

Preparation of Aqueous Dispersion of Intrachromospheruloid pigment Composition
(Parts by weight)

|  |  |  |  |  |  |  |
|---|---|---|---|---|---|---|
|  | Material (Trade Names) |  |  |  |  |  |
|  | Triton X-305[1] | 10 | — | — | — | — |
|  | Triton X-405[2] | — | 20 | — | — | — |
|  | Duomeen T[3] | — | — | 25 | — | — |
|  | Igepon CN-42[4] | — | — | — | 25 | — |
|  | Acetic Acid | — | — | 10 | — | — |
|  | Polymeric Emulsifier Material |  |  |  |  |  |
|  | N-group Polymer[5] | 1 | 10 | — | — | — |
|  | SAMV Amphoteric Copol.[6] | — | — | 25 | 25 | 50 |
|  | Acetic Acid | 6 | 5 | 21 | — | 20 |
| 3. | Water |  |  |  |  |  |
|  | Quantity | 149 | 215 | 195 | 220 | 215 |
| 4. | Micronizing Slurry |  |  |  |  |  |
|  | Medium | sand | sand | Ball | sand | sand |
| 5. | Micronizing |  |  |  |  |  |
|  | Time, hrs. approx. 48 | 24 | 60 | 48 | 24 |  |
|  | Temperature, °C. | 28 | 28 | 28 | 28 | 28 |
|  | Average Particle Size Diameter (microns) | <0.02 | <0.2 | <0.07 | <0.02 | <0.2 |
| 6. | Separation |  |  |  |  |  |
|  | Screening (X) | X | X | X | X | X |
| 7. | Water Dilution | 150 | 165 | 129 | 140 | 140 |
| 8. | Yield |  |  |  |  |  |
|  | Aq. Pig. Disp. | 450 | 450 | 450 | 450 | 450 |
| B. | Polymerization Step |  |  |  |  |  |
| 9A. | Surface Active Agent* |  |  |  |  |  |
|  | Material (Trade Names) |  |  |  |  |  |
|  | a. Quantity, Type | 40[2] | — | — | — | 35[1] |
|  | b. Quantity, Type | — | — | — | — | — |
|  | Water | 60 | 50 | 50 | 50 | 65 |
| 9B. | Monomer Material (non-crosslinking) |  |  |  |  |  |
|  | Styrene | 95 | 90 | 10 | 75 | — |
|  | Acrylonitrile | — | — | — | 25 | — |
|  | 4-Vinylpyridine | 5 | 10 | — | — | — |
|  | Methacrylic Acid | — | — | 5 | — | — |
|  | Methylmethacrylate | — | — | 85 | — | 100 |
| 9D. | Polymerization Initiator |  |  |  |  |  |
|  | AZDN[7] | 3 | 3 | 3 | 3 | 3 |
| 10. | Polymerization Conditions |  |  |  |  |  |
|  | Time, hrs. approx. | 5 | 5 | 5 | 5 | 5 |
|  | Temperature, °C. | 80 | 80 | 80 | 80 | 80 |
|  | Conversion approx. 100% (X) | X | X | X | X | X |
| 11. | Intrachromospheruloid Pigment Comp. (latex) |  |  |  |  |  |
|  | Yield | 650 | 600 | 600 | 600 | 650 |
|  | Essentially non-settling (X) | X | X | X | X | X |

*Capable of effecting emulsion polymerization
[1]octylphenoxy polyethoxy ethanol (70% active)
[2]octylphenoxy polyethoxy ethanol (70% active)
[3]N-tallow trimethylene diamine (85% active)
[4]sodium N-cyclohexyl-N-palmitoyl-taurate (24% active)
[5]4-vinylpyridine homopolymer
[6]copolymer of styrene, acrylonitrile, methacrylic acid and 4-vinyl pyridine
[7]azobisisobutyronitrile

TABLE 37

Preparation of Aqueous Dispersion of Intrachromospheruloid Pigment Composition
(Parts by weight)

| Example No. 37- |  | -1 |  | -2 |  |
|---|---|---|---|---|---|
| A. | Micronizing Step |  |  |  |  |
| 1. | Pigment |  |  |  |  |
|  | Pigment Class | Phthalo-cyanine | Azo Diacrylide | Phthalo-cyanine | Vat |
|  | Trade Name | Heliogen Green A | Diacrylide Yellow | Pigment Blue G Toner | Indanthrene Blue BC |
|  | Color Index Name | Pigment Green 7 | Pigment Yellow 14 | Pigment Blue 15 | Vat Blue 6 |
|  | Color Index Number | 74260 | 21095 | 74160 | 69825 |
|  | Pigment, dry basis | 20 | 10 | 15 | 25 |
|  | Presscake, % solids | 37 | — | — | 23- |
|  | Presscake, wet | 54 | — | — | 106 |
| 2. | Surface Active Agent* Material (Trade Names) |  |  |  |  |
|  | Duponol ME[1] |  | 5 |  | 2 |
|  | Tamol Sn[2] |  | 2 |  | 1 |
|  | Triton X-305[3] |  | — |  | 10 |
|  | Tamol 731[4] |  | 7 |  | — |
|  | Zonyl FSA[5] |  | — |  | 1 |
| 3. | Water |  |  |  |  |

TABLE 37-continued

Preparation of Aqueous Dispersion of Intrachromospheruloid Pigment Composition
(Parts by weight)

|  |  |  |  |
|---|---|---|---|
| | Quantity | 122 | 115 |
| 4. | Micronizing Slurry | | |
| | Medium | sand | sand |
| 5. | Micronizing | | |
| | Time, hrs., approx. | 24 | 48 |
| | Temperature, °C. | 28 | 28 |
| | Average Particle Size | | |
| | Diameter (microns) | <0.2 | <0.2 |
| 6. | Separation | | |
| | Screening (X) | X | X |
| 7. | Water Dilution | 150 | 150 |
| 8. | Yield | | |
| | Aq. Pig. Disp. | 350 | 400 |
| Example No. 37- | | -1 -1 | -2 |
| B. | Polymerization Step | | |
| | 9A. Surface Active Agent* | | |
| | a. Quantity, Type | 25[1] | 25[1] |
| | b. Quantity, Type | — | — |
| | Water | 25 | 75 |
| | 9B. Monomer Material | | |
| | (non-crosslinking) | | |
| | Styrene | 98 | 98 |
| | Acrylonitrile | — | — |
| | Methylmethacrylate | — | — |
| | Dimewthylaminoethyl-methacrylate | 2 | 2 |
| | 9D. Polymerization Initiator | | |
| | AZDN[6] | 3 | — |
| | Potassium Persulfate | —2.5 | — |
| | Sodium Bisulfite | — | 1.25 |
| 10. | Polymerization Conditions | | |
| | Time, hrs. approx. | 5 | 4 |
| | Temperature, °C. | 80 | 70 |
| | Conversion | | |
| | approx. 100% (X) | X | X |
| 11. | Intrachromospheruloid Pigment Comp. (latex) | | |
| | Yield | 500 | 600 |
| | Essentially non-settling (X) | X | X |

*Capable of effecting emulsion polymerization
[1]sodium lauryl sulfate (100% active)
[2]sodium salt of condensed napthalene sulfonic acid
[3]octylphenoxy polyethoxy ethanol (70% active)
[4]sodium salt of polymeric carboxylic acid (100% active)
[5]fluorochemicalsurfactant (50% active)
[6]azobisisobutyronitrile

TABLE 38

Preparation of Aqueous Dispersion of Intrachromospheruloid Pigment Composition
(Parts by weight)

| Example No. 38- | -1 | | -2 | |
|---|---|---|---|---|
| A. Micronizing Step | | | | |
| 1. Pigment | | | | |
| Pigment Class | Vat | Tetrachloro-isoindoline | Vat | Vat |
| Trade Name | Indenthrene Pink R | Irgazin Yellow 3RLT | Carbanthrene Yellow G | Ponsol Jade Green |
| Color Index Name | Vat Red 1 | Pigment Yellow 110 | Vat Yellow 1 | Vat Green 1 |
| Color Index Number | 73360 | | 70600 | 58925 |
| Pigment, dry basis | 40 | 10 | 35 | 15 |
| Presscake, % solids | 36 | — | 20 | 25 |
| Presscake, wet | 111 | — | 175 | 60 |
| 2. Surface Active Agent* | | | | |
| Material (Trade Names) | | | | |
| Duponol ME[1] | | 2 | | 3 |
| Blancol[2] | | 2 | | 1 |
| Triton X-405[3] | — | | — | |
| Tamol 731[4] | | 10 | | 5 |
| Zonyl FSP[5] | — | | | 1 |
| Zonyl FSH[6] | | 1 | | — |
| 3. Water | | | | |
| Quantity | | 115 | | 105 |
| 4. Micronizing Slurry | | | | |
| Medium | | ball | | sand |
| 5. Micronizing | | | | |
| Time, hrs., approx. | | 72 | | 48 |
| Temperature, °C. | | 28 | | 28 |

TABLE 38-continued

Preparation of Aqueous Dispersion of Intrachromospheruloid Pigment Composition
(Parts by weight)

| Example No. 38- | -1 | -2 |
|---|---|---|
| Average Particle Size Diameter (microns) | <0.02 | <0.02 |
| 6. Separation | | |
| Screening (X) | X | X |
| 7. Water Dilution | 100 | 150 |
| 8. Yield | | |
| Aq. Pig. Disp. | 350 | 500 |
| B. Polymerization Step | | |
| 9A. Surface Active Agent* | | |
| a. Quantity, Type | 30[1] | 50[3] |
| b. Quantity, Type | — | — |
| Water | 20 | 50 |
| 9B. Monomer Material (non-crosslinking) | | |
| Styrene | 60 | 100 |
| Acrylonitrile | — | 10 |
| Methylmethacrylate | 39 | 188 |
| Dimethylaminoethylmethacrylate | 1 | 2 |
| 9D. Polymerization Initiator | | |
| AZDN[7] | — | 6 |
| Potassium Persulfate | 2.5 | |
| Sodium Bisulfite | 1.25 | |
| 10. Polymerization Conditions | | |
| Time, hrs. approx. | 5 | 6 |
| Temperature, °C. | 80 | 90 |
| Conversion approx. 100% (X) | X | X |
| 11. Intrachromospheruloid Pigment Comp. (latex) | | |
| Yield | 500 | 800 |
| Essentially non-settling (X) | X | X |

*Capable of effecting emulsion polymerization
[1] sodium lauryl sulfate (100% active)
[2] sodium salt of a sulfonated naphthaleneformaldehyde condensate (86% active)
[3] ocylphenoxy polyethoxy ethanol (70% active)
[4] sodium salt of a polymeric carboxylic acid (100% active)
[5] fluorochemical surface active agent (35% active)
[6] fluorochemical surface active agent (100% active)
[7] azobisisobutyronitrile

TABLE 39

Preparation of Aqueous Dispersion of Intrachromospheruloid Pigment Composition
(Parts by weight)

| Example No. 39 | -1 | | -2 | |
|---|---|---|---|---|
| A. Micronizing Step | | | | |
| 1. Pigment | | | | |
| Pigment Class | Quin-acridone | Azo | Azo | Azo |
| Trade Name | Monastral Red B | Permagen Yellow GN | Mohican Red Toner | Benzidine Yellow AOT Presscake |
| Color Trade Name | Pigment Violet 19 | Pigment Violet 14 | Pigment Red 53 | Pigment Yellow 14 |
| Color Index Number | 46500 | 21095 | 15585 | 21095 |
| Pigment, dry basis | 40 | 10 | 25 | 25 |
| Presscake, % solids | — | — | — | 20 |
| Presscake, wet | — | — | — | 125 |
| 2. Surface Active Agent* Material (Trade Names) | | | | |
| Duponol ME[1] | 2 | | — | |
| Tamol 731[2] | 2 | | — | |
| Triton X405[3] | 21 | | — | |
| Tamol SN[4] | 2 | | 2 | |
| Alipal CO-433[5] | — | | 180 | |
| 3. Water | | | | |
| Quantity | 200 | | 68 | |
| 4. Micronizing Slurry | | | | |
| Medium | ball | | ball | |
| 5. Micronizing | | | | |
| Time, hrs. approx. | 48 | | 72 | |
| Temperature, °C. | 28 | | 28 | |
| Average Particle Size Diameter (microns) | <0.2 | | <0.02 | |
| 6. Separation | | | | |
| Screening (X) | X | | X | |
| 7. Water Dilution | 123 | | 100 | |
| 8. Yield | | | | |
| Aq. Pig. Disp. | 400 | | 500 | |
| B. Polymerization Step | | | | |
| 9A. Surface Active Agent* | | | | |
| a. Quantity, Type | 36[1] | | 40[3] | |

TABLE 39-continued

Preparation of Aqueous Dispersion of Intrachromospheruloid Pigment Composition
(Parts by weight)

| Example No. 39 | | -1 | -2 |
|---|---|---|---|
| | b. Quantity, Type | $2^2$ | — |
| | Water | 60 | 60 |
| 9B. | Monomer Material (non-crosslinking) | | |
| | Styrene | 98 | 68 |
| | Cyclohexylmethacrylate | — | 30 |
| | Dimethylaminoethylmethacrylate | 2 | 2 |
| 9D. | Polymerization Initiator | | |
| | AZDN[6] | 3 | 3 |
| 10. | Polymerization Conditions | | |
| | Time, hrs. | 6 | 5 |
| | Temperature ° C. | 70 | 80 |
| | Conversion approx. 100% (X) | X | X |
| 11. | Intrachromospheruloid Pigment Comp. (latex) | | |
| | Yield | 600 | 700 |
| | Essentially non-settling (X) | X | X |

*Capable of effecting emulsion polymerization
[1] sodium lauryl sulfate (100% active)
[2] sodium salt of polymeric carboxylic acid (100% active)
[3] octylphenoxy polyethoxy ethanol (70% active)
[4] sodium salt of condensed napthalene sulfonic acid
[5] sodium salt of a sulfate ester of an alkylphenoxy poly (ethleneoxy) ethanol (28% active)
[6] azobisisobutyronitrile

TABLE 40

Preparation of Aqueous Dispersion of Intrachromospheruloid Pigment Composition
(Parts by weight)

| Example No. 40 | | -1 | | -2 | |
|---|---|---|---|---|---|
| A. | Miconrizing Step | | | | |
| | 1. Pigment | | | | |
| | Pigment Class | Dioxazine | Phthalo-cyanine | Phthalo-cyanine | Tetrachloro-invindoline |
| | Trade Name | Carbazole Violet R | Heliogen Blue BG Presscake | Heliogen Green A Presscake | Irgazin Yellow 3RLT |
| | Color Index Name | Violet 23 | Blue 15 | Green 7 | Yellow 110 |
| | Color Index Number | 51319 | 74160 | 74260 | — |
| | Pigment, dry basis | 5 | 45 | 40 | 10 |
| | Presscake, % solids | — | 35 | 36 | — |
| | Presscake, wet | — | 129 | 111 | — |
| | 2. Surface Active Agent* Material (Trade Names) | | | | |
| | Duponol ME[1] | | 2 | | 2 |
| | Tamol 731[2] | | 7 | | 7 |
| | Triton X-405[3] | | — | | 2 |
| | Tamol SN[4] | | 2 | | 2 |
| | Alipal CO-433[5] | | — | | — |
| | 3. Water | | | | |
| | Quantity | | 105 | | 116 |
| | 4. Micronizing Slurry | | | | |
| | Medium | | sand | | ball |
| | 5. Micronizing | | | | |
| | Time, hrs. approx. | | 48 | | 72 |
| | Temperature, ° C. | | 28 | | 28 |
| | Average Particle Size Diameter (microns) | | <0.2 | | <0.02 |
| | 6. Separation | | | | |
| | Screening (X) | | X | | X |
| | 7. Water Dilution | | 150 | | 150 |
| | 8. Yield | | | | |
| | Aq. Pig. Disp. | | 400 | | 400 |
| B. | Polymerization Step | | | | |
| 9A. | Surface Active Agent* | | | | |
| | a. Quantity, Type | | 180[5] | | 10[1] |
| | b. Quantity, Type | | — | | 80[5] |
| | Water | | 20 | | 10 |
| 9B. | Monomer Material (non-crosslinking) | | | | |
| | Styrene | | 198 | | 80 |
| | Cyclohexylmethacrylate | | — | | 18 |
| | Dimethylaminoethylmethacrylate | | 2 | | 2 |
| 9D. | Polymerization Initiator | | | | |
| | Potassium Persulfate | | 4.5 | | — |
| | Sodium Bisulfite | | 2.0 | | — |
| | AZDN | | — | | 3 |
| 10. | Polymerization Conditions | | | | |
| | Time, hrs. | | 8 | | 5 |
| | Temperature, ° C. | | 70 | | 80 |
| | Conversion | | | | |

TABLE 40-continued

Preparation of Aqueous Dispersion of Intrachromospheruloid Pigment Composition
(Parts by weight)

| Example No. 40 | -1 | -2 |
|---|---|---|
| approx. 100% (X) | X | X |

*Capable of effecting emulsion polymerization
[1] sodium lauryl sulfate (100% active)
[2] sodium salt of polymeric carboxylic acid (100% active)
[3] octylphenoxy polyethoxy ethanol (70% active)
[4] sodium salt of condensed naphthalene sulfonic acid
[5] sodium salt of a sulfate ester of an alkylphenoxy poly(ethyleneoxy)ethanol (28% active)
[6] azobisisobutyronitrile

TABLE 41

Preparation of Aqueous Dispersion of Intrachromospheruloid Pigment Composition
(Parts by weight)

| Example No. 41 | | -1 | -2 | | |
|---|---|---|---|---|---|
| A. | Micronizing Step | | | | |
| | 1. Pigment | | | | |
| | Pigment Class | Phthalocyanine | Triphenylmethane | Vat | Vat |
| | Trade Name | Heliogen Blue BG Presscake | Victoria Blue | Indanthrene Pink R | Brilliant Orange GR |
| | Color Index Name | Pigment Blue 15 | Pigment Blue 1 | Vat Red 1 | Vat Orange 7 |
| | Color Index Number | 74160 | 42595 | 73360 | 71105 |
| | Pigment, dry basis | 45 | 5 | 40 | 10 |
| | Presscake, % solids | 35 | — | 40 | 20 |
| | Presscake, wet | 128 | — | 100 | 50 |
| | 2. Surface, Active Agent* Material (Trade Names) | | | | |
| | Duomeen T[1] | | 50 | — | |
| | Monaquat TIBC[2] | 10 | — | | |
| | Duponol ME[3] | — | 2 | | |
| | Tamol 731[4] | — | 10 | | |
| | Tamol SN[5] | — | 2 | | |
| | Zonyl FSC[6] | 1 | — | | |
| | 3. Water | | | | |
| | Quantity | 107 | 136 | | |
| | 4. Micronizing Slurry | | | | |
| | Medium | sand | sand | | |
| | 5. Micronizing | | | | |
| | Time, hrs., approx. | 48 | 48 | | |
| | Temperature, °C. | 28 | 28 | | |
| | Average Particle Size Diameter (microns) | <0.02 | <0.02 | | |
| | 6. Separation | | | | |
| | Screening (X) | X | X | | |
| | 7. Water Dilution | 100 | 100 | | |
| | 8. Yield | | | | |
| | Aq. Pig. Disp. | 400 | 400 | | |
| B. | Polymerization Step | | | | |
| | 9A. Surface Active Agent* | | | | |
| | a. Quantity, Type | 99[1] | 25[3] | | |
| | b. Quantity, Type | 1[6] | 10[4] | | |
| | Water | — | 65 | | |
| | 9B. Monomer Material (non-crosslinking) | | | | |
| | Styrene | 84 | 80 | | |
| | Dimethylaminoethylmethacrylate | 2 | — | | |
| | 4-Vinylpyridine | 14 | — | | |
| | Acrylonitrile | — | 10 | | |
| | Acrylic Acid | — | 10 | | |
| | 9D. Polymerization Initiator | | | | |
| | Potassium Persulfate | — | 2.5 | | |
| | Sodium bisulfite | — | 1.25 | | |
| | AZDN[7] | 3 | — | | |
| | 10. Polymerization Conditions | | | | |
| | Time, hrs., approx. | 5 | 6 | | |
| | Temperature, °C. | 80 | 70 | | |
| | Conversion, approx. 100% (X) | X | X | | |
| | 11. Intrachromospheruloid Pigment Comp. (latex) | | | | |
| | Yield | 600 | 600 | | |

TABLE 41-continued

Preparation of Aqueous Dispersion of Intrachromospheruloid Pigment Composition
(Parts by weight)

| Example No. 41 | -1 | -2 |
|---|---|---|
| Essentially non-settling (X) | X | X |

*Capable of effecting emulsion polymerization
[1] N-tallow trimethylene diamine (20% solution as acetate)
[2] substituted imidazoline quaternized with benzyl chloride (100% active)
[3] sodium lauryl sulfate (100% active)
[4] sodium salt of polymeric carboxylic acid (100% active)
[5] sodium salt of condensed napthalene sulfonic acid
[6] fluorochemical surface active agent (50% active)
[7] azobisisobutyronitrile

TABLE 42

Preparation of Aqueous Dispersion of Intrachromospheruloid Pigment Composition
(Parts by weight)

| Example No. 42 | -1 | | | -2 | |
|---|---|---|---|---|---|
| A. Micronizing Step | | | | | |
| 1. Pigment | | | | | |
| Pigment Class | Triphenylmethane | Azo | | Quinacridone | Vat |
| Trade Name | Rhodamine Y | Pigment Carmine FFY Presscake | | Monastral Red B | Indenthren Red FBBR Presscake |
| Color Index Name | Pigment Red 81 | Pigment Red 5 | | Pigment Violet 19 | Vat Red 10 |
| Color Index Number | 45160 | 12490 | | 46500 | 67000 |
| Pigment, dry basis | 25 | 25 | | 20 | 20 |
| Presscake, % solids | — | 25 | | — | 25 |
| Presscake, wet | — | 100 | | — | 80 |
| 2. Surface Active Agent* Material (Trade Names) | | | | | |
| Duomeen T[1] | 100 | | | — | |
| Triton X-405[2] | — | | | — | |
| Monaquat TIBC[3] | — | | | 50 | |
| Igepal CO-995[4] | — | | | 5 | |
| Zonyl FSC[5] | 1 | | | — | |
| 3. Water | | | | | |
| Quantity | 125 | | | 140 | |
| 4. Micronizing Slurry | | | | | |
| Medium | ball | | | sand | |
| 5. Micronizing | | | | | |
| Time hrs., approx. | 72 | | | 24 | |
| Temperature, °C. | 28 | | | 28 | |
| Average Particle Size Diameter (microns) | <0.02 | | | <0.2 | |
| 6. Separation | | | | | |
| Screening (X) | X | | | X | |
| 7. Water Dilution | 50 | | | 150 | |
| 8. Yield | | | | | |
| Aq. Pig. Disp. | 400 | | | 400 | |
| B. Polymerization Step | | | | | |
| 9A. Surface Active Agent* | | | | | |
| a. Quantity, Type | 100[1] | | | 40[4] | |
| b. Quantity, Type | — | | | — | |
| Water | — | | | 60 | |
| 9B. Monomer Material (non-crosslinking) | | | | | |
| Styrene | 88 | | | 80 | |
| Dimethylaminoethylmethacrylate | 2 | | | — | |
| 4-Vinylpyridine | 10 | | | — | |
| Acrylonitrile | — | | | 10 | |
| Acrylic Acid | — | | | 10 | |
| 9D. Polymerization Initiator | | | | | |
| Potassium Persulfate | — | | | 2.5 | |
| Sodium Bisulfite | — | | | 1.25 | |
| AZDN[6] | 3 | | | — | |
| 10. Polymerization Conditions | | | | | |
| Time, hrs. | 5 | | | 7 | |
| Temperature, °C. | 75 | | | 70 | |
| Conversion approx. 100% (X) | X | | | X | |
| 11. Intrachromospheruloid Pigment Comp. (latex) | | | | | |
| Yield | 600 | | | 600 | |
| Essentially non-settling (X) | X | | | X | |

*Capable of effecting emulsion polymerization
[1] N-tallow trimethylene diamine (20% solution as acetate)
[2] octylphenoxy polyethoxy ethanol (70% active)
[3] substituted imidazoline quaternized with benzyl chloride (100% active)
[4] nonylphenoxypoly (ethyleneoxy) ethanol (50% active)
[5] fluorochemical surface active agent (50% active)
[6] azobisisobutyronitrile

Isolation and Soft Powdering Procedures

The intrachromospheruloid pigments produced in the foregoing Examples are produced as aqueous dispersions or latices and such products may either be retained and used in that form or may be further processed to give the product in other forms such as wet presscake, dry powder, or by special supplementary treatment as soft powder products applicable in the case of the cross-linked insoluble pigment latices.

Except in those cases where the intrachromospheruloid latex is spray dried or drum dried as is, for efficient separation from the aqueous phase filtration is essential. As the latices of the invention would pass through a filter, to enable filtration it is necessary to effect coagulation of the latex particles into agglomerates capable of separation from the aqueous phase by filtration and washing methods. For the purposes of this invention this may be accomplished by either breaking the emulsion by pH adjustment with water soluble organic andinorganic compounds, by reacting the intrachromospheruloid pigment particles with chemical additives capable of reaction with functional groups contained on said intrachromospheruloid pigments, or by other methods. The examples hereinafter are illustrative but not restrictive of the methods which may be employed.

Furthermore additional treatments for imparting soft powdering characteristics to the cross-linked essentially insoluble spheruloids to render them readily dispersible, after drying, with the minimum of physical effort, in a vehicle of intended use such as a paint formulation or thermoplastic material may also be given during this isolation step, wherefore the following examples are given in detail to further illustrate these various methods of isolation and supplementary treatments available for alteration of the types of latices exemplified in the foregoing examples.

Example 1 (Alcohol coagulation and filtration)

The latex of cross-linked product from Table 1—1 is charged to a reaction vessel equipped with thermometer, agitator and baffle for producing turbulent agitation together with 500 ml. of water. Five hundred ml. of isopropyl alcohol are run in during 5 minutes with agitation. The precipitated intrachromospheruloid pigment is then heated to 60°–70° C. and maintained at this temperature for one hour and then is readily filtered. The filtrate is essentially colorless and the alcohol may be recovered from it for re-use. The presscake is dried in a convection type oven at 60°–70° C. to yield 150 grams of a soft, intensely blue intrachromospheruloid pigment composition. This same procedure may be applied to latex products from any other of the foregoing examples.

Example 2 (Ionic Coagulation and Filtration)

The latex of cross-linked product from Table 1-3 is charged to reaction vessel equipped with thermometer, agitator and baffle for producing turbulent agitation together with 500 ml. of water. One hundred ml. of a 10% sodium hydroxide solution are run in slowly with agitation to effect coagulation of the intrachromospheruloid latex. The precipitated intrachromospheruloid pigment is then heated to 60°–65° C. and held at this temperature for two hours, filtered, and washed with dilute acetic acid solution to remove excess surface active agent material. The presscake is used as is or dried in a convection type oven to yield 130 grams of a deep blue intrachromospheruloid pigment. The same procedure may be applied to other latex products of foregoing examples which are formed with cationic surface active material.

Example 3 (Spray-drying latex)

The latex of cross-linked product from Table 1-5 is spray dried to yield 208 grams of a spray dried powder intrachromospheruloid pigment having a deep green coloration and possessing excellent water redispersible properties for use in coloration of aqueous based systems. The same porcedure may be applied to any of the heretofore exemplified latex products.

Example 4 (Amine precipitation and filtration)

The latex of cross-linked product from Table 2-2 is charged to a reaction vessel equipped with thermometer, agitation and baffle for producing turbulent agitation — together with 500 ml. of water. One hundred grams of a 25% solution of Duomac T are added with agitation. The precipitated intrachromospheruloid pigment is heated to 75–80° C. during 2 hours and held at that temperature for 2 hours longer. On filtering, washing and drying at 60–70° C. a bright red soft, readily dispersible intrachromospheruloid pigment is obtained; or the product may be retained and used as a pigment in its wet presscake form if so desired. This procedure may be applied to any of the latices of the foregoing examples, especially those containing acidic groups.

Example 5 (Soft powder and aminoplast processing)

The latex of cross-linked product from Table 3-4 is charged to a reaction vessel equipped with thermometer, agitator and baffle for producing turbulent agitation together with 700 ml. of water. A solution of 10 grams of Urea in 100 ml. of water is run in with agitation followed by 75 ml. of a 37% formaldehyde solution. The reaction mixture is stirred for 1 hour and then acidified with the addition of 50 ml. of glacial acetic acid added as a 25% aqueous solution. The reaction is then heated to 40–45° C. during 1 hour and at this point 25 ml. of soft powdering material consisting of a 33% solution of Aerosol OT in Solvesso 140 is added and the temperature raised to 75–80° C. during 2 hours. The reaction is held at this temperature for 2 to 3 hours, filtered, washed and dried at 55–60° C. A deep red intrachromospheruloid pigment is obtained which is of soft powdered nature and furthermore possesses urea-formaldehyde functional groups incorporated therein capable of bonding to a vehicle or a substrate material when subjected to further curing as by heat-treatment. This procedure may be applied to any of the anionic cross-linked latices of the foregoing examples.

Example 6 (Soft powder and polyethylenimine incorporation)

The procedure of Example 5 is followed with the exception that in place of the urea/formaldehyde is substituted 40 grams of a water soluble polyethylenimine compound, PEI-600.

An intrachromospheruloid pigment composition is obtained having incorporated therein polyethylenimine, which has excellent substantivity for coloration of paper and cellulose products. This procedure may be applied to any of the anionic cross-linked latices of the foregoing examples.

Example 7 (Soft powdered co-precipitating latices)

The anionic latex of cross-linked product from Table 5-3 is charged to a reaction vessel equipped with thermometer, agitator and baffle for producing turbulent agitation together with 500 ml. of water. The cationic latex of cross-linked product from Table 5-4 is run in slowly with agitation, whereupon co-precipitation of the two intrachromospheruloid pigments occurs due to the chemical reaction between the anionic and cationic surface active agent material used in the production of the respective latices.

25 ml. of soft powdering material consisting of a 33% solution of Aerosol OT in Solvesso 140 are added and the reaction heated during 2 hours to 75-80° C. and maintained at this temperature for a further 2 hours. This procedure is applicable to any of the pairs of cross-linked latices of opposite polarity of the foregoing examples.

Example 8 (Precipitation with anionic polymeric surface active agent)

The cationic latex of cross-linked product from Table 6-3 is charged to a reaction vessel equipped with thermometer, agitator and baffle for providing turbulent agitation together with 700 ml. of water. With agitation 25 grams of a polymeric carboxylic acid sodium salt (Tamol 731) dissolved in 100 ml. of water is added. The reaction vessel is heated to 75-80° C. to effect precipitation of the intrachromospheruloid pigment by reaction of the polymeric carboxylic acid with the cationic surface active agent present in the intrachromospheruloid latex. The temperature is maintained at 75-80° C. for two hours, and the precipitated intrachromospheruloid pigment is then filtered, washed and dried at 60-70° C. in a convection type oven. A deep green readily dispersible intrachromospheruloid pigment is obtained. This procedure may be applied to any of the cationic latices of the foregoing examples.

Example 9 (Precipitation by neutralization and coagulation with aluminum sulfate)

The procedure of Example M is followed with the exception that the product so formed after dilution to 2000 ml. volume with water is first treated with dilute ammonium hydroxide to adjust the pH to below 7 and 7.5, following which there is added 40 grams of aluminum sulfate to effect coagulation. The coagulated intrachromospheruloid pigment is thereupon heated to 70-75° C. and held at this temperature range for 2 hours, filtered washed and dried to yield an intrachromospheruloid pigment suitable for coloration of paper in the beater and other aqueous based systems.

Example (10) (Precipitation by coagulation with zinc acetate)

The procedure of Example L is followed with the exception that the latex so produced is diluted to 1500 ml. volume with water and then coagulated by the addition of 40 grams of zinc acetate, the coagulated intrachromospheruloid pigment so produced being further treated by the addition of 25 ml. of a 33% solution of Aerosol OT in Solvesso 140 and subsequent heating with turbulent agitation at 75-80° C. for 4 hours to give an intrachromospheruloid pigment that after filtration and washing may be dried to yield a soft powdered product that requires little or no further grinding to make it readily dispersible in all types of thermoplastic material and nonaqueous system.

Example 11 (Precipitation with polyethylenimine)

The procedure of Example K is followed with the exception that the latex so produced is diluted to 1500 ml. with water and 40 grams of a water soluble polyethylenimine, PEI 600, (Dow) were added as a dilute 20% aqueous solution to coagulate the intrachromospheruloid pigment. The reaction was heated to 80° C. following the addition and held at this temperature for 4 hours. The product was filtered and washed to yield a presscake material suitable for coloration of paper and other cellulosic substrate material.

Specific Micronizing Procedures

Example 12 (Grinding in monomers)

Charge 25 grams of dry essentially 100% Vat Red 1 (Pigment Red 1, CI No. 73340) to a sand grinding apparatus equipped with cooling jacket, explosion-proof motor and means for blanketing the working surface with an inert gas e.g. nitrogen together with 100 grams of styrene monomer and 10 grams of ethyleneglycol dimethacrylate. Mill the charge until a representative sample shows essentially no visible particulate organic color pigment material greater than 0.2 micron in diameter on microscopic examination. The microground organic color pigment/monomer composition is then removed from the grinding medium e.g. by conventional screening and charged to a predissolved solution of 25 grams of sodium lauryl sulfate in 300 ml. of water using sufficient agitation during the mixing step to ensure efficient emulsification of the micronized composition, and charged to the vessel in which polymerization is to occur. A solution of 2.5 grams of potassium persulfate in 75 grams of water together with 1.25 grams of sodium bisulfite in 25 grams of water is added to the polymerization vessel, the system is purged with nitrogen and the temperature raised during 30 minutes to 60-65° C. and held at that range for 5 hours. On cooling a brilliant orange red intrachromospheruloid pigment dispersion is obtained. This procedure may take the place of the procedure of aqueous grinding in any of the foregoing examples when dry organic color pigment is to be ground.

Example 13 (Grinding in monomer and diluents)

The procedure of Example 12 is repeated with the exception that in place of the monomer material used in the micronizing step is used 50 parts of cyclohexylmethacrylate and 10 parts of ethyleneglycol dimethacrylate and 50 parts of a low boiling co-solvent which is nonmiscible with water such as cyclohexane, the latter being essentially removed under reduced pressure after the emulsification but prior to the polymerization.

Example 14 (Grinding in monomer with surface active agent)

The procedure of Example 12 is repeated with the exception that in the micronizing step is added also 5 grams of a surface active agent material, Aerosol OT, a sodium sulfosuccinate compatible with said monomer material.

Example 15 (Grinding in monomer with nitrogenous material)

The procedure of Example 12 is repeated with the exception that in the nonaqueous micronizing step is added also 2 grams of pigment modifying agents, e.g. the nitrogen containing material Duomeen T (N-tallow triethylene diamine). This assists in expediting grinding of the organic color pigment, and such practices may be applied in any of the nonaqueous grinding steps of the foregoing examples.

These additions in Example 14 and 15 are desirable for dispersion stability where the micronized pigment is to be stored for a prolonged period before its use in completion of the intrachromospheruloid pigment, and especially in the case of Example 14, to aid in the preparation of the emulsion polymerization recipe.

Example 16 (Grinding in monomer with hue deepening component)

The procedure of Example 14 is repeated with the exception that 1 gram of carbon black, Pigment Black 6 (CI No. 77266) is employed in the grinding step along with the 25 grams of Pigment Red. The resulting intrachromospheruloid has a deep rubine shade without the loss of brilliance normally associated with mixtures of carbon black and Vat Red 1.

Example 17 (Grinding with pigment modifying agent)

The procedure of Table 1-2 is followed with the exception that 2.5 grams of a nitrogeneous material e.g. Duomac T are added to the aqueous micronizing step which renders the organic color pigment material more hydrophobic in nature notwithstanding the presence of the anionic surface active agent in the grinding liquid. This procedure, with the same or other nitrogenous material, may be employed in any of the foregoing examples which untilize grinding in an anionic environment.

Example 18 (Grinding with aminoplast)

The procedure of Table 3-2 is followed with the exception that 10 grams of the water dispersible product resulting from the condensation of 2 moles of urea with 3 moles of formaldehyde are added to the micronizing step to produce an intrachromospheruloid pigment composition having urea/formaldehyde condensation resin material contained therein. This procedure using the same or other aminoplast condensation resin products may be employed in any of the given examples when it is desired to incorporate such resinous material for thermal bonding.

Example 19 (Grinding with aminoplast components)

The procedure of Example 18 is followed with the exception that the unreacted condensation resin components are added to the micronizing step.

Example 20 (Grinding with water soluble polyimine)

The procedure of Example 14 is followed with the exception that in place of the condensation resin is added 10 grams of a polyethylenimine PEI 600 to give an intrachromospheruloid pigment composition containing said polyethylenimine incorporated therein. Such polyethylenimine containing intrachromospheruloid pigment compositions have excellent affinity for cellulosic products such as paper, and this method of incorporating polyethylenimine into the intrachromospheruloid pigment composition may be employed in any of the given examples when it is desired, during the aqueous micronizing step.

Example 21 (Grinding in nonaqueous solvent)

The procedure of Example 16 is followed with the exception that the liquid medium employed in the grinding step comprises 100 grams of methylmethacrylate, 10 grams of ethyleneglycol dimethacrylate, and 10 grams of water dispersible phenoplast produced by reacting 2 moles of resorcinol with 3 moles of formaldehyde. The resulting intrachromospheruloid latex product is especially suitable for printing formulations due to its content of reactive phenoplastic material which may be further cross-linked, e.g. by heating, to affix said intrachromospheruloid pigment to a substrate.

Example 22 (Combination of two color pigments of similar hue and different light fastness coground with a portion of the monomer material)

114 grams of Phthalocyanine Heliogen Blue BG presscake (Pigment Blue 15, CI 74160) containing 40 grams of dry pigment solids and 10 grams of Victoria Blue B (CI Pigment Blue 1, CI 42595) as dry color pigment were charged to a sand mill together with 150 grams of water, 2 grams of Duponol Me (sodium lauryl sulfate), 2 grams of Tamol SN (sodium salt of condensed naphthalene sulfonic acid), 5 grams of Tamol 731 (sodium salt of polymeric carboxylic acid) and 300 volumetric parts of Ottawa sand. The charge was milled for 42 hours when a representative sample under microscopic examination showed essentially all of the organic color particles to be below 0.2 micron in diameter. At this point 10 grams of a water soluble monomer, dimethylaminoethylmethacrylate were added and the milling continued for a further 4 hours to intimately mix the monomer material with the organic pigment material.

The microground organic pigment composition was then separated from the grinding media by conventional screening and charged to a reaction vessel equipped for emulsion polymerization together with 20 grams of Duponol Me (sodium lauryl sulfate) dissolved in sufficient water to adjust the total volume of the charge to 500 ml. 90 grams of a monomer mixture containing 70 grams of styrene and 20 grams of 50% divinylbenzene were added and the total charge emulsified by agitation. The system was then purged with nitrogen and heated to 40° C. at which point 3 grams of cumene hydroperoxide were added and the heating continued during 1 hour to 70–75° C. The reaction was maintained at this temperature range for 7 to 8 hours. On cooling an intensely colored, bright blue latex was obtained. When this intrachromospheruloid pigment latex was used to color an aqueous based exterior paint it was found to give a marked improvement in light fastness over that obtained from a similar shade resulting from physical mixing of the component organic pigment materials, on exterior exposure tests.

Similar improved light fastness was obtained when the latex was coagulated and separated from the serum by filtration, followed by drying to yield a product suitable for incorporation into nonaquous paint systems.

Example 23 (Combination of two color pigments of similar hue and different light fastness coground with a portion of the monomer material)

The procedure of Example 22 was repeated with the exception that in place of the Pigment Blue 15 and Pigment Blue 1 was used 35 grams of Perylene Red Toner, (Vat Red 29 CI 71145) and 15 grams of Amaplast Pink FFT, (Vat Red I, CI. 73360).

As in the preceding example a very marked improvement in resistance to fading of the resultant intrachromospheruloid pigment composition over that of a mechanical mixture of the two organic color components was observed.

Example 24 (Soft powdering procedure)

The procedure of Example 2 was followed with the exception that during the heating step prior to filtration is added 40 ml. of a 10% solution of sorbitan monolaurate in Solvent Naphtha. On drying a very soft product was obtained which readily redispersed in nonaqueous systems.

Example 25 (Soft powdering procedure)

The procedure of Example 5 was followed with the exception that in place of the Aerosol OT solution was added 40 ml. of a 10% solution of polyethylene sorbitan monolaurate in Solvesso 140. An extremely soft textured pigment product was obtained on drying.

Example 26 (Soft powdering procedure)

The procedure of Example 6 was followed with the exception that in place of the Aerosol OT solution was added 40 ml. of a 10% solution of octylphenoxydimethoxyethanol in Solvesso 140. An extremely soft textured pigment product was obtained on drying.

Example 27 (Soft powdering procedure)

The procedure of Example 11 was followed with the exception that after the addition of the Polyethylenimine (PEI 600) was added in addition 30 ml. of a 20% solution of bis(tridecyl)ester of sodium sulfosuccinate dissolved in Solvent Naphtha. On isolation and drying a soft textured pigment product was obtained.

Example 28 (Soft powdering procedure)

The procedure of Example 5 was followed with the exception that in place of the Aerosol OT solution was added 30 ml. of a 20% solution of diamyl sodium sulfosuccinate in Solvesso 140 on isolation and drying the resultant pigment was found to be extremely soft and very easily dispersed in oil based systems.

Example 29 (Soft powdering and spray drying)

The procedure of Example 28 was followed with the exception that in place of isolation by filtration the soft powdered pigment slurry was spray dried to yield the pigment product in soft powdered spray dried form readily dispersible in aqueous systems.

Example 30 (Sequential addition of monomers)

This example is prepared following the procedure given in Table 31, Example 1, with the exception that to the 600 parts of essentially nonsettling deep violet latex is added 20 parts of methylmethacrylate and 10 parts of ethyleneglycoldimethacrylate after cooling the reaction vessel to 45-50° C. The reaction mixture is stirred for one hour to ensure efficient absorption of the monomers into the intrachromospheruloid pigment entities and then 2 parts of cumene hydroperoxide added and the reaction temperature raised to 75-80° C. during 1 hour and maintained at this temperature for 6 hours. On cooling a deep violet latex is obtained containing intrachromospheruloid pigment cross-linked to essential insolubility in all physical solvents.

It is understood that this procedure may be followed with any of the Examples from Tables 22 et seq to yield intrachromospheruloid pigment compositions so cross-linked to essential insolubility and that the polyfunctional monomers may be varied within the limits of the claimed invention as may be desired and expedient, and that additionally functional groups may be imparted to such sequentially polymerized intrachromospheruloid pigment composition by the use of acidic or basic monomers as grafting monomers e.g. dimethylaminoethylmethacrylate, 4-vinylpyridine (basic) or acrylic acid or methacrylic acid (acidic).

Example 31 (Sequential addition of monomers)

The procedure of Table 1, Example 3, is followed. with the exception that the initial polymerization is made using styrene alone to give a noncross-linked intrachromospheruloid composition. The initial polymerization is cooled to between 40° C. and 50° C. and the 10 parts of 4-vinylpyridine and 5 parts of ethyleneglycoldimethacrylate added together with 2 parts of cumene hydroperoxide. The temperature is raised to 80° C. during 1 hour with concurrent agitation to ensure absorption of the added monomer material into the intrachromospheruloid particles and held there for 6-7 hours. On cooling a bright blue latex intrachromospheruloid pigment product is obtained cross-linked to essential insolubility in all physical solvents and possessing functional basisity by virtue of the 4-vinylpyridine monomer incorporated therein. This procedure may be employed with any of the examples given in Tables 1 through 21 and the sequentially added monomers and cross-linking monomers may be varied as desired and expedient within the limits of the claimed invention.

Example 32 (Coagulation of acidic polymer with amine)

The bright orange intrachromospheruloid pigment latex from Table 3, Example 3 was diluted with 600 parts of water and with stirring was added slowly a solution of 20 parts of a water soluble amine acetate, Duomac T, (N-tallow trimethylene diamine diacetate) in 100 parts of water. The coagulated intrachromospheruloid product was heated to 80° C. during 1 hour and held at that temperature for 3-4 hours. On filtering, washing and drying an extremely soft bright orange oleophilic intrachromospheruloid pigment was obtained. This procedure can be utilized not only with any of the Examples given in the Tables which contain acidic functional groups by reason of the monomers used but may also be used as shown in the following Example where the intrachromospheruloid pigment is nonionic in character but is made with anionic surface active agents.

Example 33 (Coagulation of intrachromospheruloid pigment made with anionic surface active agent by means of cationic amine containing material)

The bright violet intrachromospheruloid pigment latex from Table 14, Example 2 was treated as in the preceding Example using 30 parts of Monaquat TIBC (substituted imidazoline quaternized with benzyl chloride) in place of the Duomac T. On filtering, washing and drying the coagulated intrachromospheruloid pigment material, a bright violet pigment was obtained which was soft textured and oleophilic in nature.

EXAMPLES SHOWING AQUEOUS GRINDING OF COLOR PIGMENT WITH SURFACE ACTIVE AGENT AND MONOMER PRESENT

Example 34 (Color pigment material ground with styrene monomer present)

Charged 360 grams of Pigment Blue 15 (CI No. 74160) presscake, 35% pigment solids, to a sand milling apparatus equipped with cooling jacket and nitrogen blanket, together with 10 grams of sodium lauryl sulfate, 200 grams of a 10% aqueous solution of styrene/methacrylic acid/acrylonitrile copolymer, ammonium salt, (ratio 25/65/10) and 2 grams Tamol SN (sodium salt of a condensed naphthalene sulfonic acid) and 300 volumetric parts of a grinding medium (Ottawa sand). The charge was milled for 20 hours when a representative sample under microscopic examination showed essentially no visible particulate matter greater than 0.2 micron in diameter. 20 grams of 28% ammonium hydroxide, and 40 grams of sodium lauryl sulfate were added followed by 20 grams of styrene monomer; the system blanketed with nitrogen and the grinding continued for a further 20 hours. A representative sample under microscopic examination taken at this point showed essentially no visible particulate matter, that is to say the particles of pigment material were essentially below 0.02 micron in diameter.

The organic color pigment dispersion was separated from the grinding medium by conventional screening and the sand washed color free with sufficient water to adjust the volume of the color pigment dispersion to 1600 ml. This was charged to a reaction vessel equipped for emulsion polymerization and 254 grams of a monomer mixture containing 200 grams of styrene, 50 grams of 50% divinylbenzene and 4 grams of dimethylaminoethylmethacrylate added and the components emulsified together. The vessel was purged with nitrogen and 12 grams of cumene hydroperoxide added and the reaction temperature raised to 70° C. and held at 70–75° C. for 8 hours. On cooling 1854 grams of a bright blue stable latex was obtained. Microscopic examination showed substantially all of the particles thereof to be below 0.2 micron in diameter. The product was extremely stable and could be stored for long periods with no evidence of settling, and was useful for coloring aqueous systems such as latex paints, textile printing formulations, paper in the beater etc.

Example 35 (Grinding with methylmethacrylate monomer)

The procedure of the preceding example was repeated with the exception that in place of the 20 grams of styrene was added 20 grams of methylmethacrylate monomer in the grinding step. A stable latex with similar utility was obtained.

Example 36 (Grinding with water soluble monomer)

The procedure of Example 34 was followed with the exception that the styrene/methacrylic acid/acrylonitrile copolymer was omitted and in place of the 20 grams of styrene was added 40 grams of acrylonitrile monomer.

A stable latex with similar utility was obtained.

Example 37 (Grinding with water soluble acidic monomer)

The procedure of Example 36 was followed with the exception that in place of the 40 grams of acrylonitrile was added 40 grams of methacrylic acid. A stable latex having reactive acidic groups on the organic polymer was obtained which had increased affinity for paper and cellulosic material.

Example 38 (Grinding with water soluble basic monomer)

The procedure of Example 37 was followed with the exception that in place of the 40 grams of methacrylic acid was added 40 grams of dimethylaminoethylmethacrylate. A stable bright blue latex having reactive basic groups on the organic polymer was obtained having increased affinity for substrate material such as wool and synthetic fiber material.

OTHER EXAMPLES

It was shown in Examples 30 and 31 that the spheruloids of the composition may be produced initially as noncross-linked particles, and be thereafter cross-linked by absorbing cross-linking monomer thereinto and subjecting the same to further polymerization. It has thus been shown that any of the noncross-linked products exemplified may be prepared in cross-linked form by the concurrent or sequential polymerization therewith of cross-linking monomers.

Since the criteria common to the noncross-linked and cross-linked embodiments of the invention are that the products be insoluble in the vehicle of intended use and have a different refractive index than the latter, it will be apparent from the foregoing that the cross-linking monomers, in the Examples producing cross-linked products, may also be replaced by noncross-linking monomers, where the criteria will be satisfied by the environment of use.

While there have been described herein what are at present considered preferred embodiments of the invention, it will be obvious to those skilled in the art that modifications and changes may be made therein without departing from the essence of the invention. For example, the micronized materials in liquid media may be stored after preparation, especially if they contain adequate emulsifier; such previously prepared micronized dispersions may be blended, preferably under further micronization, to provide in liquid media micronized mixed pigments for the process; the modes of combining, heating and polymerizing the ingredients may be varied dependent upon the volumes of materials being handled in manners known to those skilled in the emulsion polymerization art; etc. It is therefore understood that the exemplary embodiments are illustrative and not restrictive of the invention, the scope of which is defined in the appended claims, and that all modifications that come within the meaning and range of equivalents of the claims are intended to be included therein.

This application is one of the following series of applications:

| No. | Case No. | Serial No. | Title |
|---|---|---|---|
| First | 90-A | 712,257 | Intrachromospheruloid Pigments and Processes for Producing Same |
| Second | 90-B | 712,254 | Intraleucospheruloid Pigments and Processes for Producing Same |
| Third | 90-C | 712,255 | Intrachromospheruloid/Inorganic Pigment Compositions and Processes for Producing Same |
| Fourth | 90-D | 712,256 | Intraleucospheruloid/Organic Color Pigment Compositions and Processes for Producing Same |
| Fifth | 90-E | 712,252 | Intrachromospheruloid/Intraleuco- |

| No. | Case No. | Serial No. | Title |
|---|---|---|---|
| | | | spheruloid Pigment Compositions and Processes for Producing Same |
| Sixth | 90-F | 712,253 | Intrachromoleucospheruloid Pigment Compositions and Processes for Producing Same |

All of the cases of this series are herein incorporated by reference. The titles of the respective cases indicate the lines of division between the subjects matter thereof. Thus the product of the first case consists essentially of transparent emulsion polymer particles, preferably cross-linked to insolubility in physical solvents and having primary particles of colloidal size (spheruloids), enhancing the optical properties of still smaller particles of organic color pigment (chromo pigment) embedded within them (intra). The second case, in lieu of the organic color pigment has embedded within its spheruloids inorganic white pigment (leuco pigment) enhanced thereby. The product of the third case is a special combination of intrachromospheruloid pigment affixed to leuco pigment and coloring the light reaching and reflected from the latter. The product of the fourth case is a special combination of intraleucospheruloid having chromo pigment material affixed thereto and illuminating the same. The product of the fifth case is a special combination of intrachromospheruloid and intraleucospheruloid pigments bonded together giving mutually enhanced tinctorial properties. The product of the sixth case differs from the foregoing in that its spheruloids have embedded therein and enhance the tinctorial effects of composite particles of essentially transparent organic color (chromo) and inorganic white (leuco) components wedded to each other.

Also incorporated by reference herein are our copending applications Ser. Nos. 712,213 and 712,160 (Cases 88 and 89) filed concurrently herewith and respectively entitled "Improved Vinylic Filler Products and Processes for Producing Same" and "Improved Vinylic Filler Pigments and Processes for Producing Same", which copending applications apply to materials different from those concerned in the above listed series of applications, i.e. non-intrachromo- and non-intraleuco-pigment materials, the applicants' soft powdering techniques constituting parts of certain combinations disclosed and claimed in the present application.

We claim:
1. A process for producing insoluble intrachromospheruloid pigment composition, which process comprises, in combination:
   (a) providing in liquid medium a particulate pigment composition consisting essentially of organic color pigment composition dispersed in said medium with 0–100% by weight of the total of surface active agent material set forth in (c), said organic color pigment composition being essentially insoluble in the liquid and having primary particles of an average size less than 0.2 micron in diameter;
   (b) forming an aqueous emulsion polymerization system consisting essentially of (1) the composition of (a), (2) the balance, if any, of 100% of the total of surface active agent material set forth in (c), and (3) monomer material selected in a ratio of said monomer material to said pigment composition lying in the range of 100:1 to 1:20 by weight, said monomer material consisting essentially of ethylenically unsaturated monomer material selected from the class consisting of (i) monomers polymerizable through a single ethylenically unsaturated group in the amount of 0% to 99.8% by weight of said monomer material and (ii) monomers polymerizable through a plurality of ethylenically unsaturated groups in an amount, in the range of 0.2 to 100% by weight of said monomer material, sufficient to produce polymer cross-linked to essential insolubility in any physical solvent and (4) emulsion polymerization initiator in an effective amount in the range of 0.2% to 10% by weight of the said monomer material, dispersed in an aqueous medium;
   (c) the ratio of the total of the surface active agent material present after (b) to said particulate pigment composition and monomer material lying in the range of 2:1 to 1:40 by weight, and said total of surface active agent material being selected from the class of polymeric and nonpolymeric surface active agents and combinations thereof capable of effecting emulsion polymerization in the said system of the selected ethylenically unsaturated monomer material to yield polymer particles with the organic pigment provided in step (a) embedded therein,
   (d) effecting polymerization in said system at sufficient temperatures in the range of 0 to 200° C. for sufficient time in the range of a few minutes to 24 hours to permit the polymerization to proceed far enough in the range from 50 to 100% conversion by weight of said monomer material to produce in aqueous dispersion an intrachromospheruloid pigment consisting essentially of spheruloids of organic polymer material, crosslinked to essential insolubility in any physical solvent, having primary particles of an average size not exceeding 4 microns in diameter, and having embedded in said spheruloids the still smaller size particles of said particulate pigment composition, and
   (e) recovering said intrachromospheruloid pigment composition.

2. A process according to claim 1, in which the ethylenically unsaturated monomer material in step (b) comprises several portions sequentially added and sequentially polymerized in the ensuing polymerization step, one or more of said several portions comprising the monomer material polymerizable through at least two ethylenically unsaturated groups in a sufficient proportion to crosslink the polymer of the intrachromospheruloids to essential insolubility in any physical solvent.

3. A process according to claim 1, in which in step (b) the monomer material having a plurality of polymerizable ethylenically unsaturated groups essentially comprises material copolymerizable with vinyl monomers and selected from the unsaturated conjugated drying oils and their acids and derivatives of the foregoing, the ratio of said drying oil material to the other monomer material polymerized therewith lying in the range of 0.2:99.8 to 20:80 by weight.

4. A process according to claim 1, in which the particulate pigment composition provided in step (a) comprises as a hue deepening component up to 10% of carbon black, based on the organic color pigment thereof.

5. A process according to claim 1, wherein (f) said organic color pigment composition supplied for step (a) is a relatively coarse particulate organic color pigment composition and in step (a) is micronized in the liquid medium until said organic color pigment composition has particles of an average size less than 0.2 micron in diameter.

6. A process according to claim 5, wherein said organic color pigment composition supplied for step (a) is further micronized therein until said organic color composition has particles of an average size less than 0.02 micron in diameter.

7. A process according to claim 5, wherein in step (f) the liquid medium in which the color pigment composition is micronized consists essentially of an aqueous solution of from 1% to 100% by weight of the total of surface active agent set forth in (c).

8. A process according to claim 5, wherein in step (f) the liquid medium in which the color pigment composition is micronized essentially comprises monomer material employed in step (b), and in which the surface active agent material employed in step (b) is dissolved in sufficient water to provide an emulsion polymerization system in step (b).

9. A process according to claim 1, in which the surface active agent material employed in (b) comprises polymeric surface active agent.

10. A process according to claim 9, in which said polymeric surface active agent has basic and/or acidic groups at least in part in the form of water soluble salts.

11. A process according to claim 1, wherein the said organic color pigment composition provided for step (a) is micronized with at least 2% by weight of the monomer material supplied in step (b) based on the organic color pigment composition.

12. A process according to claim 1, wherein step (e) is practiced by coagulating the intrachromospheruloid pigment produced by step (d), and separating serum from the coagulum to provide the intrachromospheruloid pigment composition as wet coagulum.

13. A process according to claim 1, which comprises, in step (e) drying the intrachromospheruloid pigment combination produced by step (d).

14. A process according to claim 1, which comprises, in step (e), coagulating the aqueous dispersions of intrachromospheruloid pigment composition formed in step (d) with the aid of coagulant selected from the class consisting of
(i) water soluble alcohols
(ii) pH adjustment materials of the group consisting of water soluble acids and inorganic bases,
(iii) sodium chloride, and
(iv) combinations of any two or more of the foregoing.

15. A process according to claim 1, which further comprises
(i) selecting in step (b) monomer material containing sufficient acidic monomer to provide the intrachromospheruloid pigment with groups selected from the class consisting of acid groups and their alkali metal and ammonium salts, and
(ii) in step (e) causing the said intrachromospheruloid pigments to react with water soluble or dispersible organic material selected from the class consisting of amines and imines and salts thereof.

16. A process according to claim 1, which further comprises
(i) selecting in step (b), monomer material containing sufficient monomer from the class consisting of amine monomers and salts thereof, to provide the intrachromospheruloid pigment with reactive groups, and
(ii) in step (e) causing the said intrachromospheruloid pigments to react with water soluble organic material having groups selected from the class consisting of carboxyl, sulfate and sulfonic acid groups and salts thereof.

17. A process according to claim 1, which further comprises
(i) selecting anionic surface active agent in step (c) to provide the aqueous dispersion in step (d) with anionic surface active agent and
(ii) in step (e) causing the said intrachromospheruloid pigments to be coagulated by reacting the combination formed in step (d) with water soluble or dispersible organic material selected from the class consisting of amines and imines and salts thereof.

18. A process according to claim 1, which further comprises
(i) selecting cationic surface active agent in step (c) to provide the aqueous dispersion formed in step (d) with cationic surface active agent and
(ii) in step (e) causing the said spheruloid pigments to be coagulated by reacting the combinated formed in step (d) with water soluble organic material having groups selected from the class consisting of carboxyl, sulfate and sulfonic acid groups and salts thereof.

19. A process according to claim 1, which further comprises
(i) selecting in step (b) monomer material containing sufficient acidic monomer to form spheruloids which contain acidic groups and which after neutralization with water soluble base are coagulable, and
(ii) in step (e) neutralizing with a water soluble base the acidic groups of the combined aqueous dispersion of intrachromospheruloid pigments formed in step (d), and
(iii) then coagulating the spheruloids with water soluble coagulant selected from the class consisting of water soluble (i) alkali earth metal compounds, (ii) aluminum salts, (iii) zinc salts, (iv) oleophilic amine acid salts, and (v) combination of the foregoing.

20. A process according to claim 1, which further comprises (i) selecting anionic surface active agent in step (c), and in step (e) coagulating the aqueous dispersion of intrachromospheruloid pigment formed in step (d) with water soluble coagulant selected from the class consisting of water soluble (i) alkali earth metal compounds, (ii) aluminum salts, (iii) zinc salts, (iv) oleophilic amine acid salts, and (v) combinations of the foregoing.

21. A process according to claim 1, wherein (g) as a part of step (e) the insoluble intrachromospheruloid pigment composition produced in aqueous dispersion in step (d) is modified to contain 0.5 to 35 parts of material selected from the soft powdering agents per 100 parts of said pigment composition, dry basis by weight.

22. A process according to claim 21, which further comprises (g) as a part of step (e), after step (f), drying the modified composition to obtain the intrachromospheruloid pigment composition in soft powder form.

23. A process according to claim 21, which further comprises (g) as a part of step (e), after step (f), spray drying the modified composition to obtain the intrachromospheruloid pigment composition in particulate soft powder form.

24. A process as claimed in claim 1, in which in step (e) the intrachromospheruloid pigment dispersion produced is recovered as a latex.

25. A process according to claim 1, in which pigment modifying agent is incorporated into the liquid medium in step (a) said modifying agent being in a minor amount to the surface active agent employed in step (b) and being taken from the class of (i) oleophilic amines, (ii) oleophilic imines, (iii) oleophilic amine carboxylates and acetates, (iv) the oleophilic quaternary ammonium compounds, (v) water soluble polyamines, (vi) water soluble imines and polyimines and (vii) combinations of two or more members of the foregoing.

26. A process according to claim 1, in which the organic color pigment composition embedded in the particles of polymer material consists of an essentially homogeneous mixture of two or more chemically different organic color pigments and said intrachromospheruloid pigment exhibits a coloration different from that of either of said color pigments.

27. A process according to claim 1 in which the organic color pigment composition embedded in the particles of polymer material is a combination of organic color pigments of similar hue, consisting essentially of (i) light stable organic color pigment having a light stability rating number of at least 7 and (ii) a less light stable organic color pigment having a light stability rating not greater than 6, the molar weight ratio of said pigment (i) to said pigment (ii) being in the range of 1:5 to 20:1, and the presence of said pigment (i) prolonging the light stability of said pigment (ii) in the combination.

28. An insoluble intrachromospheruloid pigment consisting essentially of spheruloids of organic polymer material cross-linked to essential insolubility in any physical solvent, said polymer material consisting essentially of polymerized monomer material selected from the class consisting of the monoethylenically unsaturated and polyethylenically unsaturated polymerizable compounds, and said spheruloids having primary particles of an average size not exceeding 4 microns in diameter and individually having embedded therein particulate pigment composition consisting essentially of organic color pigment material, the weight ratio of said organic polymer material to said pigment composition being in the range of 100:1 to 1:20 and said organic color pigment material having primary particles of an average size not exceeding 0.2 micron in diameter.

29. An intrachromospheruloid pigment according to claim 28, wherein said organic color pigment material has primary particles of an average size not exceeding 0.02 micron in diameter.

30. An intrachromospheruloid pigment according to claim 28, in the form of a wet coagulum.

31. An intrachromospheruloid pigment according to claim 28, in powder form.

32. An intrachromospheruloid pigment according to claim 28, in soft powder form.

33. A pigment composition according to claim 28, in which particles of the intrachromospheruloid pigment composition have on their spheruloids, groups selected from the class consisting of the products produced from acid groups and their alkali metal and ammonium salts of the spheruloids reacted with organic material having groups selected from the class consisting of amine and imine groups and salts thereof.

34. A pigment composition according to claim 28, in which particles of the intrachromospheruloid pigment composition have on their spheruloids groups selected from the class consisting of the products from amines and salts thereof of the spheruloids reacted with organic material having groups selected from the class consisting of carboxyl, sulfate and sulfonic acid groups and salts thereof.

35. An intrachromospheruloid pigment composition according to claim 28, in which the composition further comprises reaction products of anionic surface active agent with organic material having groups selected from the class consisting of amine and imine groups and salts thereof.

36. An intrachromospheruloid pigment composition according to claim 28, in which the composition further comprises reaction products of surface active agent having groups selected from the class consisting of amine and imine groups and salts thereof with organic material having groups selected from the class consisting of carboxyl, sulfate and sulfonic acid groups and salts thereof.

37. A pigment composition according to claim 28, in which particles of the intrachromospheruloid pigment composition have on their spheruloids groups selected from the class consisting of acid groups and their alkali metal and ammonium salts which have formed reaction products with water soluble material selected from the class consisting of (i) the alkali earth metal salts, (ii) aluminum salts, (iii) zinc salts, (iv) oleophilic amine salts, and (v) combination of the foregoing.

38. A pigment composition according to claim 28, in which particles of the intrachromospheruloid pigment composition further comprises reaction products of anionic surface active agent with water soluble material selected from the class consisting (i) alkali earth metal salts, (ii) aluminum salts, (iii) zinc salts, (iv) oleophilic amine salts, and (v) combinations of the foregoing.

39. An intrachromospheruloid pigment material according to claim 28, in which the organic color pigment material embedded in the particles of polymer material consists of an essentially homogeneous mixture of two or more chemically different organic color pigments, said intrachromospheruloid pigment exhibiting a coloration different from that of either of said color pigments.

40. An intrachromospheruloid pigment composition according to claim 28, in which the organic color pigment composition embedded in the particles of polymer material is a combination of organic color pigments of similar hue, consisting essentially of (i) light stable organic color pigment having a light stability rating number of at least 7 and (ii) a less light stable organic color pigment having a light stability rating not greater than 6, the molar weight ratio of said pigment (i) to said pigment (ii) being in the range of 1:5 to 20:1, and the presence of said pigment (i) prolonging the light stability of said pigment (ii) in the combination.

41. An intrachromospheruloid pigment according to claim 28, in the form of the latex.

42. An intrachromospheruloid pigment according to claim 28, said spheruloids further including carbon black as a hue deepening component in an amount not exceeding 10% by weight based on said organic color pigment.

* * * * *